US012355544B2

(12) United States Patent
Ji et al.

(10) Patent No.: US 12,355,544 B2
(45) Date of Patent: Jul. 8, 2025

(54) METHODS AND APPARATUS TO FACILITATE ACCESS LINK AND ATG-BASED MESSAGE RELAYING

(71) Applicant: QUALCOMM Incorporated, San Diego, CA (US)

(72) Inventors: Lianghai Ji, San Diego, CA (US); Qiang Wu, San Diego, CA (US); Jun Ma, San Diego, CA (US); Huilin Xu, Temecula, CA (US); Mehmet Izzet Gurelli, San Diego, CA (US); Weimin Duan, San Diego, CA (US); Karthik Anantha Swamy, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 668 days.

(21) Appl. No.: 17/645,949

(22) Filed: Dec. 23, 2021

(65) Prior Publication Data

US 2023/0246705 A1     Aug. 3, 2023

(51) Int. Cl.
*H04B 7/185*     (2006.01)
*H04W 76/10*     (2018.01)

(52) U.S. Cl.
CPC ........ *H04B 7/18506* (2013.01); *H04W 76/10* (2018.02)

(58) Field of Classification Search
CPC ............ H04B 7/18504; H04B 7/18506; H04B 7/18508; H04B 7/14; H04L 12/189; H04W 16/28; H04W 84/005; H04W 40/02; H04W 28/0268; H04W 4/06; H04W 4/14;
(Continued)

(56) References Cited

U.S. PATENT DOCUMENTS

| | | | |
|---|---|---|---|
| 8,547,904 B2* | 10/2013 | Valbonesi | ........... H04L 27/2603 370/328 |
| 10,200,109 B2* | 2/2019 | Feria | ...................... H04W 16/28 |
| 11,166,222 B2* | 11/2021 | Tarighat Mehrabani | .................... H04W 28/0263 |

(Continued)

FOREIGN PATENT DOCUMENTS

| | | | |
|---|---|---|---|
| CN | 109921881 A | * | 6/2019 |
| EP | 3240205 A1 | * | 11/2017 ......... H04B 7/18504 |

OTHER PUBLICATIONS

International Search Report and Written Opinion—PCT/US2022/050773—ISA/EPO—Mar. 15, 2023.
(Continued)

*Primary Examiner* — Matthew C Sams
(74) *Attorney, Agent, or Firm* — Procopio, Cory, Hargreaves & Savitch LLP/QUALCOMM Incorporated

(57) ABSTRACT

Apparatus, methods, and computer-readable media for facilitating reusing an air-to-ground communication system to support message-relaying for UEs in remote areas are disclosed herein. An example method for wireless communication at a user equipment (UE) includes establishing an access link with a terrestrial network. The example method also includes establishing a message layer of the access link for communicating with a payload deployed on-board an aerial device. The example method also includes communicating a communication with the aerial device using the message layer, the communication including a message to be provided to the terrestrial network or received from the terrestrial network.

34 Claims, 22 Drawing Sheets

(58) Field of Classification Search
CPC . H04W 72/0453; H04W 72/30; H04W 76/10; H04W 84/06; H04W 88/02
See application file for complete search history.

(56) References Cited

U.S. PATENT DOCUMENTS

| | | | |
|---|---|---|---|
| 2003/0007487 A1* | 1/2003 | Sindhushayana ... | H04L 12/1877 370/477 |
| 2007/0161347 A1* | 7/2007 | Ma ..................... | H04B 7/18506 455/11.1 |
| 2010/0304739 A1* | 12/2010 | Rooks ................ | H04B 7/18506 455/431 |
| 2015/0131513 A1* | 5/2015 | Lauer .................. | H04W 72/30 370/312 |
| 2015/0131514 A1* | 5/2015 | Lauer ................ | H04B 7/18508 370/312 |
| 2015/0131519 A1* | 5/2015 | Kanabar ................ | H04W 4/14 370/315 |
| 2015/0318913 A1* | 11/2015 | Lauer ................... | H04W 40/02 455/431 |
| 2017/0317742 A1* | 11/2017 | Feria ..................... | H04L 5/0023 |
| 2018/0287817 A1* | 10/2018 | Gault ................. | H04L 12/4633 |
| 2019/0101650 A1* | 4/2019 | McKeown ........... | G01S 5/0027 |
| 2023/0246705 A1* | 8/2023 | Ji ....................... | H04B 7/18506 455/431 |

OTHER PUBLICATIONS

Wu Q., et al., "A Comprehensive Overview on 5G-and-Beyond Networks With UAVs: From Communications to Sensing and Intelligence", IEEE Journal on Selected Areas in Communications, IEEE Service Center, Piscataway, US, vol. 39, No. 10, Oct. 2021, pp. 2912-2945, XP011877692, ISSN: 0733-8716, DOI: 10.1109/JSAC.2021.3088681, Sections I-III, VI, Figures 4, 7, Table II abstract.

* cited by examiner

METHODS AND APPARATUS TO FACILITATE ACCESS LINK AND ATG-BASED MESSAGE RELAYING

INTRODUCTION

The present disclosure relates generally to communication systems, and more particularly, to wireless communication utilizing an aerial device.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of wireless communication at an aerial device is provided. The method may include receiving a first communication from a ground-based user equipment (UE) via an access link defined between the ground-based UE and a payload deployed on-board the aerial device, the first communication including a first message to be provided to a terrestrial network. The example method may also include generating a second message based at least in part on the first message. Additionally, the example method may include transmitting, to a ground-based node using an air-to-ground (ATG) communication system, a second communication including the second message.

In another aspect of the disclosure, an apparatus for wireless communication is provided. The apparatus may be an aerial device that includes a memory and at least one processor coupled to the memory, the memory and the at least one processor configured to receive a first communication from a ground-based UE via an access link defined between the ground-based UE and a payload deployed on-board the aerial device, the first communication including a first message to be provided to a terrestrial network. The memory and the at least one processor may also be configured to generate a second message based at least in part on the first message. Additionally, the memory and the at least one processor may be configured to transmit, to a ground-based node using an ATG communication system, a second communication including the second message.

In another aspect of the disclosure, an apparatus for wireless communication at an aerial device is provided. The apparatus may include means for receiving a first communication from a ground-based UE via an access link defined between the ground-based UE and a payload deployed on-board the aerial device, the first communication including a first message to be provided to a terrestrial network. The example apparatus may also include means for generating a second message based at least in part on the first message. Additionally, the example apparatus may include means for transmitting, to a ground-based node using an ATG communication system, a second communication including the second message.

In another aspect of the disclosure, a non-transitory computer-readable storage medium storing computer executable code for wireless communication at an aerial device is provided. The code, when executed, may cause a processor to receive a first communication from a ground-based UE via an access link defined between the ground-based UE and a payload deployed on-board the aerial device, the first communication including a first message to be provided to a terrestrial network. The example code, when executed, may also cause the processor to generate a second message based at least in part on the first message. Additionally, the example code, when executed, may cause the processor to transmit, to a ground-based node using an ATG communication system, a second communication including the second message.

In an aspect of the disclosure, a method of wireless communication at an aerial device is provided. The method may include receiving a first communication from a ground-based node using an ATG communication system between the ground-based node and a payload deployed on-board the aerial device, the first communication including a first message from a terrestrial network to be provided to a ground-based UE. The example method may also include generating a second message based at least in part on the first message. Additionally, the example method may include transmitting, to the ground-based UE via an access link defined between the ground-based UE and the payload, a second communication including the second message.

In another aspect of the disclosure, an apparatus for wireless communication is provided. The apparatus may be an aerial device that includes a memory and at least one processor coupled to the memory, the memory and the at least one processor configured to receive a first communication from a ground-based node using an ATG communication system between the ground-based node and a payload deployed on-board the aerial device, the first communication including a first message from a terrestrial network to be provided to a ground-based UE. The memory and the at least one processor may also be configured to generate a second message based at least in part on the first message. Additionally, the memory and the at least one processor may be configured to transmit, to the ground-based UE via an access link defined between the ground-based UE and the payload, a second communication including the second message.

In another aspect of the disclosure, an apparatus for wireless communication at an aerial device is provided. The apparatus may include means for receiving a first communication from a ground-based node using an ATG communication system between the ground-based node and a payload deployed on-board the aerial device, the first communication including a first message from a terrestrial network to be provided to a ground-based UE. The example apparatus may also include means for generating a second message based at least in part on the first message. Additionally, the example apparatus may include means for transmitting, to the ground-based UE via an access link defined between the ground-based UE and the payload, a second communication including the second message.

In another aspect of the disclosure, a non-transitory computer-readable storage medium storing computer executable code for wireless communication at an aerial device is provided. The code, when executed, may cause a processor to receive a first communication from a ground-based node using an ATG communication system between the ground-based node and a payload deployed on-board the aerial device, the first communication including a first message from a terrestrial network to be provided to a ground-based UE. The example code, when executed, may also cause the processor to generate a second message based at least in part on the first message. Additionally, the example code, when executed, may cause the processor to transmit, to the ground-based UE via an access link defined between the ground-based UE and the payload, a second communication including the second message.

In an aspect of the disclosure, a method of wireless communication at a UE is provided. The method may include establishing an access link with a terrestrial network. The example method may also include establishing a message layer of the access link for communicating with a payload deployed on-board an aerial device. Additionally, the example method may include communicating a communication with the aerial device using the message layer, the communication including a message to be provided to or received from the terrestrial network.

In another aspect of the disclosure, an apparatus for wireless communication is provided. The apparatus may be a UE that includes a memory and at least one processor coupled to the memory, the memory and the at least one processor configured to establish an access link with a terrestrial network. The memory and the at least one processor may also be configured to establish a message layer of the access link for communicating with a payload deployed on-board an aerial device. Additionally, the memory and the at least one processor may be configured to communicate a communication with the aerial device using the message layer, the communication including a message to be provided to the terrestrial network or received from the terrestrial network.

In another aspect of the disclosure, an apparatus for wireless communication at a UE is provided. The apparatus may include means for establishing an access link with a terrestrial network. The example apparatus may also include means for establishing a message layer of the access link for communicating with a payload deployed on-board an aerial device. Additionally, the example apparatus may include means for communicating a communication with the aerial device using the message layer, the communication including a message to be provided to the terrestrial network or received from the terrestrial network.

In another aspect of the disclosure, a non-transitory computer-readable storage medium storing computer executable code for wireless communication at a UE is provided. The code, when executed, may cause a processor to establish an access link with a terrestrial network. The example code, when executed, may also cause the processor to establish a message layer of the access link for communicating with a payload deployed on-board an aerial device. Additionally, the example code, when executed, may cause the processor to communicate a communication with the aerial device using the message layer, the communication including a message to be provided to the terrestrial network or received from the terrestrial network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
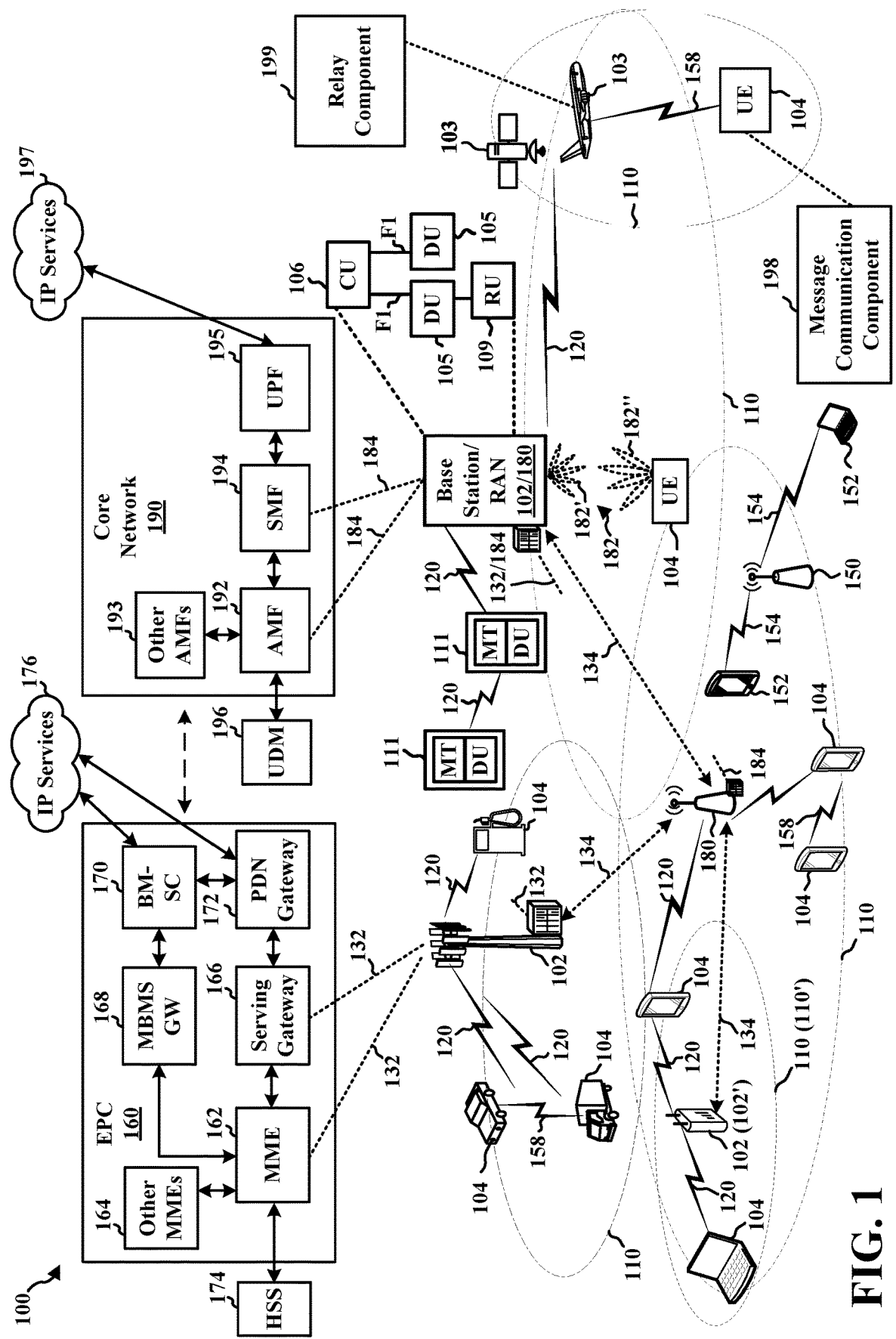
FIG. 1 is a diagram illustrating an example of a wireless communications system and an access network.

To enable the transmission of communication from a mobile device (e.g., a mobile UE) at a location without terrestrial cellular network coverage, a number of approaches may be utilized. The communication may include any of various types of communication. In some aspects, the communication may be based on services associated with limited capabilities, such as a message. For example, the communication may include a short message service (SMS) message, an emergency message (e.g., an SOS message), a text message, a voice call, a public safety message, high priority communication, or other communication. In some aspects, the UE may transmit and/or receive communication with an aerial device, the communication being intended for a network, such as a terrestrial network (TN). The aerial device may relay the communication between a ground-based base station and the UE. In some aspects, the aerial device may relay the communication between a non-terrestrial network (NTN) platform, e.g. a satellite, and the UE. It is noted, due to the large pathloss between a UE and the NTN platform, it may be difficult for a UE, e.g. a smartphone device, to directly communicate with the NTN platform with a signal quality satisfactory for communication to be accurately received. In this case, the aerial device may relay the communication between the UE and the NTN platform, as, in one example, the aerial device may have a channel having a signal quality that is better with the NTN platform than the UE, e.g. due to the aerial device's additional computational complexity and/or larger antenna(s).

In some examples, an air-to-ground (ATG) communication system may facilitate inflight communication for an on-board UE (e.g., a UE deployed on-board an aerial device). For example, an on-board access point may provide inflight connectivity to one or more on-board UEs. The on-board access point may also connect, via the ATG communication system, to a ground station providing access to a terrestrial network. In such examples, the ATG communication system may relay communication between the on-board UEs and the terrestrial network.

Compared to satellite-based communications (e.g., via an Iridium-like satellite communication system or a satellite-based 3GPP NTN, which, for example, may be used when the aircraft is above an ocean), an ATG communication system may relay communication between a UE and a network with a lower cost, a higher throughput, and/or a lower latency, according to some examples. For example, the aerial device may be located at a lower level than a satellite and may transmit and receive communication with a UE having less latency. In some aspects, ATG communication systems may allow for reduced deployment costs without launching satellites and may more easily incorporate software upgrades for ATG communication. According to one or more examples, applying ATG communication to relay between a ground-based UE and a network may involve less user assistance in operating a UE to communicate with the aerial device, e.g., without involving user positioned antennas.

ATG communication may be supported by a device that provides wireless communication service within a cellular spectrum, in some aspects.

Aspects disclosed herein provide techniques for supporting wireless communication service to a UE outside of terrestrial network coverage via an aerial device. The wireless communication service may include transmitting and/or receiving messages, such as an SMS message. The aerial device may provide a service in which wireless communication from a ground-based UE may be relayed via the aerial device to a terrestrial network and vice versa based in part on an ATG communication system. For example, the aerial device may relay a message from the UE to a network node and/or a message from the network node to the UE. In one or more examples, the aerial device may use an access link to communicate with the UE. In one or more examples, the aerial device may use a standardized air interface (e.g., a 3GPP Uu interface) over the access link to relay the message to and from the UE. In one or more examples, the aerial device may use the ATG link to relay the message to and from the network node.

Aspects disclosed herein may use the ATG link to carry traffic in a feeder link between the aerial device and the ground-based gateway. For example, an ATG communication system may carry messages between the aerial device and the network node. Additionally, the UE may communicate messages with the aerial device via a service link (e.g., a link between the UE and the aerial device). For example, the access link (e.g., a Uu link or a radio link) may carry messages between the UE and the aerial device based on an access link protocol stack. Thus, the aerial device acts as a mobile relay to provide connectivity to a ground-based UE that is out-of-coverage of a terrestrial network, and the aerial device uses the Uu protocol layers over the access link to relay the communication to and from the ground-based UE. The aerial device also uses the ATG communication system to relay the communication to and from the access link node.

The method may facilitate improving cell coverage for an out of coverage UE by enabling the aerial device to relay messages from the UE to a terrestrial network using an access link and an ATG communication system. For example, the aerial device may include a payload (e.g., an aerial payload) of components onboard or carried with an aircraft and configured to communicate with the UE using the access link and configured to communicate with the terrestrial network using the ATG communication system. In some examples, the payload may include a regenerative payload configured to generate a physical signal between the access link and the ATG communication system. For example, the payload may include a base station (e.g., a distributed unit (DU) and a central unit (CU)) that is in communication with the terrestrial network via the ATG communication system. In some examples, the payload may include a base station (e.g., a DU and a CU) including some capabilities of the core network and configured to relay messages without communicating with a ground-based core network. In some examples, the payload may include some capabilities of the core network to encode a message for transmitting to the UE via the access link based on an ATG message received via the ATG communication system from the terrestrial network. In some examples, the payload and the terrestrial network may implement a disaggregated RAN including a split architecture. For example, the payload may include a radio unit (RU) in communication with the terrestrial network via the ATG communication system. The terrestrial network may include a base station corresponding to the RU of the payload and/or a core network deployed on the ground. In some examples, the payload may include a DU that is connected to a corresponding CU on the ground via an F1 interface carried by the ATG communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer. While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100 including base stations 102 and 180 and UEs 104. In certain aspects, a UE 104 may include a message communication component 198 configured to establish an access link with a terrestrial network. The example message communication component 198 may also be configured to establish a message layer of the access link for communicating with a payload deployed on-board an aerial device. Additionally, the example message communication component 198 may be configured to communicate a communication with the aerial device using the message layer. The communication may include a message to be provided to the terrestrial network or received from the terrestrial network.

In some aspects, an aerial device 103 may include a relay component 199 configured to receive a first communication from a ground-based UE via an access link defined between the ground-based UE and a payload deployed on-board the aerial device. The first communication may include a first message to be provided to a terrestrial network. The example relay component 199 may be also be configured to generate a second message based at least in part on the first message. Additionally, the example relay component 199 may be configured to transmit a second communication including the second message to a ground-based node using an ATG communication system.

In some aspects, the relay component 199 may be configured to receive a first communication from a ground-based node using an ATG communication system between the ground-based node and a payload deployed on-board the aerial device. The first communication may include a first message from a terrestrial network to be provided to a ground-based UE. The example relay component 199 may also be configured to generate a second message based at least in part on the first message. Additionally, the example relay component 199 may be configured to transmit a second communication including the second message to the ground-based UE via an access link defined between the ground-based UE and the payload.

Although the following description provides examples directed to 5G NR (and, in particular, to a 5G NR-based service link between the ground-based UE and the aerial device), the concepts described herein may be applicable to other similar areas, such as LTE, LTE-A, CDMA, GSM, and/or other wireless technologies.

The example of the wireless communications system of FIG. 1 (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

In some aspects, a base station 102 or 180 may be referred to as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network 190 may be referred to as the backhaul.

The RAN may be based on a functional split between various components of the RAN, e.g., between the CU 106, the DU 105, or the RU 109. The CU 106 may be configured to perform one or more aspects of a wireless communication protocol, e.g., handling one or more layers of a protocol stack, and the one or more DUs 105 may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer, and/or an upper layer. In other implementations, the split between the layer functions provided by the CU, the DU, or the RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to the core network 190 or the EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHz), FR4 (71 GHz-114.25 GHz), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services. The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
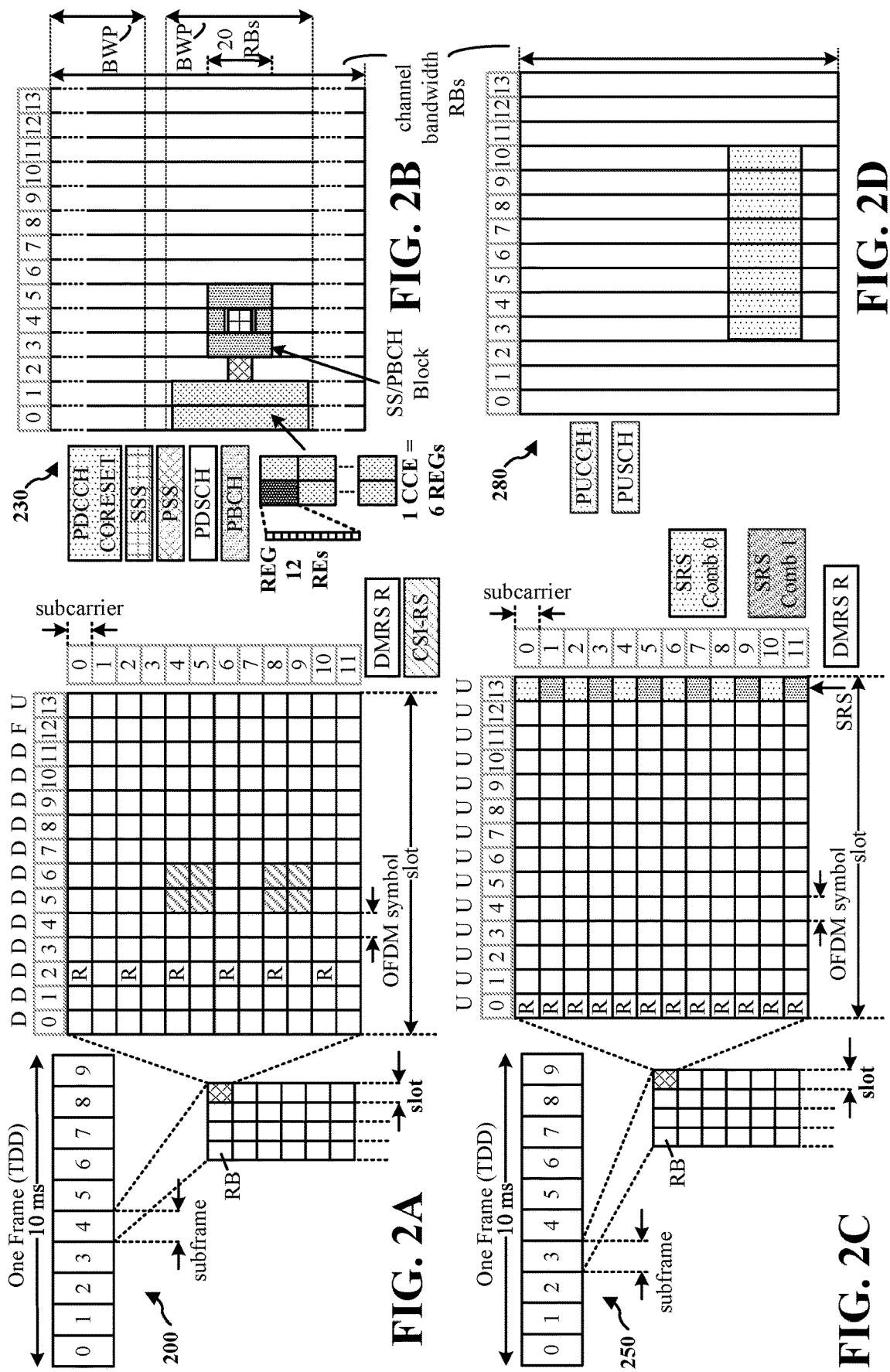
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where u is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
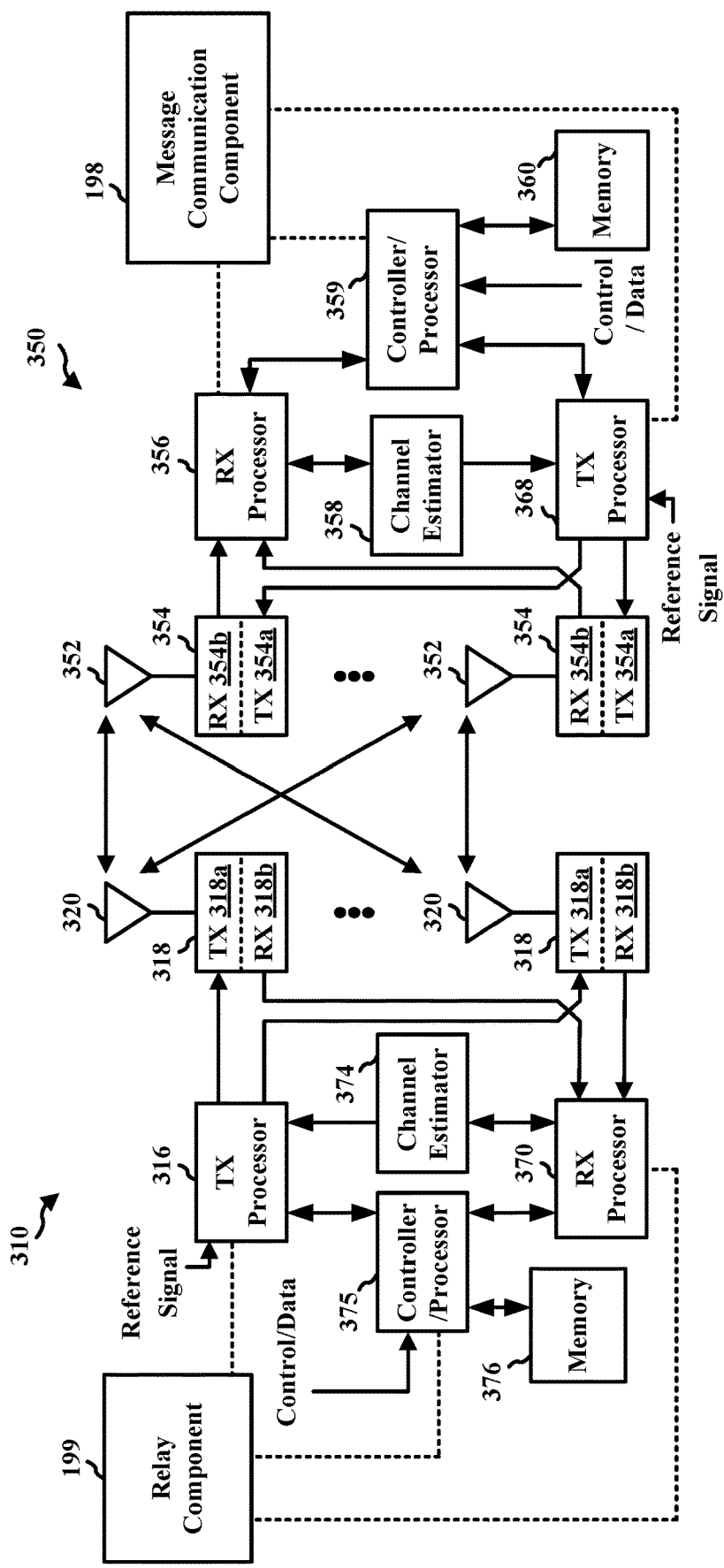
FIG. 3 is a diagram illustrating an example of a base station and a user equipment (UE) in an access network.

FIG. 3 is a block diagram that illustrates an example of a first wireless device that is configured to exchange wireless communication with a second wireless device. In the illustrated example, the first wireless device may include a base station 310, the second wireless device may include a UE 350, and the base station 310 may be in communication with the UE 350 in an access network. As shown in FIG. 3, the base station 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example UE 350 includes antennas 352, a transceiver 354 including a transmitter 354a and a receiver 354b, an RX processor 356, a channel estimator 358, a controller/processor 359, memory 360, and a TX processor 368. In other examples, the base station 310 and/or the UE 350 may include additional or alternative components.

In the DL, IP packets from the EPC 160 may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318a. Each transmitter 318a may modulate a radio frequency (RF) carrier with a respective spatial stream for transmission.

At the UE 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the message communication component 198 of FIG. 1.

At least one of the TX processor 316, the RX processor 370, and the controller/processor 375 may be configured to perform aspects in connection with the relay component 199 of FIG. 1.

To enable the transmission of communication from a mobile device (e.g., a mobile UE) at a location without terrestrial cellular network coverage, a number of approaches may be utilized. The communication may include any of various types of communication. In some aspects, the communication may be based on services associated with limited capabilities, such as a message. For example, the communication may include a short message service (SMS) message, an emergency message (e.g., an SOS message), a text message, a voice call, a public safety message, high priority communication, or other communication.

In one approach, the communication may be transmitted and delivered via a satellite communication (SatCom) system such as the Iridium system or another similar system. This approach may leverage the existing satellites that are already in operation, and may be associated with fast implementation and low deployment costs. However, there may be limited satellite coverage, and the communication may involve a specific type of UE that supports communication with the satellite. This approach may also be associated with strict antenna and TX power specifications. The operations may be human-assisted, where a skilled human may point the antenna toward the satellite to avoid blockage. Further, the approach may not be applicable to modern mobile devices with smaller form factors.

In another approach, the communication may be exchanged via a satellite-based non-terrestrial network (NTN), such as a 3GPP NTN. However, such NTNs may be associated with a high deployment cost to launch new satellites and install new gateways. In addition, it may be difficult for a smart phone device to autonomously connect to the NTN satellite due to the strict antenna and TX power specifications.

In another approach, the communication may be exchanged between a UE and a network via an aerial device. In some aspects, the aerial device may be provided at an aircraft. In some aspects, an aerial device may be provided via commercial aircraft to provide extended coverage for an area without a terrestrial base station. The air traffic provided by such aircraft may provide dense coverage, e.g., with aircraft within 50 km of each other. A typical cruising altitude may be on a scale of 10 kilometers (km) and may allow for line of sight (LOS) propagation to a device for over 200 km.

Figure 4:
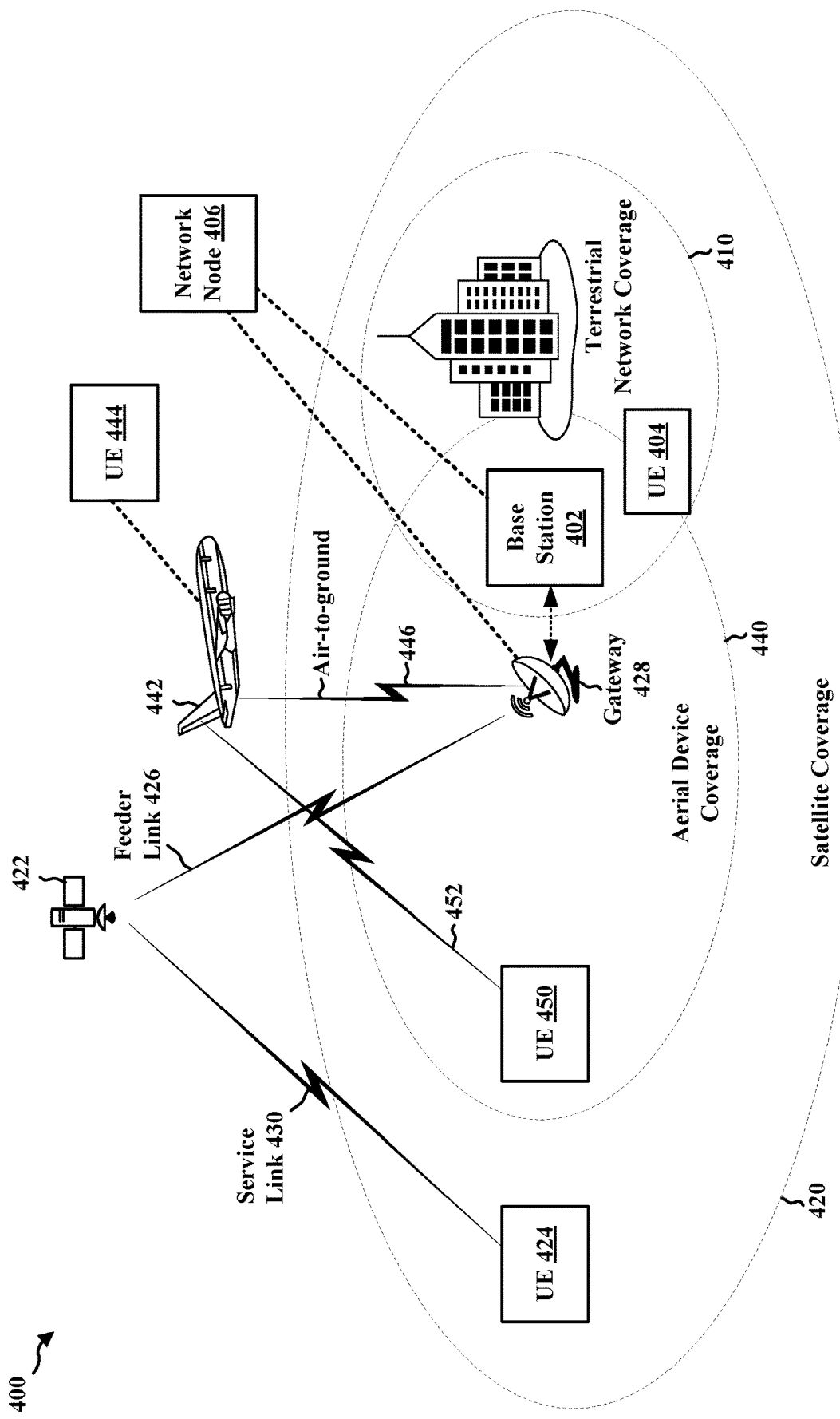
FIG. 4 is a diagram illustrating an example environment that may support wireless communication including aspects of a terrestrial network, a satellite communication system, and an ATG communication system, in accordance with various aspects of the present disclosure.

FIG. 4 is a diagram illustrating an example environment 400 that may support wireless communication including aspects of a terrestrial network, a satellite communication system, and an ATG communication system, as presented herein. To enable communication with a UE, a number of approaches may be utilized.

In some examples, a UE may communicate with a terrestrial network. In the illustrated example of FIG. 4, a terrestrial network includes a base station 402 that provides coverage to UEs, such as an example UE 404, located within a coverage area 410 for the terrestrial network. The base station 402 may facilitate communication between the UE 404 and a network node 406. Aspects of the network node 406 may be implemented by a core network, such as the example core network 190 of FIG. 1.

In some examples, a UE may transmit or receive satellite-based communication (e.g., via an Iridium-like satellite communication system or a satellite-based 3GPP NTN). For example, a satellite 422 may provide coverage to UEs, such as an example UE 424, located within a coverage area 420 for the satellite 422. In some examples, the satellite 422 may communicate with the network node 406 through a feeder link 426 established between the satellite 422 and a gateway 428 in order to provide service to the UE 424 within the coverage area 420 of the satellite 422 via a service link 430.

The feeder link 426 may include a wireless link between the satellite 422 and the gateway 428. The service link 430 may include a wireless link between the satellite 422 and the UE 424. In some examples, the gateway 428 may communicate directly with the network node 406. In some examples, the gateway 428 may communicate with the network node 406 via the base station 402.

In some examples, an ATG communication system may facilitate in-flight communication for aircraft-borne UEs. For example, an aerial device 442 may provide coverage to aircraft-borne UEs, such as an example UE 444. The aerial device 442 may establish an ATG link 446 with the gateway 428 on the ground to provide service to the UE 444. For example, the aerial device 442 may provide on-board communication components, such as internal Wi-Fi antennas or other radio access technologies (RATs) to allow passengers to communicate with a terrestrial network based on ATG communication. The data traffic that may be carried over ATG communication systems may include aircraft passenger communications (e.g., communications associated with the passenger devices, which may be available en route, during takeoff, landing, climb, and/or descent), airline operation communications (e.g., aircraft maintenance information, flight planning information, weather information, etc.), and/or air traffic control communications (e.g., the ATG communication system may serve as a backup to systems operating in aviation licensed bands).

In some examples, a ground-based UE may be located within a coverage area of an aerial device, but outside the coverage area of a terrestrial network. For example, a UE 450 of FIG. 4 is located with a coverage area 440 of the aerial device 442, but may be located in a remote area and, thus, outside the coverage area 410 of the terrestrial network. In other examples, a connection between the UE 450 and the base station 402 may become blocked and, thus, the UE 450 may be unable to communicate with the base station 402 and the terrestrial network.

Aspects disclosed herein provide techniques for supporting wireless communication service to a UE outside of terrestrial network coverage via an aerial device. The wireless communication service may include transmitting and/or receiving messages, such as an SMS message. The aerial device may provide a service in which wireless communication from a ground-based UE may be relayed via the aerial device to a terrestrial network and vice versa based in part on an ATG communication system. For example, and with respect to the example of FIG. 4, the aerial device 442 may relay a message from the UE 450 to the network node 406 and/or a message from the network node 406 to the UE 450. In the illustrated example of FIG. 4, the aerial device 442 may use an access link 452 to communicate with the UE 450. The aerial device 442 may use a standardized air interface (e.g., a 3GPP Uu interface) over the access link 452 to relay the message to and from the UE 450. The aerial device 442 may use the ATG link 446 to relay the message to and from the network node 406 (e.g., via the gateway 428). In some aspects, the ATG link 446 may be used to transport at least some protocol layers of a standardized air interface (e.g., a 3GPP Uu interface).

Compared to satellite-based communications (e.g., via an Iridium-like satellite communication system or a satellite-based 3GPP NTN, which, for example, may be used when the aircraft is above an ocean), an ATG communication system may relay communication between a UE and a network with a lower cost, a higher throughput, and/or a lower latency, according to some examples. For example, the aerial device 442 may be located at a lower level than the satellite 422 and may transmit and receive communication with the UE 450 having less latency. In some aspects, ATG communication systems may allow for reduced deployment costs without launching satellites and may more easily incorporate software upgrades for ATG communication. According to one or more examples, applying ATG communication to relay between a ground-based UE and a network may involve less user assistance in operating a UE to communicate with the aerial device, e.g., without involving user positioned antennas. ATG communication may be supported by a device that provides wireless communication service within a cellular spectrum, in some aspects.

Figure 5:
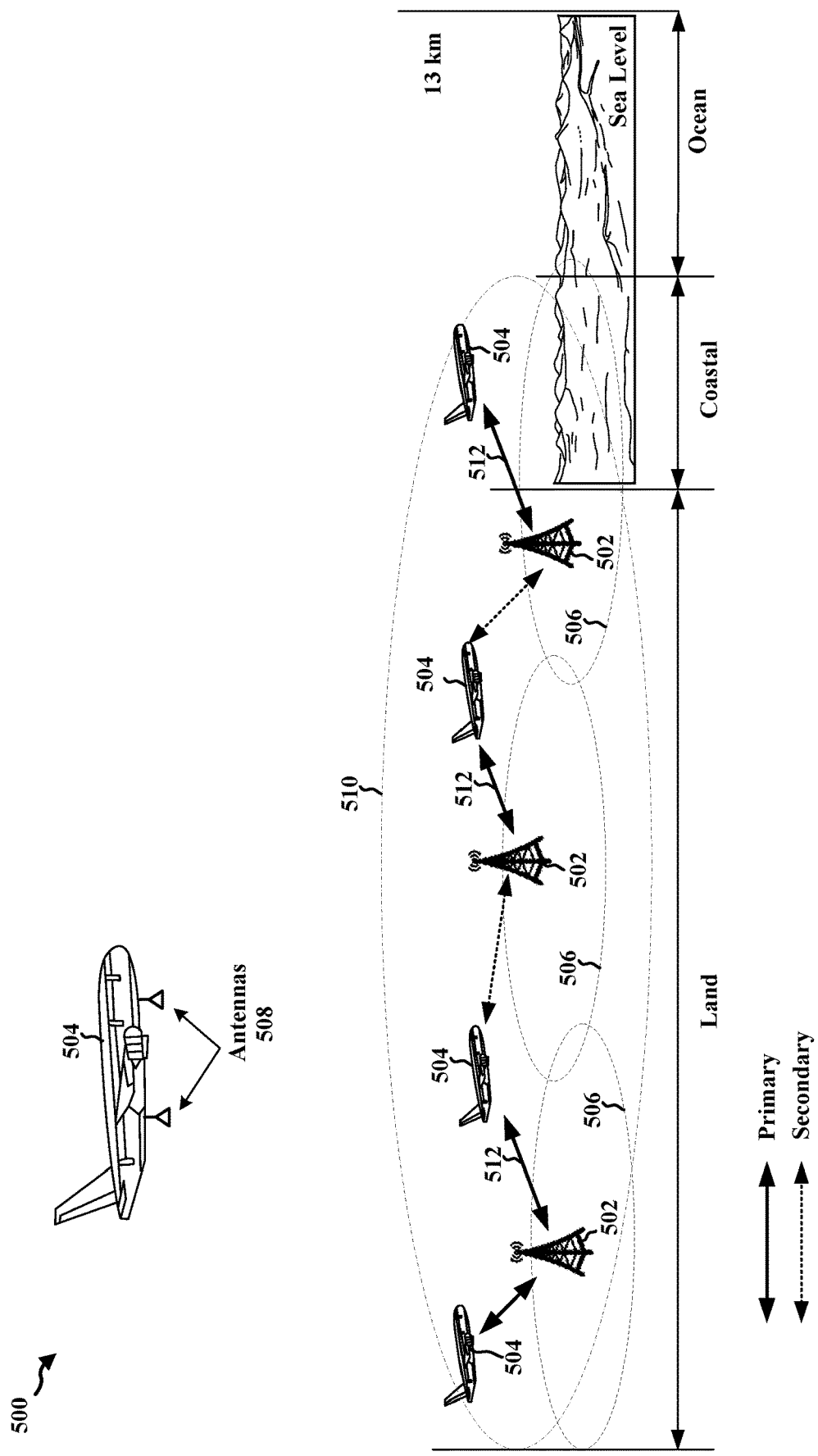
FIG. 5 is a diagram illustrating wireless communications in an ATG communication system, in accordance with various aspects of the present disclosure.

FIG. 5 is a diagram 500 illustrating wireless communications in an ATG communication system 510, as presented herein. In the illustrated example of FIG. 5, the ATG communication system 510 includes an aircraft-borne device, such as example antennas 508, to receive and/or transmit ATG communication with ground stations, such as ground-based base stations 502 or gateways. ATG communication may take place between the antennas 508 and the ground-based base stations 502 via a radio link, such as an example ATG link 512. Aspects of the ATG link 512 may be based on Evolution-Data Optimized (EV-DO), which may be part of the Code Division Multiple Access (CDMA) 2000 technology. In some examples, the antennas 508 may be re-used to facilitate the communication between the aircraft-borne device and a ground-based user device.

An aircraft-borne device may refer to a device that is inside, attached to, or traveling with an aircraft. As illustrated in FIG. 5, an aerial device 504 may exchange ATG communication with ground-based base stations 502 when traveling over land and/or coastal areas. The ground-based base stations 502 (e.g., terrestrial base stations) may be equipped with antennas angled (e.g., up-tilted or positioned to transmit upward) for communication with aerial devices in flight and the aerial device 504 may be equipped with a server and antennas 508 at the bottom and/or on the sides of the aerial device 504 for communication with the ground-based base stations 502. The aerial device 504 may travel in a path that crosses a coverage area 506 of different ground-based base stations. The aerial device 504 may provide on-board communication components, such as internal Wi-Fi antennas or other RATs to allow passengers to communicate with the ground-based base stations 502 based on ATG communication. Data traffic that may be carried over ATG communications may include aircraft passenger communications (e.g., communications associated with the passenger devices, which may be available en route, during takeoff, landing, climb, and/or descent), airline operation communications (e.g., aircraft maintenance information, flight planning information, weather information, etc.), and/or air traffic control communications (e.g., the ATG communications may serve as a backup to systems operating in aviation licensed bands).

As described herein, the aerial devices may also exchange communication with ground-based UEs, and may relay communication between the ground-based UEs and the ground-based base stations, in accordance with aspects presented herein.

Figure 6:
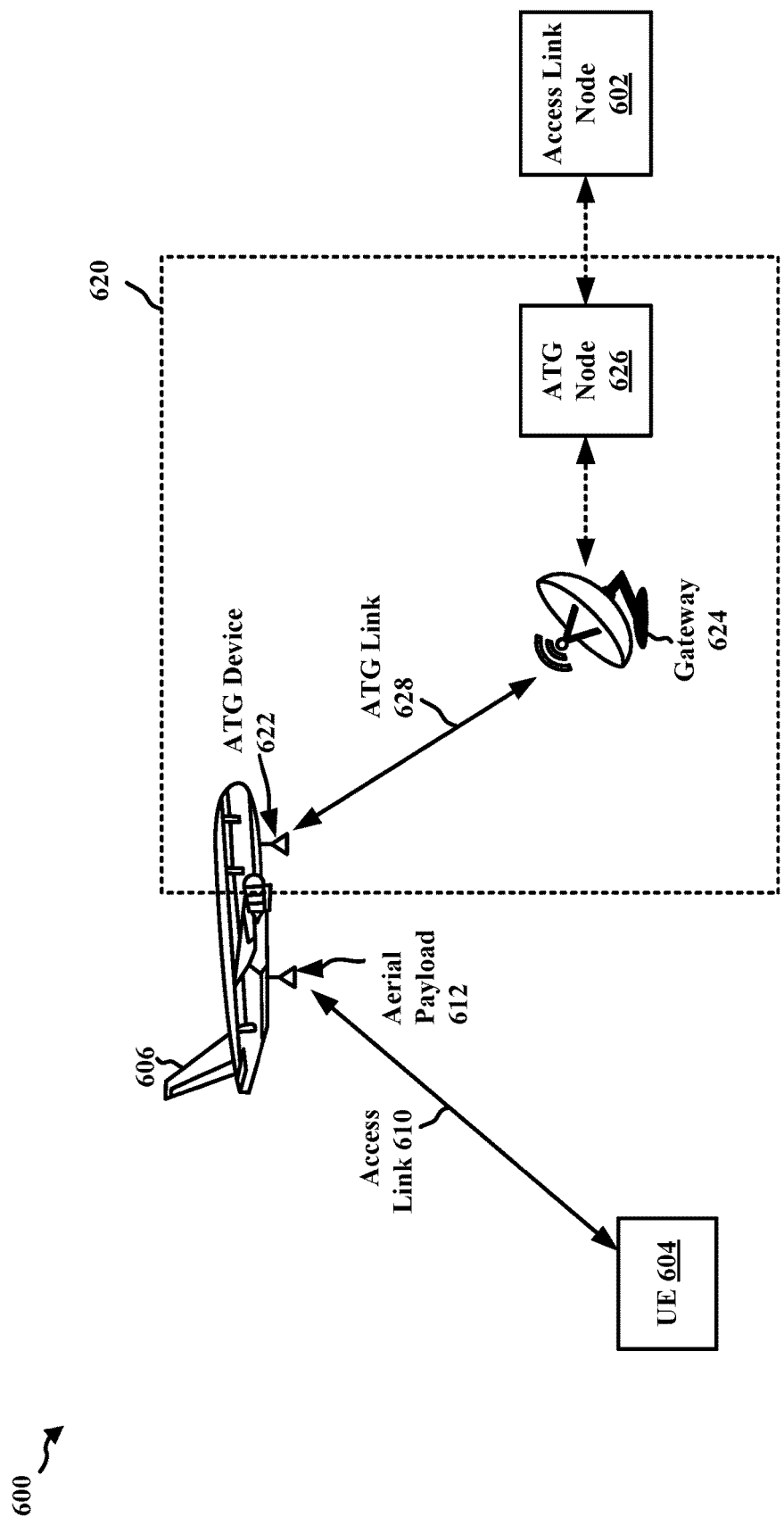
FIG. 6 illustrates example aspects of a network architecture with the capability to support message-relaying for a ground-based UE, in accordance with various aspects of the present disclosure.

FIG. 6 illustrates example aspects of a network architecture 600 with the capability to support message-relaying for a ground-based UE 604, as presented herein. For example, the messages may include an SMS message, an emergency message (e.g., an SOS message), a text message, a voice call, a public safety message, high priority communication, or other communication. In the illustrated example of FIG. 6, the network architecture 600 facilitates message-relaying via an aerial device 606 using 5G NR and an ATG communication system. Although the aspects are described using the example of 5G NR to facilitate communication between the ground-based UE 604 and the aerial device 606, similar network implementations and configurations may be used for other communication technologies, such as 3G, 4G LTE, etc.

The network architecture 600 of FIG. 6 includes the ground-based UE 604, the aerial device 606, an ATG communication system 620, and an access link node 602. The access link node 602 includes the capability to communicate with the ground-based UE 604 via the aerial device 606 and the ATG communication system 620.

In some examples, the access link node 602 may correspond to at least a base station. For example, the access link node 602 may include a distributed unit (DU) and a central unit (CU). In some examples, the access link node 602 may correspond to at least a core network (CN) and/or a data network (DN). The ground-based UE 604 may be configured to communicate with the access link node 602 via the aerial device 606.

The aerial device 606 provides connectivity to the ground-based UE 604 that is out-of-coverage of a terrestrial network (e.g., the access link node 602). For example, the aerial device 606 may receive messages from and/or transmit messages to the ground-based UE 604 via an access link 610. The access link 610 may be based on a Uu interface. In some examples, the aerial device 606 may periodically transmit a set of signals or information, e.g., SSB, MIB, or SIB1, in order to provide the information for the ground-based UE 604 to access the terrestrial network (e.g., the access link node 602). By using a Uu interface for the access link 610, the ground-based UE 604 may transmit messages and/or receive messages with no or minimal changes to the behavior of the ground-based UE 604 compared to when the ground-based UE 604 is communicating directly with the access link node 602 (e.g., without relaying the messages via the aerial device 606).

To relay messages between the ground-based UE 604 and the access link node 602, the aerial device 606 employs the ATG communication system 620. In the illustrated example of FIG. 6, the ATG communication system 620 includes an aircraft-borne ATG device 622, a ground-based gateway 624, and an ATG node 626. However, in other examples, the ATG communication system may include additional or alternative components to facilitate ATG communication. A link between the aircraft-borne ATG device 622 and the ground-based gateway 624 may be referred to as an ATG link 628, and communication over the ATG link 628 may be referred to as ATG communication.

The aircraft-borne ATG device 622 (sometimes referred to as an "on-board ATG device") may be a device deployed on-board the aerial device 606 and configured to communicate ATG messages with the ATG node 626 via the ground-based gateway 624. For example, the aircraft-borne ATG device 622 may use a protocol stack associated with ATG communication (e.g., an ATG protocol stack) to communicate ATG messages that may be carried via the ATG link 628. In additional examples, the aircraft-borne ATG device 622 may be configured to decode a message received from the ATG node 626 via the ATG link 628. For example, the aircraft-borne ATG device 622 may be configured to receive an ATG message and use the ATG protocol stack to determine how to process and decode the received ATG message.

Aspects disclosed herein may use the ATG link to carry traffic in the feeder link between the aerial device and the ground-based gateway. For example, the ATG communication system 620 may carry messages between the aerial device 606 and the access link node 602. Additionally, the ground-based UE 604 may communicate messages with the aerial device 606 via a service link. For example, the access link 610 (e.g., a Uu link or a radio link) may carry messages between the ground-based UE 604 and the aerial device 606 based on an access link protocol stack. Thus, the aerial device 606 acts as a mobile relay to provide connectivity to a ground-based UE 604 that is out-of-coverage of a terrestrial network, and the aerial payload 612 uses at least part of the Uu protocol layers over the access link 610 to relay the communication to and from the ground-based UE 604. The aerial payload 612 also uses the ATG communication system 620 to relay the communication to and from the access link node 602.

A transparent payload (e.g., an RF repeater) on-board the aerial device 606 to receive a message from the ground-based UE 604 and/or to transmit a message to the ground-based UE 604 may be unable to connect the ground-based UE 604 to the access link node 602 in scenarios including a large distance between the ground-based UE 604 and the aerial device 606 and/or between the aerial device 606 and the access link node 602. Thus, aspects disclosed herein include techniques to provide on-board processing to the aerial device 606.

In the illustrated example of FIG. 6, the aerial device 606 includes an aerial payload 612. The aerial payload 612 may include a network node deployed on-board the aerial device 606 and configured to serve at least the ground-based UE 604 via the access link 610. In some examples, the aerial payload 612 and the access link node 602 may be part of a RAN (e.g., an NG RAN).

As described herein, the aerial payload 612 may provide on-board processing to the aerial device 606 by implementing one or more aspects of a base station associated with the terrestrial network. In some examples, the aerial payload 612 may be configured to generate a new physical signal communicating between the access link 610 and the ATG communication system 620 and, thus, may be referred to as a "regenerative payload." For example, while a transparent payload may receive a first communication and repeat the first communication to a ground-based device, the example aerial payload 612 may receive the first communication via the access link 610, process at least a portion of the first communication, generate a second communication based in part on the processed portion of the first communication, and then transmit the second communication via the ATG communication system 620.

In some examples, the aerial payload 612 may include a base station (e.g., a distributed unit (DU) and a central unit (CU)) that is in communication with the access link node 602 via the ATG link 628 (e.g., as described in connection with the example of FIG. 11). In such examples, the access link node 602 may include a core network (e.g., the example core network 190 of FIG. 1) deployed on the ground.

In some examples, the aerial payload 612 may include a base station (e.g., a DU and a CU) configured to relay messages without communicating with a ground-based core network (e.g., as described in connection with the examples of FIG. 12 and/or FIG. 13). For example, the aerial payload 612 may include some capabilities of the core network to decode a message received from the ground-based UE 604 via the access link 610 and generate an ATG message for communicating via the ATG communication system 620 to the access link node 602. In other examples, the aerial payload 612 may include some capabilities of the core network to encode a message for transmitting to the ground-based UE 604 via the access link 610 based on an ATG message received via the ATG communication system 620 from the access link node 602.

In some examples, the aerial payload 612 and the access link node 602 may implement a disaggregated RAN including a split architecture. For example, the aerial payload 612 may include a radio unit (RU) in communication with the access link node 602 via the ATG communication system 620 (e.g., as described in connection with an example of FIG. 10). The access link node 602 may include a base station corresponding to the RU of the aerial payload 612 and/or a core network deployed on the ground. Aspects of the RU may be implemented by the example RU 109 of FIG. 1.

In some examples, the aerial payload 612 may include a DU that is connected to a corresponding CU on the ground via an F1 interface carried by the ATG communication system 620 (e.g., as described in connection with the example of FIG. 14). For example, the access link node 602 may include at least the corresponding CU and/or the core network. Aspects of the DU may be implemented by the DU 105 of FIG. 1. Aspects of the CU may be implemented by the CU 106 of FIG. 1.

In some examples, the aerial payload 612 may terminate the radio interface and associated radio interface protocols to the ground-based UE 604, and the aerial payload 612 may transmit downlink signals to the ground-based UE 604, and/or may receive uplink signals from the ground-based UE 604. The aerial payload 612 may also support signaling connections and voice and data bearers to the ground-based UE 604.

In some examples, the aerial payload 612 may be in communication with the aircraft-borne ATG device 622 via a communication link. The communication may be through a variety of wireless communication systems, such as WiMedia, Bluetooth, ZigBee, Wi-Fi, etc. In some examples, the communication between the aerial payload 612 and the aircraft-borne ATG device 622 may be through a variety of wired communication systems, such as an Ethernet interface, etc. In some examples, the aerial payload 612 and the aircraft-borne ATG device 622 may be integrated together.

Figure 7:
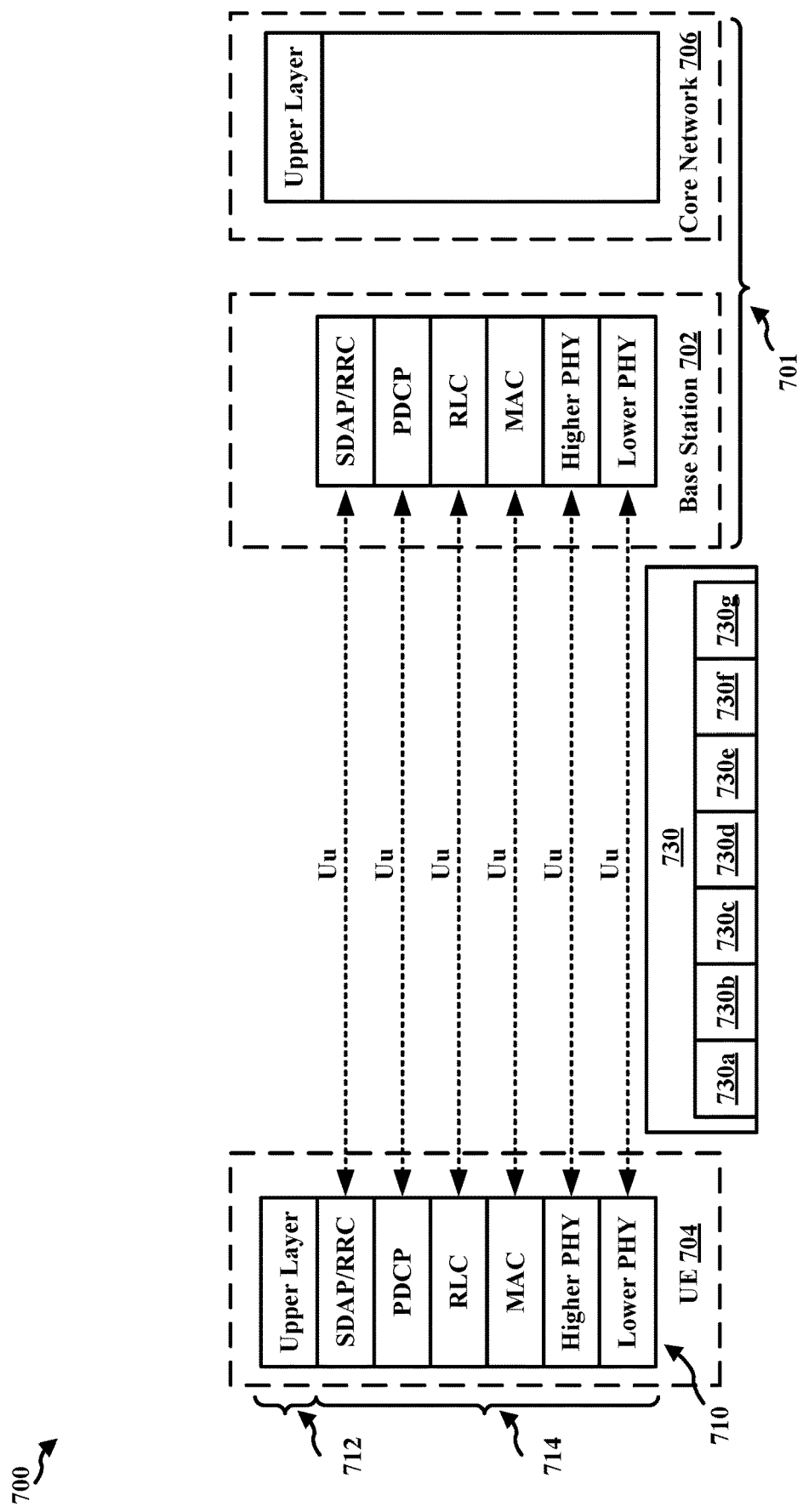
FIG. 7 is a diagram of an example deployment and protocol stack facilitating an access link connection between a UE and a network (e.g., a terrestrial network), in accordance with various aspects of the present disclosure.

FIG. 7 is a diagram 700 of an example deployment and protocol stack facilitating an access link connection between a UE 704 and a network 701 (e.g., a terrestrial network), as presented herein. In the illustrated example, the network 701 includes a base station 702 and a core network 706. However, other examples may include additional or alternative components. The base station 702 may provide the UE 704 access to the network 701, as described in connection with the example of FIG. 1. Aspects of the base station 702 may be implemented by the base station 102/180 of FIG. 1 and/or the base station 310 of FIG. 3. Aspects of the core network 706 may be implemented by the example core network 190 of FIG. 1.

In the illustrated example of FIG. 7, aspects of the access link connection may be implemented by an example protocol stack 710. The example protocol stack 710 includes a non-access stratum layer (e.g., a NAS layer 712) and an access stratum layer (e.g., an AS layer 714). The NAS layer 712 includes an upper layer configured to manage application data and/or NAS layer control signaling. For example, the upper layer may be configured to carry application data between the UE 704 and an application server of the core network 706. The upper layer may use the lower layers (e.g., the AS layer 714) to provide a data transfer service.

As shown in FIG. 7, the AS layer 714 includes a service data adaptation protocol (SDAP) layer/RRC layer, a packet data convergence protocol (PDCP) layer, an RLC layer, a MAC layer, a higher physical (PHY) layer, and a lower PHY layer. The SDAP layer may be configured to carry user plane data between the UE 704 and the network 701. The RRC layer may be configured to carry control signaling between the UE 704 and the network 701. The PDCP layer may be configured to provide header compression, ciphering and integrity protection for user plane data and/or control signaling. The RLC layer may be configured to transfer user plane data and/or control signaling between the UE 704 and the network 701 in an unacknowledged mode or an acknowledged mode. The MAC layer may be configured to prioritize and multiplex logical channel data received from the RLC layer. The upper PHY layer and the lower PHY layer (sometimes referred to as the PHY layer or an L1 layer) is configured to provide physical layer processing as well as transmission and reception across an air-interface, channel coding, interleaving, and/or modulation onto air-interface resources.

A protocol of the protocol stack 710 may connect a layer of the UE 704 to the same layer of the network 701. The UE 704 and the network 701 each include a respective implementation of each protocol at each layer. Messages may be wrapped in, and then extracted from, these protocols. For example, in the uplink direction, an application may generate application data (e.g., via the upper layer) for transmitting from the UE 704 to the network 701. Each layer of the protocol stack may then process (e.g., encode, decode, map, etc.) a message received from a higher layer based on the respective protocol. For example, the RLC layer may process a message received from the PDCP layer and encapsulate the message based on an RLC protocol associated with the RLC layer. The RLC layer may then provide the RLC protocol encapsulated message to the MAC layer, which may process the received message and encapsulate the received message based on a MAC protocol associated with the MAC layer, etc., until the message is transmitted over an air-interface to the network 701 (e.g., the base station 702).

The layers at the network 701 may apply the respective protocols to extract respective information from the message received from a lower layer. For example, the RLC layer at the base station 702 may use the RLC protocol to extract information (e.g., decode information) from a message received from the MAC layer (e.g., extract the information encapsulated at the RLC layer of the UE 704). The RLC layer may then provide the remaining information (e.g., the non-decoded information or the unextracted information) to the PDCP layer of the base station 702 for further processing, etc., until the application data is received at the upper layer of the core network 706 for processing.

In the illustrated example of FIG. 7, the UE 704 hosts the NAS layer 712 and the AS layer 714 of the protocol stack 710. As shown in FIG. 7, the base station 702 hosts the AS layer 714 and the core network 706 hosts the NAS layer 712 of the protocol stack 710. Additionally, the AS layer 714 is defined between the UE 704 and the base station 702 (e.g., the AS layer 714 terminates at the UE 704 and the base station 702), while the NAS layer 712 is defined between the UE 704 and the core network 706 (e.g., the NAS layer 712 terminates at the UE 704 and the core network 706). However, other examples may include different architecture splits with respect to the protocol stack 710 at the network 701. As shown in FIG. 7, the AS layer 714 of the base station 702 and the UE 704 is connected via the Uu interface. The NAS layer 712 of the UE 704 may be connected to the network 701 via one or more interfaces, such as the Uu interface, the NG interface, etc.

In some examples, the UE 704 may be unaware of the split architecture with respect to the protocol stack 710 at the network 701. For example, the UE 704 may establish an access link with the network 701. Components of the network 701 may then handle encoding/decoding messages to/from the UE 704 in a transparent manner. For example, the base station 702 may receive a message 730 from the UE 704 and process portions of the message 730 at layers that terminate at the base station 702. Portions of the message 730 associated with layers of the protocol stack 710 that are not hosted by the base station 702 (e.g., the NAS layer 712 in the example of FIG. 7) are provided by the base station 702 to one or more other components of the network 701 with the capability to process the remaining portions. For example, the base station 702 may communicate the portions of the message 730 associated with the NAS layer 712 to the core network 706 for processing.

When a layer is defined (or terminates) between two devices, the respective devices process the received message at the respective layer based on the corresponding protocol while foregoing the processing at layers that do not terminate at the device. For example, in one example split architecture deployment, the lower PHY layer, the upper PHY layer, the MAC layer, and the RLC layer may terminate at the base station 702, while the PDCP layer, the SDAP layer/RRC layer, and the upper layer may terminate at another one or more nodes in communication with the base station 702, such as a central unit and/or the core network 706. The UE 704 may transmit a message 730 that is received by the base station 702. The message 730 may include a first portion 730a generated at the upper layer of the UE 704. The first portion 730a may include data generated by an application or a service at the UE 704. For example, the first portion 730a may include content of a text message or an SMS message. The SDAP layer/RRC layer of the UE 704 may receive the first portion 730a from the upper layer, process the first portion 730a, and provide a message including the first portion 730a and a second portion 730b to the PDCP layer. The message from the SDAP layer/RRC layer top the PDCP layer may be encoded based on the SDAP protocol/RRC protocol. The PDCP layer of the UE 704 may receive the message from the SDAP layer/RRC layer, process the received message, and provide a message including the first portion 730a, the second portion 730b, and a third portion 730c to the RLC layer. The message from the PDCP layer to the RLC layer may be encoded based on the PDCP protocol. In a similar manner, the RLC layer of the UE 704 may provide a message to the MAC layer including the first portion 730a, the second portion 730b, the third portion 730c, and a fourth portion 730d and that is encoded based on the RLC protocol.

The MAC layer of the UE 704 may provide a message to the higher PHY layer including the first portion 730a, the second portion 730b, the third portion 730c, the fourth portion 730d, and a fifth portion 730e and that is encoded based on the MAC protocol. The higher PHY layer of the UE 704 may provide a message to the lower PHY layer including the first portion 730a, the second portion 730b, the third portion 730c, the fourth portion 730d, the fifth portion 730e, and a sixth portion 730f and that is encoded based on the higher PHY protocol. The lower PHY layer of the UE 704 may generate the message 730 including the first portion 730a, the second portion 730b, the third portion 730c, the fourth portion 730d, the fifth portion 730e, the sixth portion 730f, and a seventh portion 730g and that is encoded based on the lower PHY protocol.

At the receiver side, the network 701 may receive the message 730 at the base station 702. The lower PHY layer of the base station 702 may apply the lower PHY protocol to extract the seventh portion 730g from the message 730 for processing and provide a message including the remaining portions to the higher PHY layer. The higher PHY layer of the base station 702 may apply the higher PHY protocol to extract the sixth portion 730f from the message received from the lower PHY layer for processing and provide a message including the remaining portions of the message 730 to the MAC layer. The MAC layer of the base station 702 may apply the MAC protocol to extract the fifth portion 730e from the message received from the higher PHY layer for processing and provide a message including the remaining portions of the message 730 to the RLC layer. The RLC layer of the base station 702 may apply the RLC protocol to extract the fourth portion 730d from the message received from the MAC layer for processing.

As the remaining layers of the protocol stack (e.g., the PDCP layer, the SDAP layer/RRC layer, and the upper layer) do not terminate at the base station 702 in the above example, the base station 702 may transmit a communication to the core network 706. The communication may include the first portion 730a, the second portion 730b, and the third portion 730c that were skipped by the lower layers of the base station 702 for processing. In some examples, the base station 702 may map the decoded portions of the message 730 (e.g., the fourth portion 730d, the fifth portion 730e, the sixth portion 730f, and the seventh portion 730g) to the communication to the core network 706. For example, the communication to the core network 706 may include encoded portions (e.g., the first portion 730a, the second portion 730b, and the third portion 730c) and decoded portions (e.g., the fourth portion 730d, the fifth portion 730e, the sixth portion 730f, and the seventh portion 730g) of the message 730. In another example, the communication to the core network 706 may include encoded portions (e.g., the first portion 730a, the second portion 730b, and the third portion 730c), which were transmitted over the decoded portions (e.g., the fourth portion 730d, the fifth portion 730e, the sixth portion 730f, and the seventh portion 730g) of the message 730.

In some examples, one or more layers of the protocol stack (e.g., at the UE 704 and/or the network 701) may be configured to be transparent. In some such scenarios, a transparent layer may pass a message received from a first layer to a second layer without processing. For example, the RLC layer may be configured to be a transparent layer. In such examples, and in the uplink direction, the RLC layer of the UE 704 may receive a message from the PDCP layer including the first portion 730a, the second portion 730b, and the third portion 730c. The RLC layer may then pass the message to the MAC layer without processing the message from the PDCP layer and without encapsulating the message based on the RLC protocol. For example, the message 730 may exclude the fourth portion 730d when the RLC layer is configured to be a transparent layer.

Although the example of FIG. 7 illustrates the core network 706 including the upper layer of the NAS layer 712, other examples may include additional or alternative example layers at the core network 706, such as one or more layers of the AS layer 714.

Figure 8:
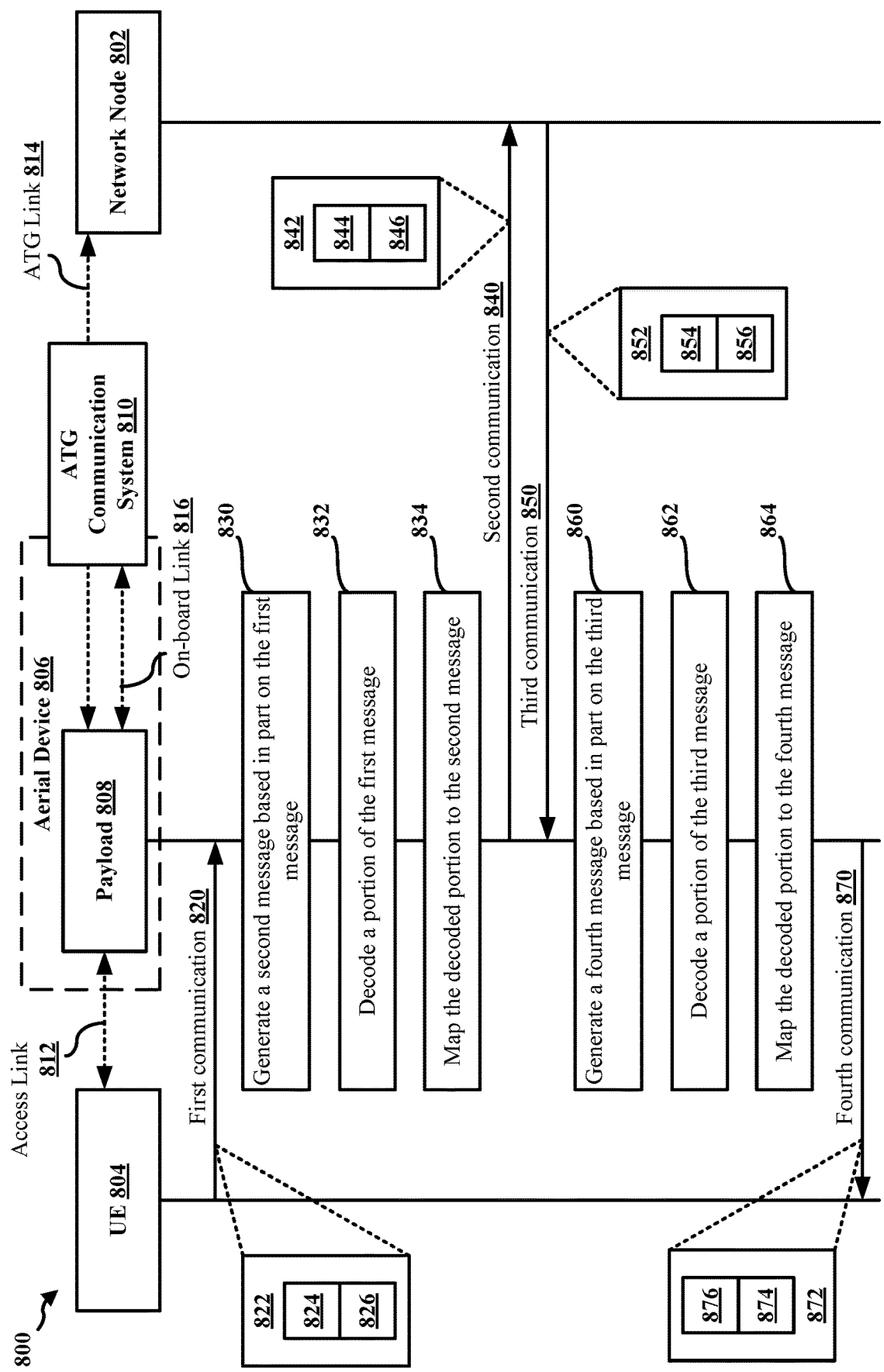
FIG. 8 is an example communication flow between a UE, an aerial device, and a network node, in accordance with various aspects of the present disclosure.

FIG. 8 is an example communication flow 800 between a UE 804, an aerial device 806, and a network node 802, as presented herein. Aspects of the UE 804 may be implemented by a ground-based UE, such as the example ground-based UE 604 and/or the example UE 704. Aspects of the aerial device 806 may be implemented by the example aerial device 606. Aspects of the network node 802 may be implemented by the access link node 602, the base station 702, and/or the core network 706. Although not shown in the illustrated example of FIG. 8, in additional or alternative examples, the UE 804 may be in communication with one or more other network nodes, aerial devices, and/or access link nodes, the aerial device 806 may be in communication with one or more other UEs, network nodes, and/or access link nodes, and/or the network node 802 may be in communication with one or more UEs, network nodes, and/or aerial devices.

In the illustrated example, the communication flow 800 supports access link and ATG-based message-relaying between the UE 804 and a terrestrial network. For example, the aerial device 806 acts as a mobile relay to provide connectivity to the UE 804 that is out-of-coverage of a terrestrial network (e.g., the network node 802) via an ATG link. The aerial device 806 may be referred to by various names including an aerial mobile relay, an aerial relay node, an aircraft mounted relay, an aircraft-borne relay, among other examples.

In the illustrated example of FIG. 8, the aerial device 806 is in communication with the UE 804 via an access link 812 (e.g., a Uu link and/or a radio link). The example aerial device 806 is also in communication with the network node 802 via an ATG communication system 810 that provides an ATG link 814. The network node 802 may include a ground-based node. The example ATG communication system 810 may include an aircraft-borne ATG device (e.g., the example aircraft-borne ATG device 622), a ground-based gateway (e.g., the example ground-based gateway 624), and/or a ground-based ATG node (e.g., the example ATG node 626).

Unlike an aerial device with a transparent payload (e.g., an RF repeater) configured to relay ground-based communications, the example aerial device 806 of FIG. 8 includes a payload 808 that may be referred to as a "regenerative payload" and that is configured to serve at least the UE 804 via the access link 812. The payload 808 may provide on-board processing of communications that may increase a likelihood of successful communication between the UE 804 and the network node 802. For example, the payload 808 may provide on-board processing to map messages for communication via the access link 812 and the ATG communication system 810 (e.g., the ATG link 814). In some examples, the payload 808 may be configured to generate a new physical signal for communicating between the access link 812 and the ATG communication system 810. For example, while a transparent payload may receive a first communication and repeat the first communication to a ground-based device, the example payload 808 of FIG. 8 may receive the first communication via the access link 812, process at least a portion of the first communication, generate a second communication based in part on the processed portion of the first communication and so that the second communication may be transmitted via the ATG communication system 810, and then transmit the second communication via the ATG communication system 810 so that the second communication includes the information of the first communication. In some examples, the first communication and the second communication may be communicated based on different protocol stacks. For example, the first communication may be encoded based on a first protocol stack (e.g., the example protocol stack 710 of FIG. 7) and the second communication may be encoded based on a second protocol stack (e.g., an ATG protocol stack).

In some examples, the payload 808 may include a base station. In some examples, the on-board base station may be connected to a core network deployed on the ground. For example, and referring to the example of FIG. 7, the base station 702 may be an aircraft-borne base station and may be connected to the core network 706 via the ATG communication system 810 of FIG. 8. In other examples, the on-board base station may not be connected to a core network deployed on the ground. For example, and in connection with the example of FIG. 7, the payload 808 may include the base station 702 and at least some capabilities of the core network 706 so that the payload 808 is able to decode the message 730 instead of a portion of the message 730.

In some examples, the payload 808 may include a base station with a split architecture (e.g., a disaggregated RAN). For example, the payload 808 may include an on-board RU and the corresponding base station may be deployed on the ground (e.g., the network node 802). In such examples, the on-board RU may have the capability to process the lower PHY layer of the protocol stack 710 and the network node 802 may process the remaining portions of a message. In other examples, the payload 808 may include a DU and the corresponding CU may be deployed on the ground (e.g., the network node 802). In such examples, the on-board DU may have the capability to process a subset of the layers of the protocol stack 710 and the network node 802 may process the remaining layers of the protocol stack 710. However, it may be appreciated that other examples may deploy additional or alternate split architecture deployments of the protocol stack 710 between the payload 808 and the network node 802.

As shown in FIG. 8, the payload 808 may communicate with the ATG communication system 810 using an on-board link 816. For example, the payload 808 may communicate with the aircraft-borne ATG device of the ATG communication system 810 via the on-board link 816. In some examples, the on-board link 816 may include a wireless communication system. In some examples, the on-board link 816 may include a wired communication system. In some examples, the payload 808 and the aircraft-borne ATG device of the ATG communication system 810 may be integrated together.

In the illustrated example of FIG. 8, the UE 804 transmits a first communication 820 that is received by the aerial device 806 (e.g., the payload 808). The UE 804 may transmit the first communication 820 via the access link 812. As shown in FIG. 8, the first communication 820 includes a first message 822 including at least a first portion 824 and a second portion 826. The first message 822 may be encoded based on the example protocol stack 710 of FIG. 7. For example, the first portion 824 may include one or more portions of the message 730 and the second portion 826 may include the remaining portions of the message 730. In some examples, the first message 822 may include an SMS message, an emergency message (e.g., an SOS message), a text message, a voice call, a public safety message, high priority communication, or other communication.

The payload 808 generates, at 830, a second message 842 based in part on the first message 822. The payload 808 may generate the second message 842 to facilitate transmitting the first message 822 to the network node 802 via the ATG communication system 810. For example, the payload 808 may decode, at 832, the first portion 824 of the first message 822. In some examples, the decoding of the first portion 824 may be based on the processing capabilities of the payload 808. For example, in some examples, the payload 808 may be configured to decode a subset of layers of the AS layer of the first message 822. In some examples, the payload 808 may be configured to decode the AS layer of the first message 822. In some examples, the payload 808 may be configured to decode the AS layer and the NAS layer of the first message 822. Aspects of decoding a portion of the first message 822 are described in connection with the example portions of the message 730 of FIG. 7.

The payload 808 may also map, at 834, the decoded portion of the first message 822 to the second message 842. For example, messages communicated via the access link 812 may be encoded based on a first protocol stack (e.g., the example protocol stack of FIG. 7) and messages communicated via the ATG communication system 810 may be encoded based on a second protocol stack (e.g., an example ATG protocol stack). The payload 808 may map (or encode) the decoded portion of the first message 822 (e.g., the first portion 824 at 832) to the second message 842 using the ATG protocol stack to facilitate transmitting the second message 842 over the ATG communication system 810. As shown in FIG. 8, the second message 842 includes a first portion 844 and a second portion 846. The first portion 844 of the second message 842 may include the mapped portion of the decoded portion of the first message 822 (e.g., the first portion 824). The second portion 846 of the second message 842 may include the non-decoded portion of the first message 822 (e.g., the second portion 826).

As shown in FIG. 8, the payload 808 transmits a second communication 840 that is received by the network node 802. The second communication 840 includes the second message 842. The payload 808 may transmit the second communication 840 to the network node 802 using the ATG communication system 810.

In the above example, the payload 808 facilitates relaying the first message 822 from the UE 804 to the network node 802 via the access link 812 and the ATG communication system 810.

In another example, the payload 808 may facilitate relaying a message from the network to the UE via the access link 812 and the ATG communication system 810. For example, the network node 802 may transmit a third communication 850 that is received by the aerial device 806 (e.g., the payload 808). The network node 802 may transmit the third communication 850 via the ATG communication system 810. As shown in FIG. 8, the third communication 850 includes a third message 852 including at least a first portion 854 and a second portion 856. The third message 852 may be encoded based on ATG protocol stack. In some examples, the third message 852 may include an SMS message, an emergency message (e.g., an SOS message), a text message, a voice call, a public safety message, high priority communication, or other communication.

The payload 808 generates, at 860, a fourth message 872 based in part on the third message 852. The payload 808 may generate the fourth message 872 to facilitate transmitting the third message 852 to the UE 804 via the access link 812. For example, the payload 808 may decode, at 862, the first portion 854 of the third message 852. Similar to the example of decoding a portion of the first message 822 (e.g., at 832), the decoding of the first portion 854 of the third message 852 may be based on the processing capabilities of the payload 808.

The payload 808 may also map, at 864, the decoded portion of the third message 852 to the fourth message 872. For example, the payload 808 may encode portions of the third message 852 based on the protocol stack 710 of FIG. 7 to facilitate transmitting the fourth message 872 to the UE 804 using the access link 812. As shown in FIG. 8, the fourth message 872 includes a first portion 874 and a second portion 876. The first portion 874 of the fourth message 872 may include the mapped portion of the decoded portion of the third message 852 (e.g., the first portion 854). The second portion 876 of the fourth message 872 may include the non-decoded portion of the third message 852 (e.g., the second portion 856).

As shown in FIG. 8, the payload 808 transmits a fourth communication 870 that is received by the UE 804. The fourth communication 870 includes the fourth message 872. The payload 808 may transmit the fourth communication 870 to the UE 804 using the access link 812. Thus, the payload 808 may facilitate relaying a message (e.g., the third message 852) from the network (e.g., the network node 802) to the UE 804 via the access link 812 and the ATG communication system 810.

As described above, the decoding abilities of the payload 808 (e.g., at 832 and/or at 862) may be based on the on-board processing capabilities of the payload 808. For example, aspects of the network node 802 may be deployed on-board the aerial device 806 with the payload 808.

FIGS. 9A, 9B, 9C, and 9D illustrate example aspects of network architectures with the capability to support message-relaying for a ground-based UE 904, as presented herein. For example, the messages may include an SMS message, an emergency message (e.g., an SOS message), a text message, a voice call, a public safety message, high priority communication, or other communication. In the illustrated examples of FIGS. 9A, 9B, 9C, and 9D, the network architectures facilitate message-relaying via an aerial device 906 using 5G NR and an ATG communication system. Although the aspects are described using the example of 5G NR to facilitate communication between the ground-based UE 904 and the aerial device 906, similar network implementations and configurations may be used for other communication technologies, such as 3G, 4G LTE, etc.

The network architectures of FIGS. 9A, 9B, 9C, and 9D include the ground-based UE 904, the aerial device 906, an ATG node 926, and/or an access link node 902. The access link node 902 includes the capability to communicate with the ground-based UE 904 via the aerial device 906 via an access link 910 and an ATG link 928. Aspects of the ground-based UE 904 may be implemented by the ground-based UE 604 of FIG. 6. Aspects of the aerial device 906 may be implemented by the aerial device 606 of FIG. 6. Aspects of the ATG node 926 may be implemented by the ATG node 626 of FIG. 6. Aspects of the access link node 902 may be implemented by the access link node 602 of FIG. 6.

As described herein, the aerial device 906 may provide on-board processing by implementing one or more aspects of a base station associated with the terrestrial network. In some examples, the aerial device 906 may be configured to generate a new physical signal communicating between the access link 910 and the ATG node 926 and, thus, may be referred to as a "regenerative payload." For example, while a transparent payload may receive a first communication and repeat the first communication to a ground-based device, the example aerial device 906 may receive the first communication via the access link 910, process at least a portion of the first communication, generate a second communication based in part on the processed portion of the first communication, and then transmit the second communication via the ATG link 928.

Figure 9A:
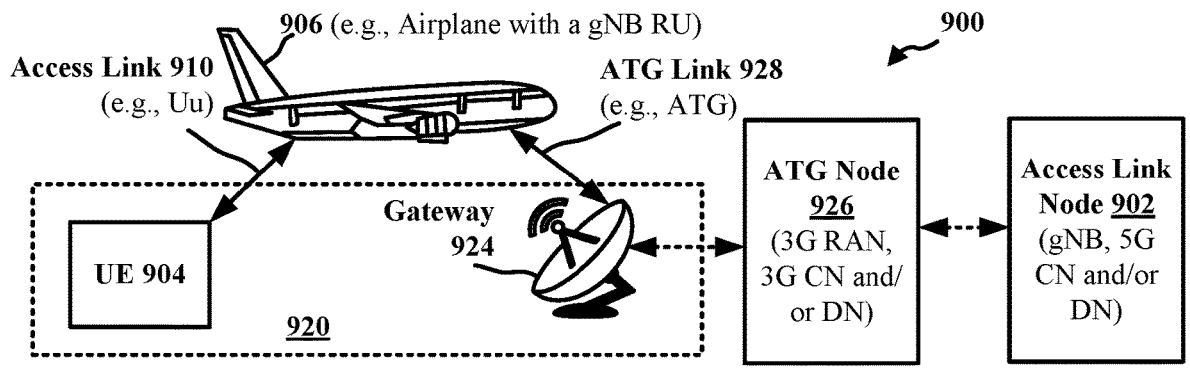
FIG. 9A is a diagram of an example deployment and protocol stack supporting message-relaying between a ground-based UE and a network node that is ground-based using an aircraft-borne payload, in accordance with various aspects of the present disclosure.

FIG. 9A illustrates an example deployment 900 in which the aerial device 906 and the access link node 902 may implement a disaggregated RAN including a split architecture. For example, the aerial device 906 may include an RU in communication with the access link node 902 via the ATG link 928 (e.g., as described in connection with an example of FIG. 10). The access link node 902 may include a base station corresponding to the RU of the aerial device 906 and/or a core network deployed on the ground, e.g., via the gateway 924. Aspects of the RU may be implemented by the example RU 109 of FIG. 1. In the illustrated example of FIG. 9A, the aerial device 906 may be implemented by an airplane with a gNB RU, the ATG node 926 may be implemented by a 3G RAN, a 3G CN, and/or a data network (DN) (e.g., an Internet network), and the access link node 902 may be implemented by a gNB (e.g. gNB DU and gNB CU), a 5G CN, and/or a DN. The UE 904 and the gateway 924 may be ground-based components, e.g., as shown by 920.

Figure 9B:
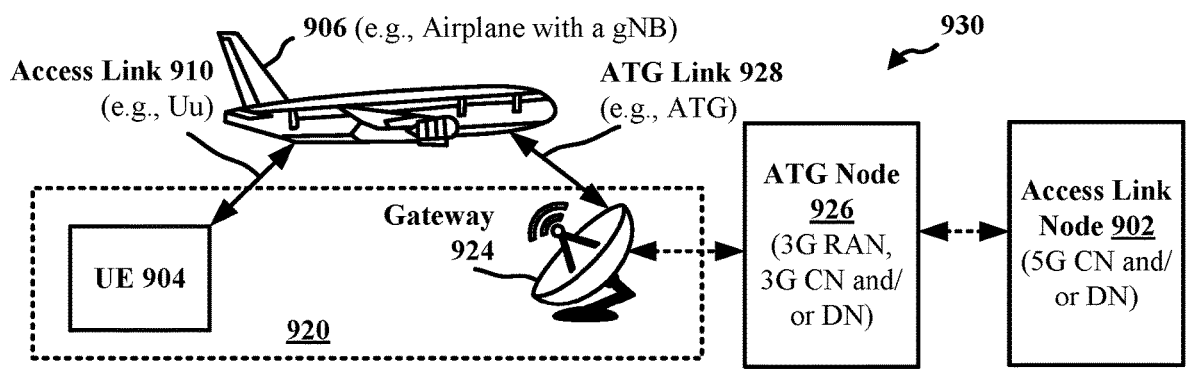
FIG. 9B is a diagram of an example deployment and protocol stack supporting message-relaying between a ground-based UE and a network (e.g., a terrestrial network) using an aircraft-borne payload, in accordance with various aspects of the present disclosure.

FIG. 9B illustrates an example deployment 930 in which the aerial device 906 includes a base station (e.g., a distributed unit (DU) and a central unit (CU)) that is in communication with the access link node 902 via the ATG link 928 (e.g., as described in connection with the example of FIG. 11). In such examples, the access link node 602 may include a core network (e.g., the example core network 190 of FIG. 1) deployed on the ground. In the illustrated example of FIG. 9B, the aerial device 906 may be implemented by an airplane with a gNB, the ATG node 926 may be implemented by a 3G RAN, a 3G CN, and/or a DN, and the access link node 902 may be implemented by a 5G CN and/or a DN.

Figure 9C:
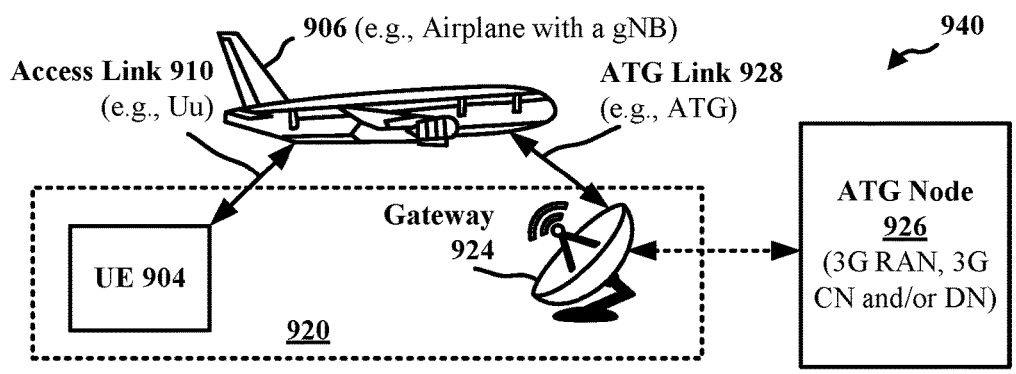
FIG. 9C is a diagram of an example deployment and protocol stack supporting message-relaying between a ground-based UE and a network node that is ground-based using an aircraft-borne payload, in accordance with various aspects of the present disclosure.

FIG. 9C illustrates an example deployment 940 in which the aerial device 906 includes a base station (e.g., a DU and a CU) configured to relay messages without communicating with a ground-based core network (e.g., as described in connection with the examples of FIG. 12 and/or FIG. 13). For example, the aerial device 906 may include at least some capabilities of the core network and/or data network to decode a message received from the ground-based UE 904 via the access link 910 and generate an ATG message for communicating via the ATG link 928 to the ATG node 926. In other examples, the aerial device 906 may include some capabilities of the core network and/or data network to encode a message for transmitting to the ground-based UE 904 via the access link 910 based on an ATG message received via the ATG link 928 from the ATG node 926.

Figure 9D:
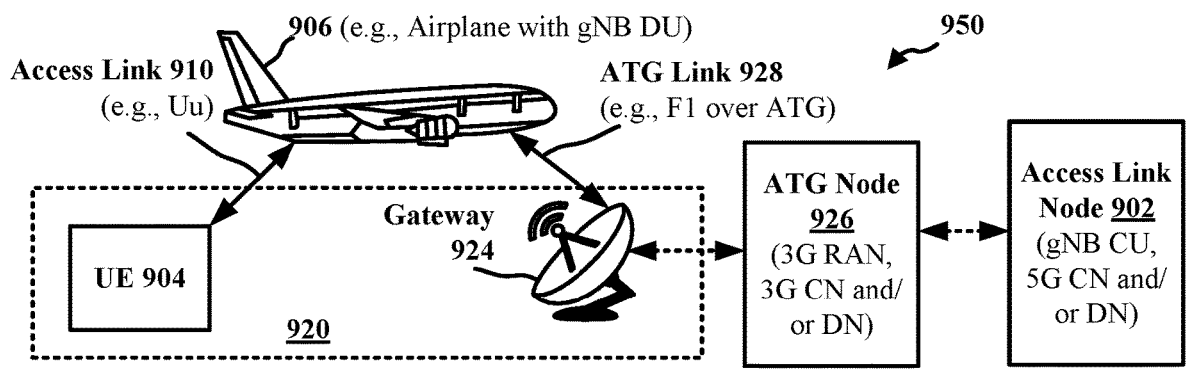
FIG. 9D is a diagram of an example deployment and protocol stack supporting message-relaying between a ground-based UE and a network node that is ground-based using an aircraft-borne payload, in accordance with various aspects of the present disclosure.

FIG. 9D illustrates an example deployment 950 in which the aerial device 906 may include a distributed unit (DU) that is connected to a corresponding central unit (CU) on the ground via an F1 interface carried by the ATG link 928 (e.g., as described in connection with the example of FIG. 14). For example, the access link node 902 may include at least the corresponding CU and/or the core network. Aspects of the DU may be implemented by the DU 105 of FIG. 1. Aspects of the CU may be implemented by the CU 106 of FIG. 1. In the illustrated example of FIG. 9D, the aerial device 906 may be implemented by an airplane with a gNB DU, the ATG node 926 may be implemented by a 3G RAN, a 3G CN, and/or a DN, the access link node 902 may be implemented by a gNB CU, 5G CN and/or a DN, and the ATG link 928 may be implemented by an F1 interface over ATG.

Figure 10:
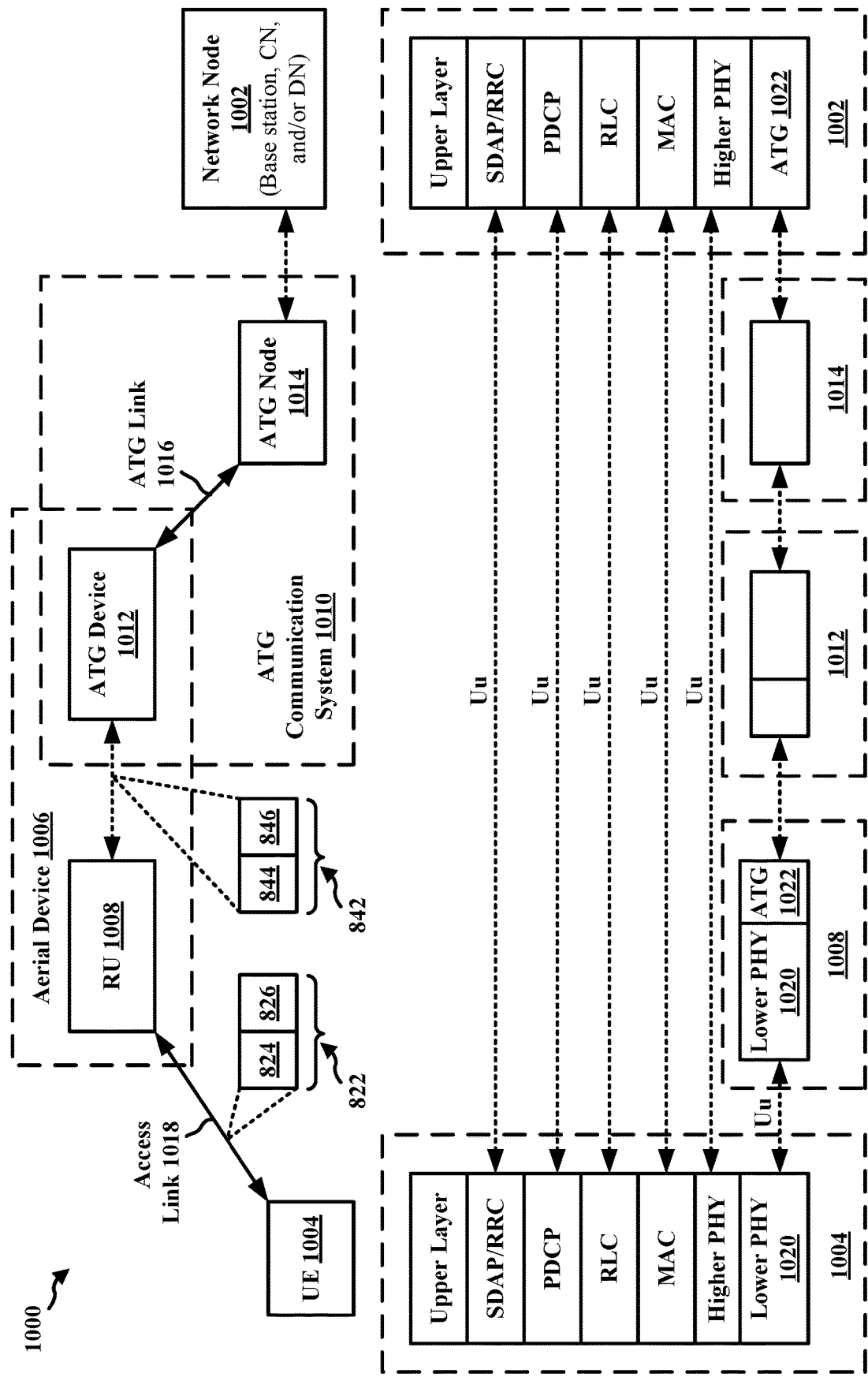
FIG. 10 is a diagram of an example deployment and protocol stack supporting message-relaying between a ground-based UE and a network node that is ground-based using an aircraft-borne payload, in accordance with various aspects of the present disclosure.

FIG. 10 is a diagram 1000 of an example deployment and protocol stack supporting message-relaying between a ground-based UE 1004 and a network node 1002 that is ground-based using an aircraft-borne payload, as presented herein. In the illustrated example of FIG. 10, an example aerial device 1006 facilitates the message-relaying between the ground-based UE 1004 and the network node 1002. For example, the aerial device 1006 is in communication with the ground-based UE 1004 via an access link 1018 (e.g., a Uu link or a radio link). The aerial device 1006 is in communication with the network node 1002 via an ATG communication system 1010. The example ATG communication system 1010 includes an ATG device 1012 that is on-board the aerial device 1006, an ATG node 1014 that is ground-based, and an ATG link 1016 connecting the ATG device 1012 and the ATG node 1014.

As described above, in some examples, a RAN may be disaggregated with a split between an RU and an aggregated CU/DU. In the example of FIG. 10, the aerial device 1006 includes an aircraft-borne remote unit (e.g., an RU 1008). The RU 1008 may provide a logical node configured to host at least a portion of the PHY layer and RF processing. For example, the RU 1008 may have the capability to process the lower PHY layer of the protocol stack 710, e.g., to modulate/demodulate, to encode/decode, etc. The network node 1002 may include the base station corresponding to the RU 1008 (e.g., a CU and a DU). The network node 1002 may also include a core network and/or a data network to facilitate processing of higher layers of the protocol stack 710.

In the illustrated example of FIG. 10, the RU 1008 on-board the aerial device 1006 is connected to the base station on the ground (e.g., the network node 1002) via the ATG communication system 1010. The RU 1008 may be in communication with the ATG communication system 1010 (e.g., the ATG device 1012) via a wireless communication system (e.g., Wi-Fi, etc.), a wired communication system (e.g., Ethernet, etc.), or by being integrated together.

The RU 1008 converts a communication (e.g., a signal, a command, a message, etc.) from the ATG communication system 1010 to the access link 1018 and vice versa. For example, and in connection with the example communication flow 800 of FIG. 8, the ground-based UE 1004 may transmit the first message 822 that is received by the RU 1008. The first message 822 may be encoded based on the example protocol stack 710 of FIG. 7. For example, the first message 822 may include a NAS layer and an AS layer.

In the example of FIG. 10, a lower PHY layer 1020 is defined between the ground-based UE 1004 and the RU 1008. That is, the RU 1008 may be configured to decode the portion of the first message 822 corresponding to the lower PHY layer 1020. In the example of FIG. 10, the first portion 824 of the first message 822 may correspond to the lower PHY layer 1020 and the second portion 826 of the first message 822 may correspond to the remaining layers of the first message 822.

After decoding the first portion 824 of the first message 822, the RU 1008 may map the decoded portion to the second message 842. For example, the RU 1008 includes an ATG layer 1022 that is defined between the RU 1008 and the network node 1002. The ATG layer 1022 at the RU 1008 may encode the decoded portion using an ATG protocol stack. In the example of FIG. 10, the RU 1008 may map the encoded portion to the first portion 844 of the second message 842. The RU 1008 may map the non-decoded portion of the first message 822 (e.g., the second portion 826) to the second portion 846 of the second message 842. The RU 1008 may then transmit a communication including the second message 842 to the network node 1002 using the ATG communication system 1010.

In the example deployment and protocol stack of FIG. 10, the ground-based UE 1004 may transmit the first message 822 in a manner similar to when transmitting a message directly to the network node 1002 (e.g., without using the aerial device 1006 to relay the message to the network node 1002). The RU 1008 and the network node 1002 may include the ATG layer 1022 to facilitate processing (e.g., encoding, decoding, mapping, etc.) messages based, at least in part, on the ATG protocol stack. For example, the network node 1002 may receive the second message 842 and use the ATG layer 1022 to decode the first portion 844 of the second message 842. The network node 1002 may decode the remaining portions of the second message 842 (e.g., the second portion 846) based on the example of the protocol stack 710 of FIG. 7.

Although the example network node 1002 of FIG. 10 includes the ATG layer 1022, it may be appreciated that the infrastructure of the network node 1002 may be deployed at different locations with one or more connections and transport layers to connect the different protocol layers shown in the example of FIG. 10. For example, a first physical entity may host the ATG layer 1022 and may be deployed in a different location than a second physical entity that may be hosting one or more of the layers above the ATG layer 1022 (e.g., the upper layer, the SDAP layer/RRC layer, the PDCP layer, the RLC layer, the MAC layer, and the higher physical layer). Thus, the first physical entity hosting the ATG layer 1022 may be connected with the second physical entity hosting the one or more layers above the ATG layer 1022. In some examples, the connection between the first physical entity and the second physical entity may use a wired Internet connection and transported over the transport control protocol (TCP)/Internet protocol (IP).

Figure 11:
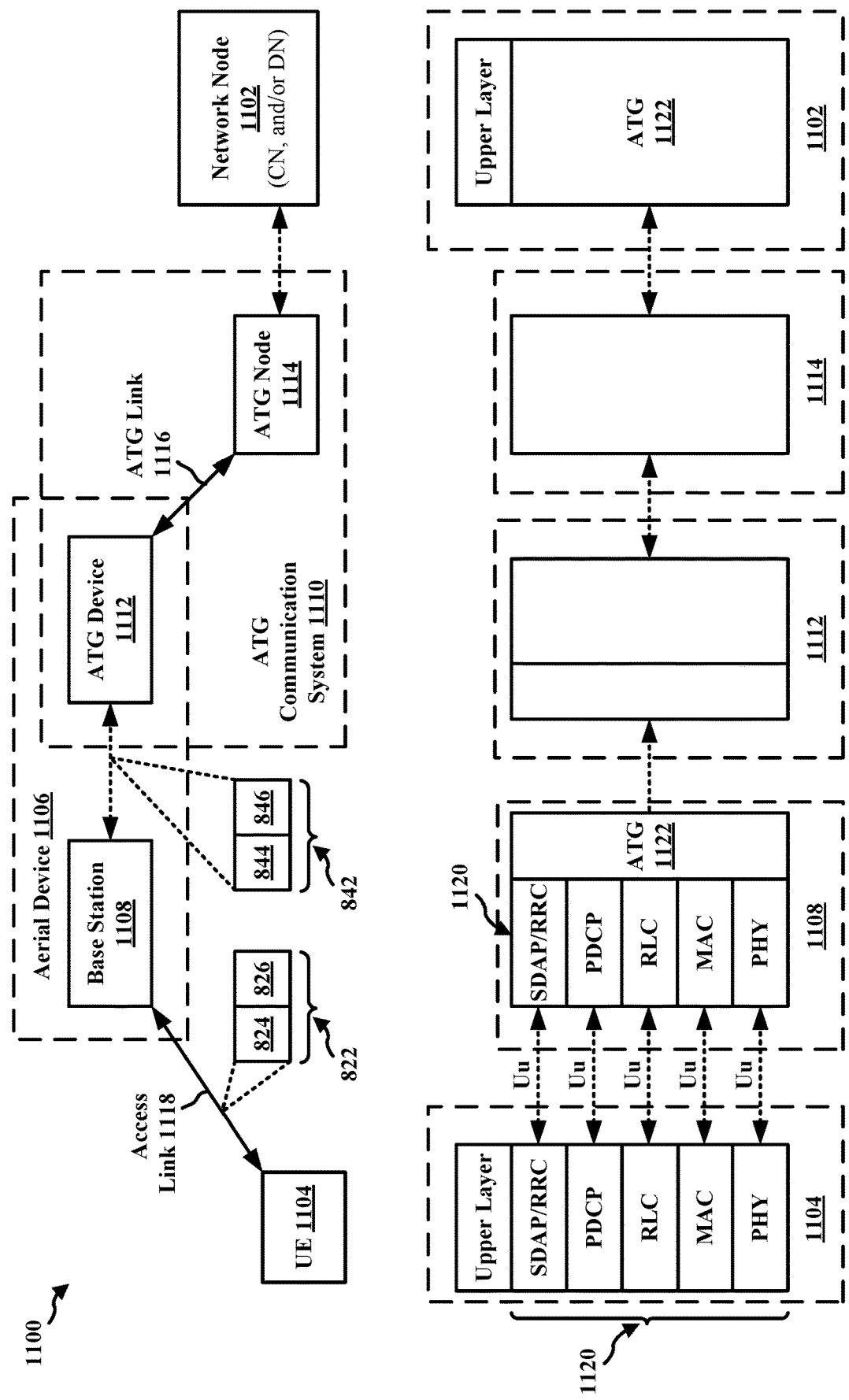
FIG. 11 is a diagram of an example deployment and protocol stack supporting message-relaying between a ground-based UE and a network node that is ground-based using an aircraft-borne payload, in accordance with various aspects of the present disclosure.

FIG. 11 is a diagram 1100 of an example deployment and protocol stack supporting message-relaying between a ground-based UE 1104 and a network node 1102 that is ground-based using an aircraft-borne payload, as presented herein. Similar to the example of FIG. 10, an example aerial device 1106 facilitates the message-relaying between the ground-based UE 1104 and the network node 1102. For example, the aerial device 1106 is in communication with the ground-based UE 1104 via an access link 1118 (e.g., a Uu link or a radio link). The aerial device 1106 is in communication with the network node 1102 via an ATG communication system 1110. The example ATG communication system 1110 includes an ATG device 1112 that is on-board the aerial device 1106, an ATG node 1114 that is ground-based, and an ATG link 1116 connecting the ATG device 1112 and the ATG node 1114.

In the example of FIG. 11, the aerial device 1106 includes an aircraft-borne base station (e.g., a base station 1108). The base station 1108 may include an RU, a DU, and a CU. In the example of FIG. 11, the base station 1108 provides a logical node configured to host the AS layer of the protocol stack 710. The network node 1102 may include a core network and/or a data network to facilitate processing of higher layers of the protocol stack 710 (e.g., the NAS layer).

In the illustrated example of FIG. 11, the base station 1108 on-board the aerial device 1106 is connected to the network node 1102 on the ground via the ATG communication system 1110. The base station 1108 may be in communication with the ATG communication system 1110 (e.g., the ATG device 1112) via a wireless communication system (e.g., Wi-Fi, etc.), a wired communication system (e.g., Ethernet, etc.), or by being integrated together.

The base station 1108 converts a communication (e.g., a signal, a command, a message, etc.) from the ATG communication system 1110 to the access link 1118 and vice versa. For example, and in connection with the example communication flow 800 of FIG. 8, the ground-based UE 1104 may transmit the first message 822 that is received by the base station 1108. The first message 822 may be encoded based on the example protocol stack 710 of FIG. 7. For example, the first message 822 may include a NAS layer and an AS layer.

In the example of FIG. 11, an AS layer 1120 of the protocol stack 710 is defined between the ground-based UE 1104 and the base station 1108. That is, the base station 1108 may be configured to decode the portion of the first message 822 corresponding to the AS layer 1120 (e.g., the PHY layer, the MAC layer, the RLC layer, the PDCP layer, and the SDAP layer/RRC layer). In the example of FIG. 11, the first portion 824 of the first message 822 may correspond to the AS layer 1120. As shown in FIG. 11, the upper layer is defined between the ground-based UE 1104 and the network node 1102. Thus, the base station 1108 foregoes (or skips) decoding the upper layer portion of the first message 822. Accordingly, the second portion 826 of the first message 822 may correspond to the remaining layers of the first message 822 (e.g., the upper layer of the illustrated example) and include a non-decoded portion.

After decoding the first portion 824 of the first message 822, the base station 1108 may map the decoded portion to the second message 842. For example, the base station 1108 includes an ATG layer 1122 that is defined between the base station 1108 and the network node 1102. The ATG layer 1122 at the base station 1108 may encode the decoded portion of the first message 822 using an ATG protocol stack. In the example of FIG. 11, the base station 1108 may map the encoded portion to the first portion 844 of the second message 842. The base station 1108 may map the non-decoded portion of the first message 822 (e.g., the second portion 826) to the second portion 846 of the second message 842. The base station 1108 may then transmit a communication including the second message 842 to the network node 1102 using the ATG communication system 1110.

In the example deployment and protocol stack of FIG. 11, the ground-based UE 1104 may transmit the first message 822 in a manner similar to when transmitting a message directly to the network node 1102 (e.g., without using the aerial device 1106 to relay the message to the network node 1102). The base station 1108 and the network node 1102 may include the ATG layer 1122 to facilitate processing (e.g., encoding, decoding, mapping, etc.) messages based, at least in part, on the ATG protocol stack. For example, the network node 1102 may receive the second message 842 and use the ATG layer 1122 to decode the first portion 844 of the second message 842. The network node 1102 may decode the remaining portions of the second message 842 (e.g., the second portion 846) based on the example of the protocol stack 710 of FIG. 7.

In the example of FIG. 11, the base station 1108 is in communication with the ground-based core network and/or data network via the ATG communication system 1110. In some examples, the one or more capabilities of the core network and/or the data network may be deployed on the aerial device.

Although the example network node 1102 of FIG. 11 includes the ATG layer 1122, it may be appreciated that the infrastructure of the network node 1102 may be deployed at different locations with one or more connections and transport layers to connect the different protocol layers shown in the example of FIG. 11. For example, a first physical entity may host the ATG layer 1122 and may be deployed in a different location than a second physical entity that may be hosting one or more of the layers above the ATG layer 1122 (e.g., the upper layer). Thus, the first physical entity hosting the ATG layer 1122 may be connected with the second physical entity hosting the one or more layers above the ATG layer 1122. In some examples, the connection between the first physical entity and the second physical entity may use a wired Internet connection and transported over TCP/IP.

Figure 12:
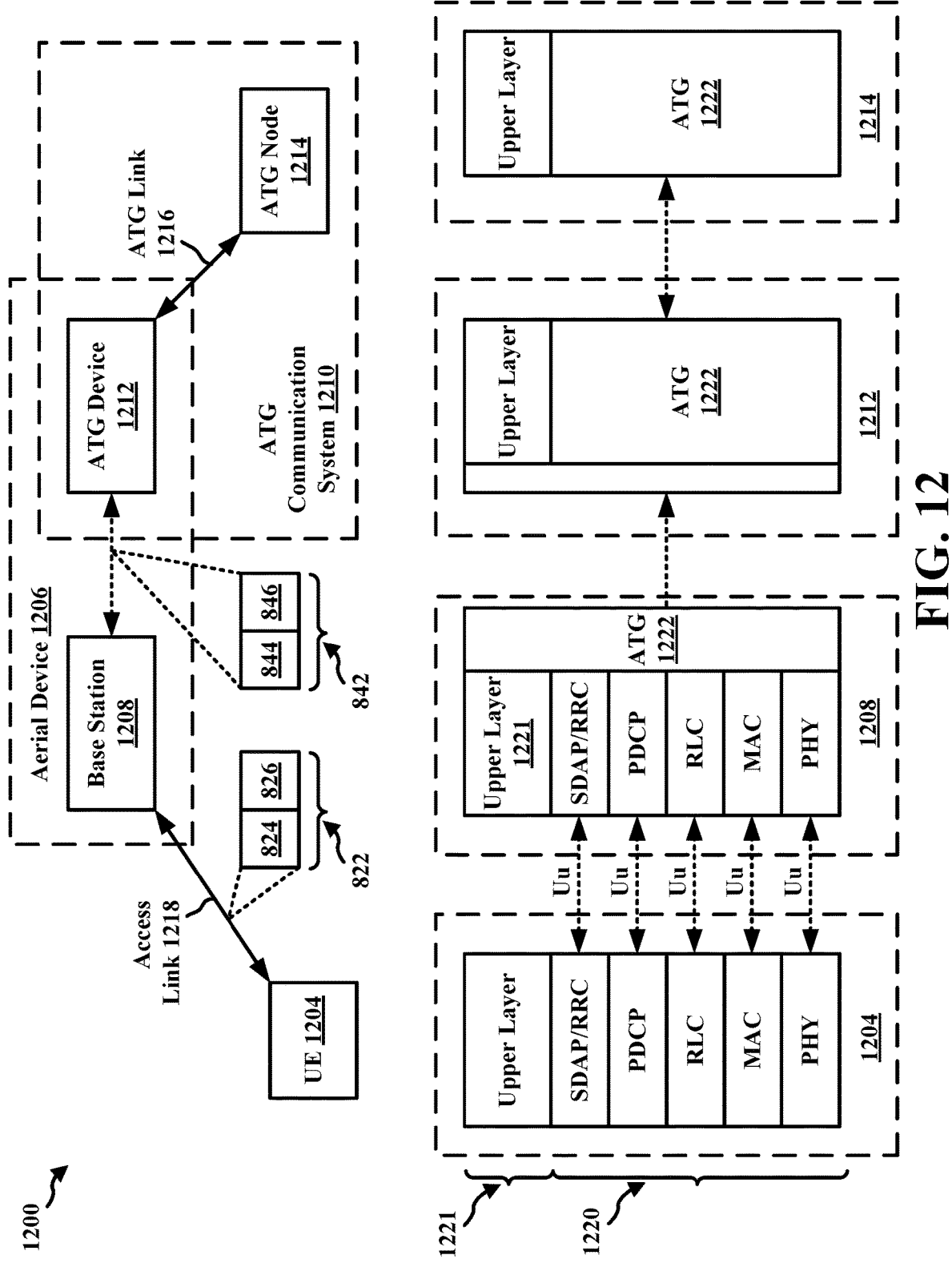
FIG. 12 is a diagram of an example deployment and protocol stack supporting message-relaying between a ground-based UE and a network (e.g., a terrestrial network) using an aircraft-borne payload, in accordance with various aspects of the present disclosure.

FIG. 12 is a diagram 1200 of an example deployment and protocol stack supporting message-relaying between a ground-based UE 1204 and a network (e.g., a terrestrial network) using an aircraft-borne payload, as presented herein. Similar to the example of FIG. 10, an example aerial device 1206 facilitates the message-relaying. For example, the aerial device 1206 is in communication with the ground-based UE 1204 via an access link 1218 (e.g., a Uu link or a radio link). The aerial device 1206 is in communication with the network via an ATG communication system 1210. The example ATG communication system 1210 includes an ATG device 1212 that is on-board the aerial device 1206, an ATG node 1214 that is ground-based, and an ATG link 1216 connecting the ATG device 1212 and the ATG node 1214.

In the example of FIG. 12, the aerial device 1206 includes an aircraft-borne base station (e.g., a base station 1208). The base station 1208 may include an RU, a DU, and a CU. In the example of FIG. 12, the base station 1208 provides a logical node configured to host the AS layer of the protocol stack 710. In the example of FIG. 12, the base station 1208 also includes capabilities of the core network and/or the data network to facilitate processing of higher layers of the protocol stack 710. For example, the base station 1208 may host an upper layer 1221 configured to process the upper layer portion of a message.

In the illustrated example of FIG. 12, the base station 1208 on-board the aerial device 1206 is connected to the terrestrial network on the ground via the ATG communication system 1210. The base station 1208 may be in communication with the ATG communication system 1210 (e.g., the ATG device 1212) via a wireless communication system (e.g., Wi-Fi, etc.), a wired communication system (e.g., Ethernet, etc.), or by being integrated together.

Similar to the example of FIG. 11, the base station 1208 converts a communication (e.g., a signal, a command, a message, etc.) from the ATG communication system 1210 to the access link 1218 and vice versa. For example, and in connection with the example communication flow 800 of FIG. 8, the ground-based UE 1204 may transmit the first message 822 that is received by the base station 1208. The first message 822 may be encoded based on the example protocol stack 710 of FIG. 7. For example, the first message 822 may include a NAS/application layer and an AS layer.

In the example of FIG. 12, an AS layer 1220 of the protocol stack 710 is defined between the ground-based UE 1204 and the base station 1208. Additionally, the upper layer 1221 (e.g. the NAS layer) is defined between the ground-based UE 1204 and the base station 1208. That is, the base station 1208 may be configured to decode the first message 822. In the example of FIG. 12, the first portion 824 of the first message 822 may correspond to the AS layer 1220 and the upper layer 1221.

The base station 1208 includes an ATG layer 1222 that is defined between the base station 1208 and the ATG node 1214. Since the base station 1208 has the ability to decode the first message 822 (e.g., the entire first message), it may encode the content obtained from the first message 822 (e.g., the decoded first message) and map the encoded message to the second message 842 by using an ATG protocol stack. The base station 1208 may then transmit a communication including the second message 842 to the network using the ATG communication system 1210.

In the example deployment and protocol stack of FIG. 12, the ground-based UE 1204 may transmit the first message 822 in a manner similar to when transmitting a message directly to the network (e.g., without using the aerial device 1206 to relay the message to the network). The base station 1208 may include the ATG layer 1222 to facilitate processing (e.g., encoding, decoding, mapping, etc.) messages based, at least in part, on the ATG protocol stack. The ATG node 1214 may decode the second message 842 based on the ATG protocol stack.

Additionally, in the uplink direction, the base station 1208 may use the AS layer and/or the upper layer 1221 to decode the first message 822. In the downlink direction, the base station 1208 may use the AS layer and/or the upper layer 1221 to encode the fourth message 872 for communicating to the ground-based UE 1204 via the access link 1218.

In the example of FIG. 12, the base station 1208 includes one or more capabilities of the core network and/or the data network to facilitate decoding the first message 822. In some examples, the protocol stack 710 may be modified to include a layer configured to manage messages between the ground-based UE and the aerial device/base station.

Figure 13:
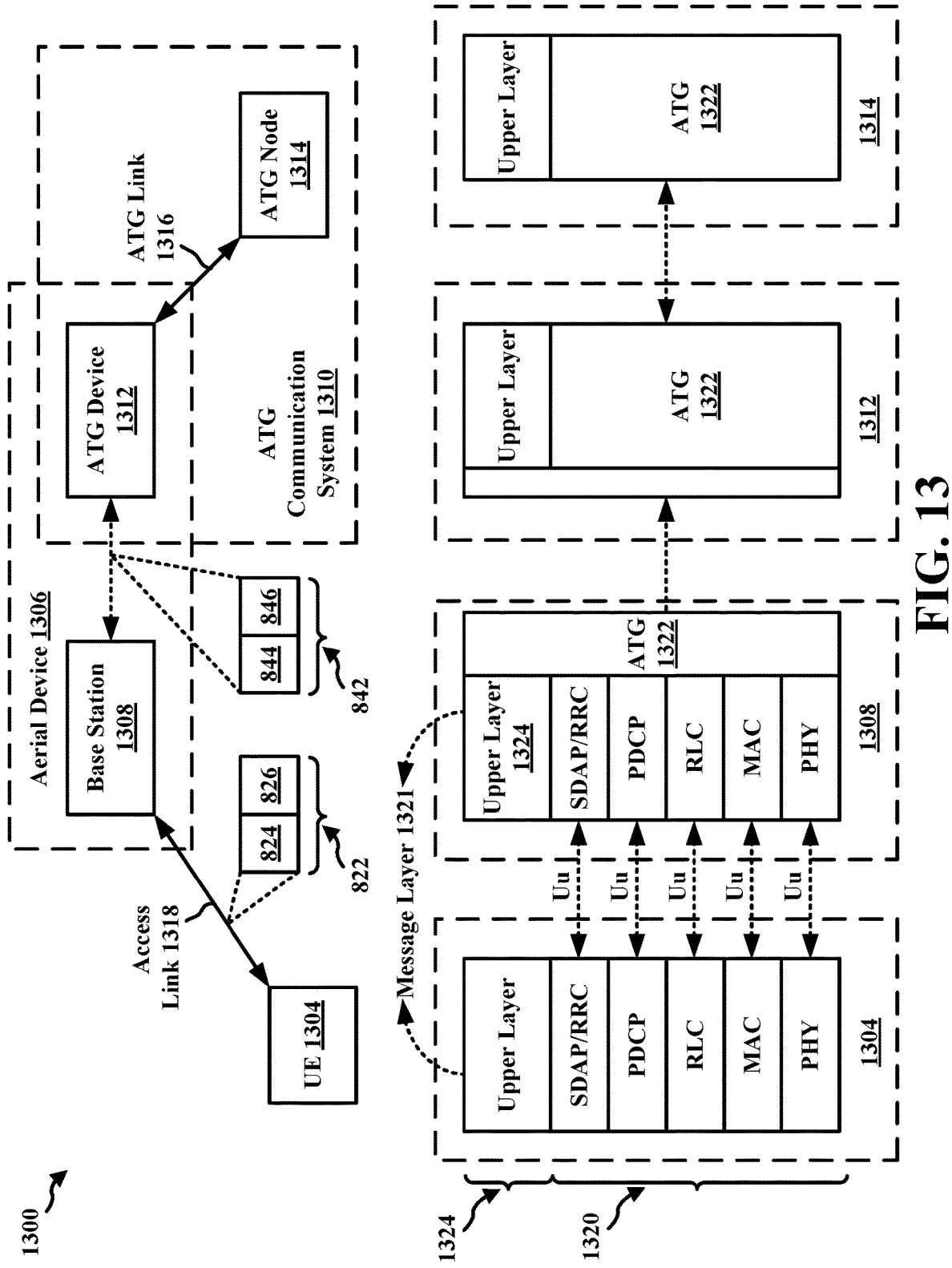
FIG. 13 is a diagram of an example deployment and protocol stack supporting message-relaying between a ground-based UE and a network (e.g., a terrestrial network) using an aircraft-borne payload, in accordance with various aspects of the present disclosure.

FIG. 13 is a diagram 1300 of an example deployment and protocol stack supporting message-relaying between a ground-based UE 1304 and a network (e.g., a terrestrial network) using an aircraft-borne payload, as presented herein. Similar to the example of FIG. 10, an example aerial device 1306 facilitates the message-relaying. For example, the aerial device 1306 is in communication with the ground-based UE 1304 via an access link 1318 (e.g., a Uu link or a radio link). The aerial device 1306 is in communication with the network via an ATG communication system 1310. The example ATG communication system 1310 includes an ATG device 1312 that is on-board the aerial device 1306, an ATG node 1314 that is ground-based, and an ATG link 1316 connecting the ATG device 1312 and the ATG node 1314.

In the example of FIG. 13, the aerial device 1306 includes an aircraft-borne base station (e.g., a base station 1308). The base station 1308 may include an RU, a DU, and a CU. In the example of FIG. 13, the base station 1308 provides a logical node configured to host the AS layer of the protocol stack 710. Similar to the example of FIG. 12, the base station 1308 includes capabilities of the core network and/or the data network to processing of higher layers of the protocol stack 710. For example, the base station 1308 may host an upper layer 1324 configured to process the upper layer portion of a message. In the example FIG. 13, the ground-based UE 1304 and the base station 1308 include a message layer 1321 to facilitate processing of higher layers of the protocol stack 710 associated with a message, such as the example first message 822. In some examples, the message layer 1321 may be a new application included in the upper layer 1324 of the protocol stack. The upper layer 1324 may also be referred to as a NAS/application layer.

In the illustrated example of FIG. 13, the base station 1308 on-board the aerial device 1306 is connected to the terrestrial network on the ground via the ATG communication system 1310. The base station 1308 may be in communication with the ATG communication system 1310 (e.g., the ATG device 1312) via a wireless communication system (e.g., Wi-Fi, etc.), a wired communication system (e.g., Ethernet, etc.), or by being integrated together.

Similar to the example of FIGS. 11 and 12, the base station 1308 converts a communication (e.g., a signal, a command, a message, etc.) from the ATG communication system 1310 to the access link 1318 and vice versa. For example, and in connection with the example communication flow 800 of FIG. 8, the ground-based UE 1304 may transmit the first message 822 that is received by the base station 1308. The first message 822 may be encoded based on the example protocol stack 710 of FIG. 7. For example, the first message 822 may include the upper layer 1324 (e.g., a NAS/application layer) and an AS layer 1320.

In the example of FIG. 13, an AS layer 1320 of the protocol stack 710 is defined between the ground-based UE 1304 and the base station 1308. Additionally, a portion of the upper layer 1324 is defined between the ground-based UE 1304 and the base station 1308. For example, the ground-based UE 1304 and the base station 1308 each host the message layer 1321. The message layer 1321 may be configured to encode or decode communication associated with the first message 822 and/or the fourth message 872. For example, in the uplink direction, the ground-based UE 1304 may use the message layer 1321 to map the application data to the first portion 824 of the first message 822. Additionally, the base station 1308 may use the message layer 1321 to decode the first portion 824 of the first message 822. In the downlink direction, the base station 1308 may decode the third message 852 received via the ATG communication system 1310. The base station 1308 may use the message layer 1321 to map the decoded portion of the third message 852 (e.g., the first portion 854) to the fourth message 872.

The base station 1308 includes an ATG layer 1322 that is defined between the base station 1308 and the ATG node 1314. Since the base station 1308 has the ability to decode the first message 822 (e.g., the entire first message), it may encode the content obtained from the first message 822 (e.g., the decoded first message) and map the encoded message to the second message 842 by using an ATG protocol stack. The base station 1308 may then transmit a communication including the second message 842 to the network using the ATG communication system 1310. In the downlink direction, the base station 1308 may use the message layer 1321 to encode the fourth message 872 for communicating to the ground-based UE 1304 via the access link 1318.

In the example deployment and protocol stack of FIG. 13, the ground-based UE 1304 and the base station 1308 may each be modified to include the message layer 1321. As described above, the message layer 1321 may refer to a new application layer of the upper layer 1324 and be configured to encode or decode communication associated with messages between the ground-based UE 1304 and the base station 1308.

Figure 14:
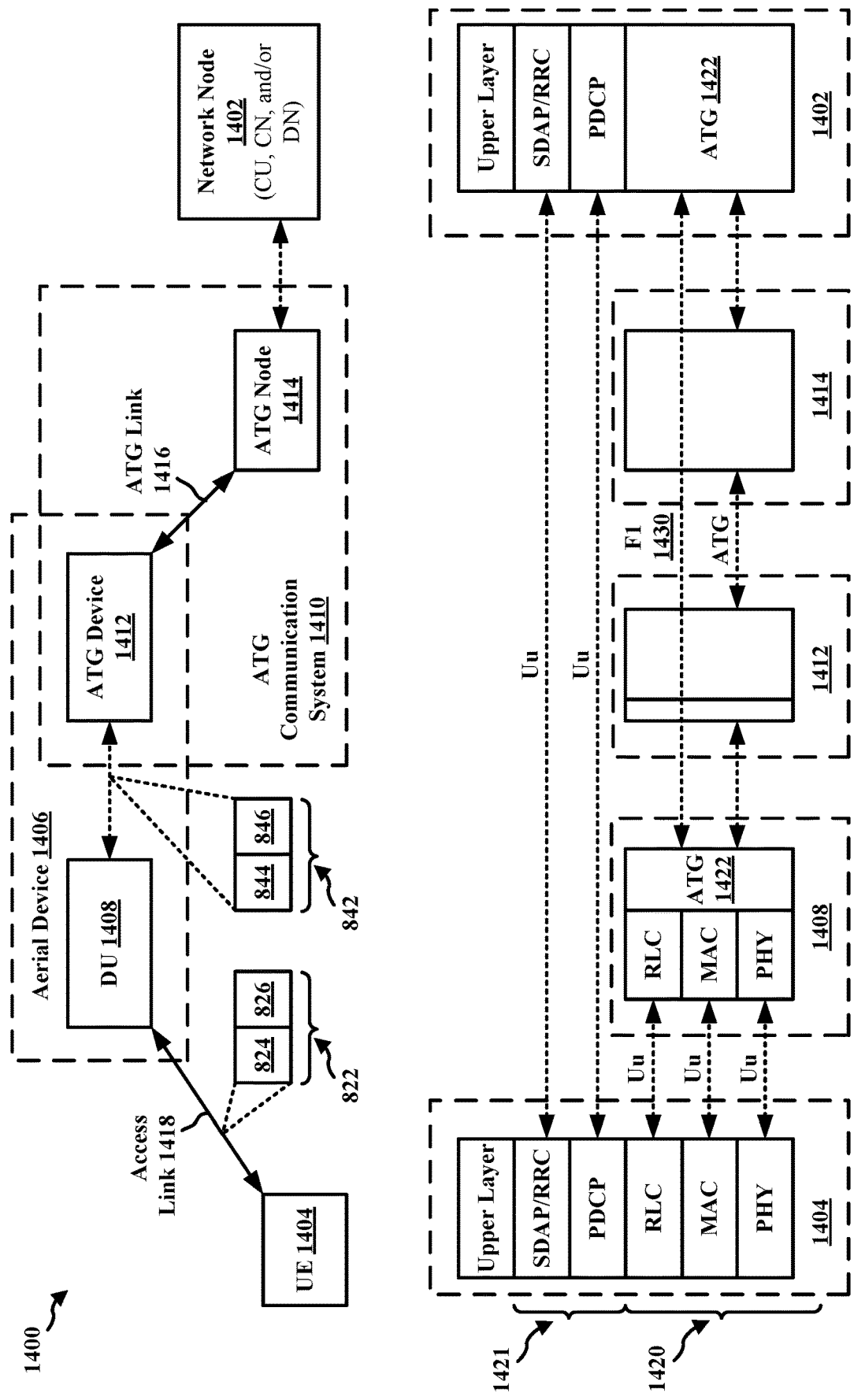
FIG. 14 is a diagram of an example deployment and protocol stack supporting message-relaying between a ground-based UE and a network node that is ground-based using an aircraft-borne payload, in accordance with various aspects of the present disclosure.

FIG. 14 is a diagram 1400 of an example deployment and protocol stack supporting message-relaying between a ground-based UE 1404 and a network node 1402 that is ground-based using an aircraft-borne payload, as presented herein. In the illustrated example of FIG. 14, an example aerial device 1406 facilitates the message-relaying between the ground-based UE 1404 and the network node 1402. For example, the aerial device 1406 is in communication with the ground-based UE 1404 via an access link 1418 (e.g., a Uu link or a radio link). The aerial device 1406 is in communication with the network node 1402 via an ATG communication system 1410. The example ATG communication system 1410 includes an ATG device 1412 that is on-board the aerial device 1406, an ATG node 1414 that is ground-based, and an ATG link 1416 connecting the ATG device 1412 and the ATG node 1414.

As described above, in some examples, a RAN may be disaggregated with a split between a CU and an aggregated DU/RU. In the example of FIG. 14, the aerial device 1406 includes an aircraft-borne DU/RU (e.g., a DU 1408). The DU 1408 may provide a logical node to host an RLC layer, a MAC layer, and the PHY layer. For example, the DU 1408 may have the capability to process the PHY layer, the MAC layer, and the RLC layer of the protocol stack 710. The network node 1402 may include the CU corresponding to the DU 1408. For example, network node 1402 may host higher layer functions of the AS layer of the protocol stack 710, such as the PDCP layer, the SDAP layer, and/or the RRC layer. The network node 1402 may also include a core network and/or a data network to facilitate processing of higher layers of the protocol stack 710 (e.g., the NAS layer and/or the upper layer).

In the illustrated example of FIG. 14, the DU 1408 on-board the aerial device 1406 is connected to the CU portion of the network node 1402 over an F1 interface 1430 carried by the ATG communication system 1410. The DU 1408 may be in communication with the ATG communication system 1410 (e.g., the ATG device 1412) via a wireless communication system (e.g., Wi-Fi, etc.), a wired communication system (e.g., Ethernet, etc.), or by being integrated together.

The DU 1408 converts a communication (e.g., a signal, a command, a message, etc.) from the ATG communication system 1410 to the access link 1418 and vice versa. For example, and in connection with the example communication flow 800 of FIG. 8, the ground-based UE 1404 may transmit the first message 822 that is received by the DU 1408. The first message 822 may be encoded based on the example protocol stack 710 of FIG. 7. For example, the first message 822 may include a NAS/application layer and an AS layer. In the illustrated example of FIG. 10, the AS layer includes a first AS layer portion 1420 and a second AS layer portion 1421.

In the example of FIG. 14, the first AS layer portion 1420 is defined between the ground-based UE 1404 and the DU 1408. That is, the DU 1408 may be configured to decode the portion of the first message 822 corresponding to the PHY layer, the MAC layer, and the RLC layer. In the example of FIG. 14, the first portion 824 of the first message 822 may correspond to the first AS layer portion 1420. As shown in FIG. 14, the second AS layer portion 1421 is defined between the ground-based UE 1404 and the network node 1402. That is, the DU 1408 may be configured to forego decoding the portion of the first message 822 corresponding to the second AS layer portion 1421. Accordingly, the second portion 826 of the first message 822 may correspond to the remaining layers of the first message 822 (e.g., the second AS layer portion 1421 and the upper layer portion).

After decoding the first portion 824 of the first message 822, the DU 1408 may map the decoded portion to the second message 842. For example, the DU 1408 includes an ATG layer 1422 that is defined between the DU 1408 and the network node 1402. The ATG layer 1422 at the DU 1408 may encode the decoded portion using an ATG protocol stack. In the example of FIG. 14, the DU 1408 may map the encoded portion to the first portion 844 of the second message 842. The DU 1408 may map the non-decoded portion of the first message 822 (e.g., the second portion 826) to the second portion 846 of the second message 842. The DU 1408 may then transmit a communication including the second message 842 to the network node 1402 using the ATG communication system 1410.

In the example deployment and protocol stack of FIG. 14, the ground-based UE 1404 may transmit the first message 822 in a manner similar to when transmitting a message directly to the network node 1402 (e.g., without using the aerial device 1406 to relay the message to the network node 1402). The DU 1408 and the network node 1402 may include the ATG layer 1422 to facilitate processing (e.g., encoding, decoding, mapping, etc.) messages based, at least in part, on the ATG protocol stack. For example, the network node 1402 may receive the second message 842 and use the ATG layer 1422 to decode the first portion 844 of the second message 842. The network node 1402 may decode the remaining portions of the second message 842 (e.g., the second portion 846) based on the example of the protocol stack 710 of FIG. 7.

In some examples, deploying the DU on-board the aerial device 1406 may enable the CU at the network node 1402 to be configured to perform less time-critical functions that may be associated with the second AS layer portion 1421 and the upper layer portion. Additionally, modifying the ATG communication system 1410 to support the F1 interface 1430 may be an easier modification than deploying the RU on-board the aerial device (e.g., as described in connection with the example of FIG. 10).

Although the example network node 1402 of FIG. 14 includes the ATG layer 1422, it may be appreciated that the infrastructure of the network node 1402 may be deployed at different locations with one or more connections and transport layers to connect the different protocol layers shown in the example of FIG. 14. For example, a first physical entity may host the ATG layer 1422 and may be deployed in a different location than a second physical entity that may be hosting one or more of the layers above the ATG layer 1422 (e.g., the upper layer, the SDAP layer/RRC layer, and the PDCP layer). Thus, the first physical entity hosting the ATG layer 1422 may be connected with the second physical entity hosting the one or more layers above the ATG layer 1422. In some examples, the connection between the first physical entity and the second physical entity may use a wired Internet connection and transported over TCP/IP.

Figure 15:
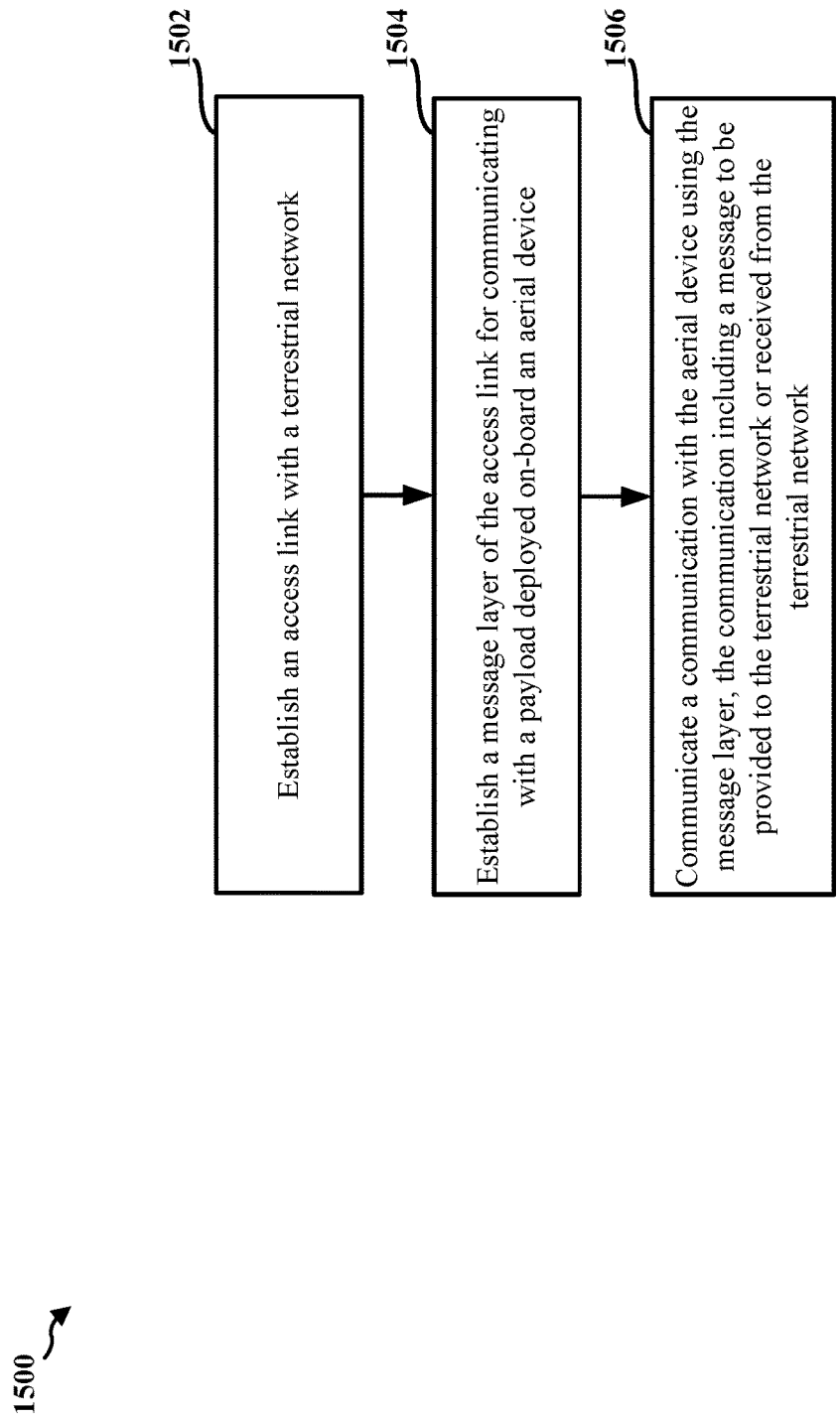
FIG. 15 is a flowchart of a method of wireless communication at a UE, in accordance with the teachings disclosed herein.

FIG. 15 is a flowchart 1500 of a method of wireless communication. The method may be performed by a UE (e.g., the UE 104, the UE 350, the ground-based UE 604, the UE 704, the UE 804, the ground-based UE 1004, the ground-based UE 1104, the ground-based UE 1204, the ground-based UE 1304, the ground-based UE 1404, and/or an apparatus 1702 of FIG. 17). The method may facilitate improving cell coverage by enabling the UE to communicate with a terrestrial network if the UE is out of coverage of the terrestrial network. The UE may include a ground-based UE.

At 1502, the UE establishes an access link with a terrestrial network, as described in connection with the example access link 610 of FIG. 6, the example access link 812 of FIG. 8, the example access link 1018 of FIG. 10, the example access link 1118 of FIG. 11, the example access link 1218 of FIG. 12, the example access link 1318 of FIG. 13, and/or the example access link 1418 of FIG. 14. For example, 1502 may be performed by an access link component 1740 of the apparatus 1702 of FIG. 17.

At 1504, the UE establishes a message layer of the access link for communicating with a payload deployed on-board an aerial device, as described in connection with the example message layer 1321 of FIG. 13. For example, 1504 may be performed by a message layer component 1742 of the apparatus 1702 of FIG. 17.

At 1506, the UE communicates a communication with the aerial device using the message layer, the communication including a message to be provided to the terrestrial network or received from the terrestrial network, as described in connection with the second communication 840 of FIGS. 8 and 13 and/or the first portion 824 of FIGS. 8 and/or 13. For example, 1506 may be performed by a communication component 1744 of the apparatus 1702 of FIG. 17. In some examples, communicating using the message layer may be defined between the UE and the payload.

Figure 16:
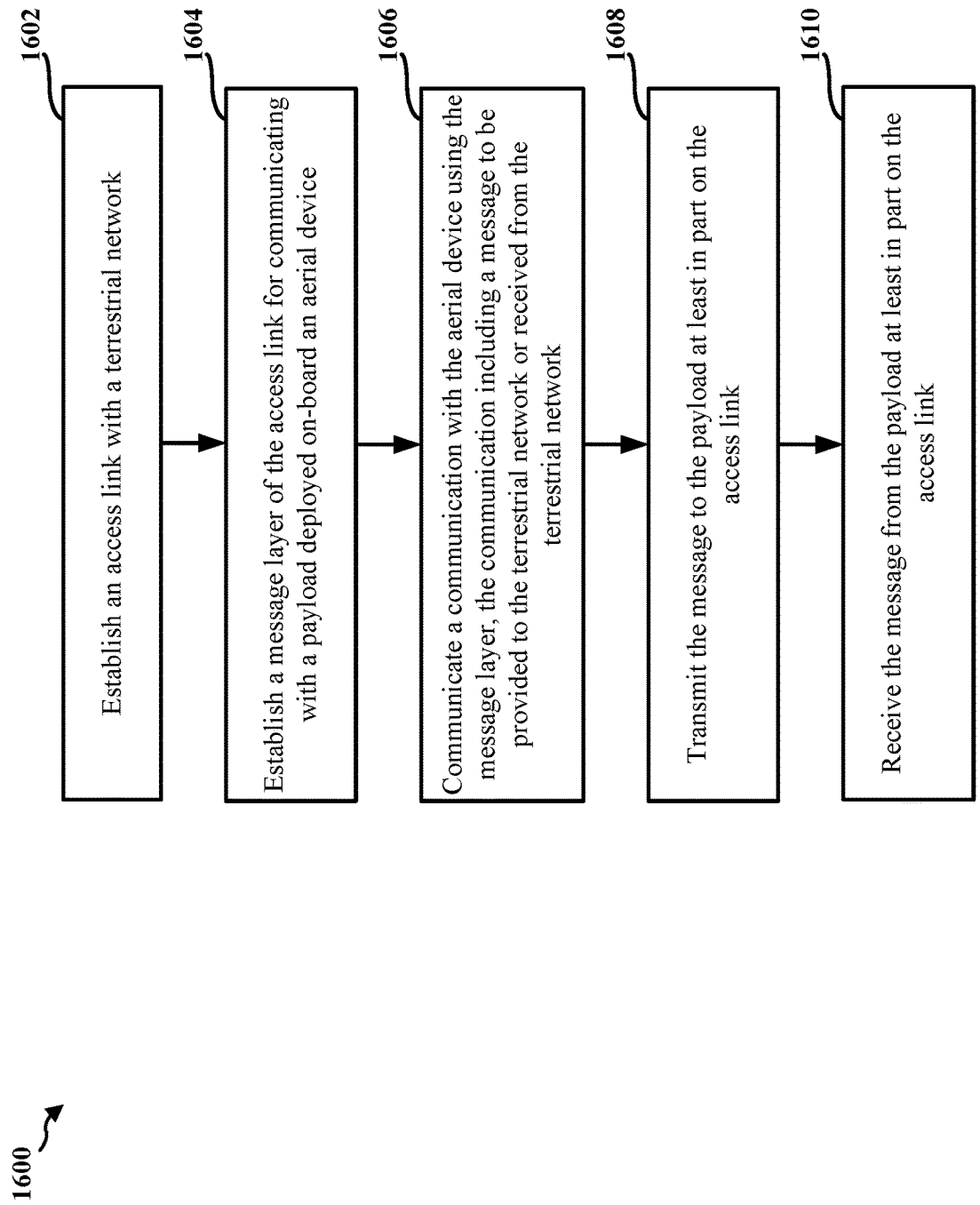
FIG. 16 is a flowchart of a method of wireless communication at a UE, in accordance with the teachings disclosed herein.

FIG. 16 is a flowchart 1600 of a method of wireless communication. The method may be performed by a UE (e.g., the UE 104, the UE 350, the ground-based UE 604, the UE 704, the UE 804, the ground-based UE 1004, the ground-based UE 1104, the ground-based UE 1204, the ground-based UE 1304, the ground-based UE 1404, and/or an apparatus 1702 of FIG. 17). The method may facilitate improving cell coverage by enabling the UE to communicate with a terrestrial network if the UE is out of coverage of the terrestrial network. The UE may include a ground-based UE.

At 1602, the UE establishes an access link with a terrestrial network, as described in connection with the example access link 610 of FIG. 6, the example access link 812 of FIG. 8, the example access link 1018 of FIG. 10, the example access link 1118 of FIG. 11, the example access link 1218 of FIG. 12, the example access link 1318 of FIG. 13, and/or the example access link 1418 of FIG. 14. For example, 1602 may be performed by an access link component 1740 of the apparatus 1702 of FIG. 17.

At 1604, the UE establishes a message layer of the access link for communicating with a payload deployed on-board an aerial device, as described in connection with the example message layer 1321 of FIG. 13. For example, 1604 may be performed by a message layer component 1742 of the apparatus 1702 of FIG. 17.

At 1606, the UE communicates a communication with the aerial device using the message layer, the communication including a message to be provided to the terrestrial network or received from the terrestrial network, as described in connection with the second communication 840 of FIGS. 8 and 13 and/or the first portion 824 of FIGS. 8 and/or 13. For example, 1606 may be performed by a communication component 1744 of the apparatus 1702 of FIG. 17.

In some examples, communicating using the message layer may be defined between the UE and the payload.

In some examples, communicating the communication with the aerial device may include, at 1608, the UE transmitting the message to the payload at least in part on the access link, as described in connection with the first communication 820 of FIG. 8. For example, 1608 may be performed by the communication component 1744 of the apparatus 1702 of FIG. 17.

In some examples, communicating the communication with the aerial device may include, at 1610, the UE receiving the message from the payload at least in part on the access link, as described in connection with the fourth communication 870 of FIG. 8. For example, 1610 may be performed by the communication component 1744 of the apparatus 1702 of FIG. 17.

Figure 17:
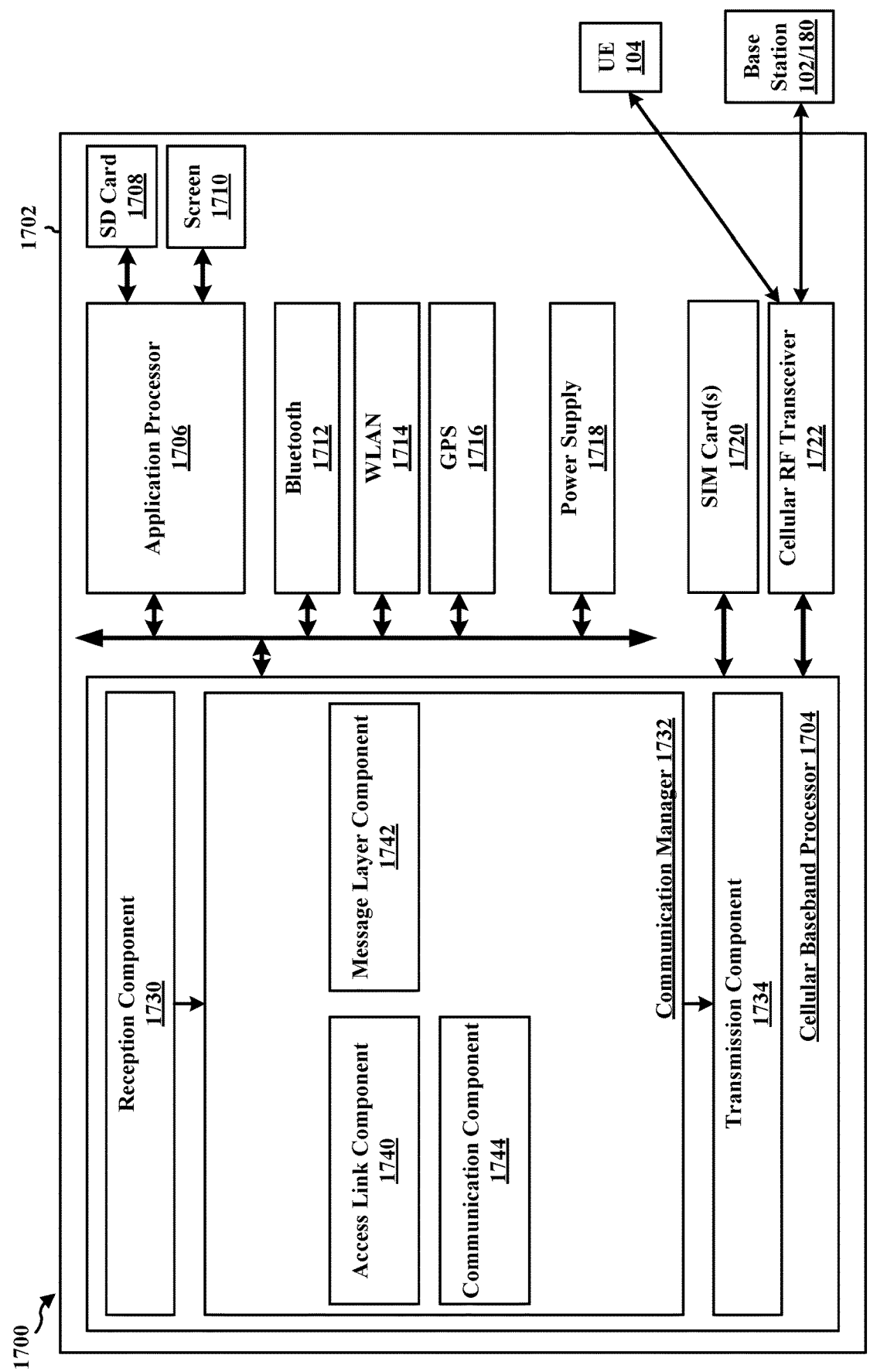
FIG. 17 is a diagram illustrating an example of a hardware implementation for an example apparatus, in accordance with the teachings disclosed herein.

FIG. 17 is a diagram 1700 illustrating an example of a hardware implementation for an apparatus 1702. The apparatus 1702 may be a UE, a component of a UE, or may implement UE functionality. In some aspects, the apparatus 1702 may include a cellular baseband processor 1704 (also referred to as a modem) coupled to a cellular RF transceiver 1722. In some aspects, the apparatus 1702 may further include one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, or a power supply 1718. The cellular baseband processor 1704 communicates through the cellular RF transceiver 1722 with the UE 104 and/or base station 102/180. The cellular baseband processor 1704 may include a computer-readable medium/memory. The computer-readable medium/memory may be non-transitory. The cellular baseband processor 1704 is responsible for general processing, including the execution of software stored on the computer-readable medium/memory. The software, when executed by the cellular baseband processor 1704, causes the cellular baseband processor 1704 to perform the various functions described supra. The computer-readable medium/memory may also be used for storing data that is manipulated by the cellular baseband processor 1704 when executing software. The cellular baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the cellular baseband processor 1704. The cellular baseband processor 1704 may be a component of the UE 350 and may include the memory 360 and/or at least one of the TX processor 368, the RX processor 356, and the controller/processor 359. In one configuration, the apparatus 1702 may be a modem chip and include just the cellular baseband processor 1704, and in another configuration, the apparatus 1702 may be the entire UE (e.g., see the UE 350 of FIG. 3) and include the additional modules of the apparatus 1702.

The communication manager 1732 includes an access link component 1740 that is configured to establish an access link with a terrestrial network, for example, as described in connection with 1502 of FIG. 15 and/or 1602 of FIG. 16.

The communication manager 1732 also includes a message layer component 1742 that is configured to establish a message layer of the access link for communicating with a payload deployed on-board an aerial device, for example, as described in connection with 1504 of FIG. 15 and/or 1604 of FIG. 16.

The communication manager 1732 also includes a communication component 1744 that is configured to communicate a communication with the aerial device using the message layer, the communication including a message to be provided to the terrestrial network or received from the terrestrial network, for example, as described in connection with 1506 of FIG. 15 and/or 1606 of FIG. 16. The example communication component 1744 may also be configured to transmit the message to the payload at least in part on the access link, for example, as described in connection with 1608 of FIG. 16. The example communication component 1744 may also be configured to receive the message from the payload at least in part on the access link, for example, as described in connection with 1610 of FIG. 16.

The apparatus may include additional components that perform each of the blocks of the algorithm in the flowcharts of FIGS. 15 and/or 16. As such, each block in the flowcharts of FIGS. 15 and/or 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In one configuration, the apparatus 1702, and in particular the cellular baseband processor 1704, includes means for establishing an access link with a terrestrial network. The example apparatus 1702 also includes means for establishing a message layer of the access link for communicating with a payload deployed on-board an aerial device. The example apparatus 1702 also includes means for communicating a communication with the aerial device using the message layer, the communication including a message to be provided to the terrestrial network or received from the terrestrial network.

In another configuration, the example apparatus 1702 also includes means for transmitting the message to the payload at least in part on the access link.

In another configuration, the example apparatus 1702 also includes means for receiving the message from the payload at least in part on the access link.

The means may be one or more of the components of the apparatus 1702 configured to perform the functions recited by the means. As described supra, the apparatus 1702 may include the TX processor 368, the RX processor 356, and the controller/processor 359. As such, in one configuration, the means may be the TX processor 368, the RX processor 356, and the controller/processor 359 configured to perform the functions recited by the means.

Figure 18:
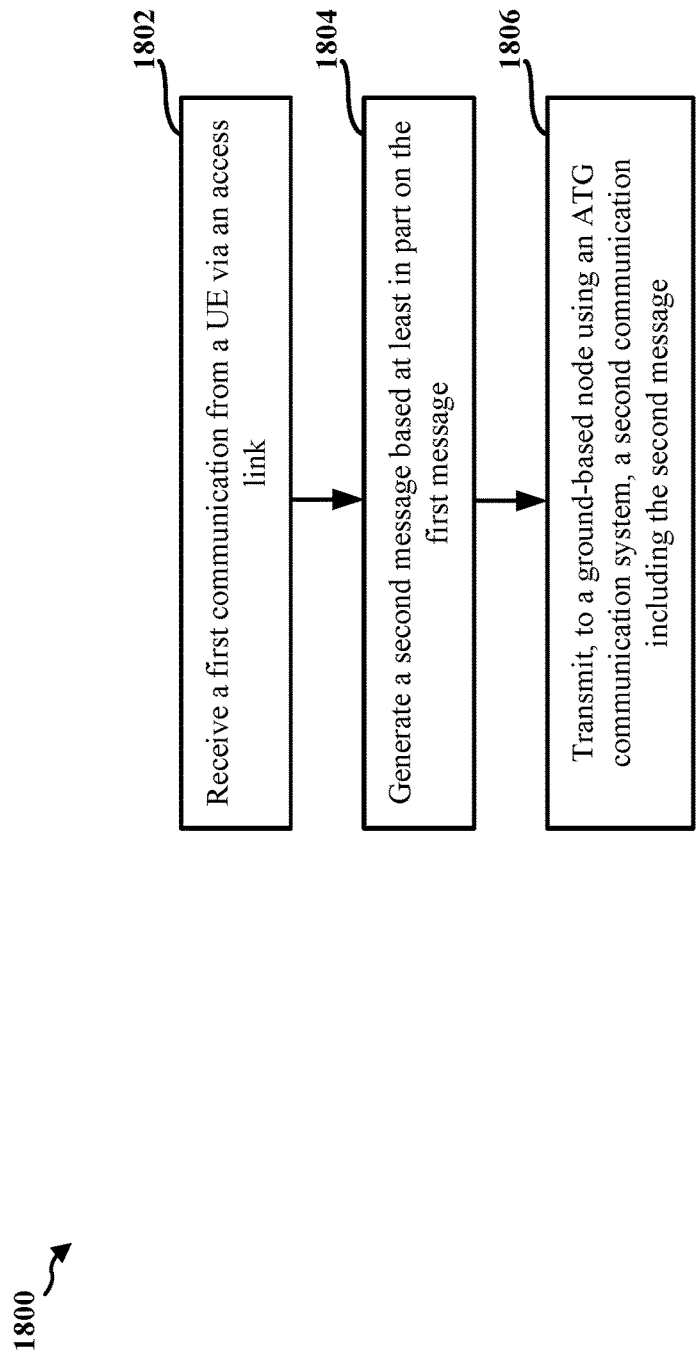
FIG. 18 is a flowchart of a method of wireless communication at an aerial device, in accordance with the teachings disclosed herein.

FIG. 18 is a flowchart 1800 of a method of wireless communication. The method may be performed by an aerial device and/or an aircraft-borne payload (e.g., the aerial device 103, the aerial device 606, the aerial device 806, the aerial device 1006, the aerial device 1106, the aerial device 1206, the aerial device 1306, the aerial device 1406, the aerial payload 612, the payload 808, the RU 1008, the base station 1108, the base station 1208, the base station 1308, the DU 1408, the base station 310, and/or an apparatus 2202 of FIG. 22). The method may facilitate improving cell coverage for an out of coverage UE by enabling the aerial device to relay messages from the UE to a terrestrial network using an access link and an ATG communication system. For example, the aerial device may include a payload configured to communicate with the UE using the access link and configured to communicate with the terrestrial network using the ATG communication system. In some examples, the payload may include a regenerative payload configured to generate a physical signal between the access link and the ATG communication system.

At 1802, the aerial device receives a first communication from a ground-based UE via an access link defined between the ground-based UE and a payload deployed on-board the aerial device, the first communication including a first message to be provided to a terrestrial network, as described in connection with the example first communication 820 of FIG. 8 and/or the first message 822 of FIGS. 8 to 14. For example, 1802 may be performed by an access link component 2240 of the apparatus 2202 of FIG. 22.

At 1804, the aerial device generates a second message based at least in part on the first message, as described in connection with 830 of FIG. 8. For example, 1808 may be performed by a generation component 2242 of the apparatus 2202 of FIG. 22.

At 1806, the aerial device transmits, to a ground-based node using an ATG communication system, a second communication including the second message, as described in connection with the second communication 840 and/or the second message 842 of FIGS. 8 to 14. For example, 1806 may be performed by an ATG component 2244 of the apparatus 2202 of FIG. 22.

Figure 19:
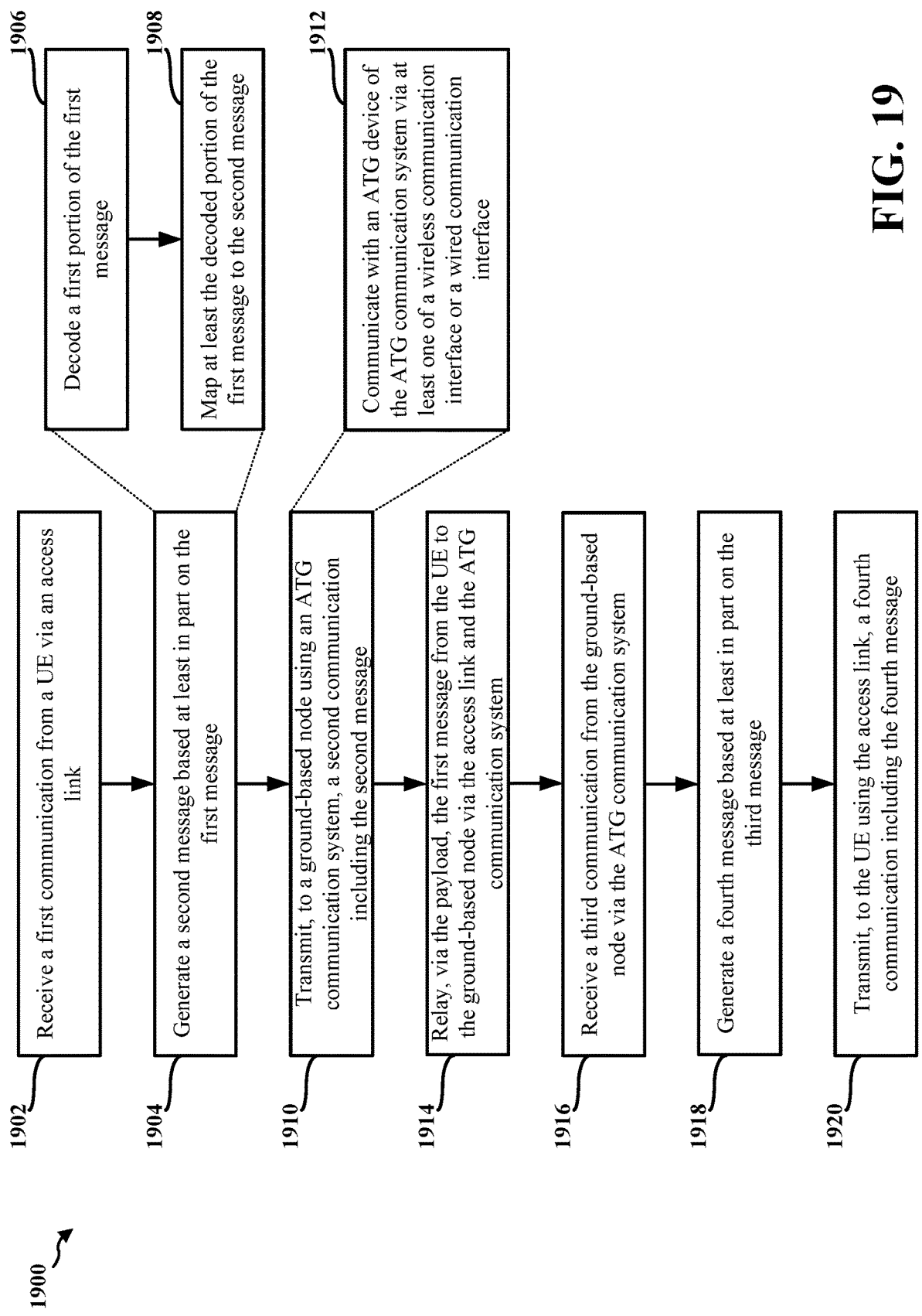
FIG. 19 is a flowchart of a method of wireless communication at an aerial device, in accordance with the teachings disclosed herein.

FIG. 19 is a flowchart 1900 of a method of wireless communication. The method may be performed by an aerial device and/or an aircraft-borne payload (e.g., the aerial device 103, the aerial device 606, the aerial device 806, the aerial device 1006, the aerial device 1106, the aerial device 1206, the aerial device 1306, the aerial device 1406, the aerial payload 612, the payload 808, the RU 1008, the base station 1108, the base station 1208, the base station 1308, the DU 1408, the base station 310, and/or an apparatus 2202 of FIG. 22). The method may facilitate improving cell coverage for an out of coverage UE by enabling the aerial device to relay messages from the UE to a terrestrial network using an access link and an ATG communication system. For example, the aerial device may include a payload configured to communicate with the UE using the access link and configured to communicate with the terrestrial network using the ATG communication system. In some examples, the payload may include a regenerative payload configured to generate a physical signal between the access link and the ATG communication system.

At 1902, the aerial device receives a first communication from a ground-based UE via an access link defined between the ground-based UE and a payload deployed on-board the aerial device, the first communication including a first message to be provided to a terrestrial network, as described in connection with the example first communication 820 of FIG. 8 and/or the first message 822 of FIGS. 8 to 14. For example, 1902 may be performed by an access link component 2240 of the apparatus 2202 of FIG. 22.

At 1904, the aerial device generates a second message based at least in part on the first message, as described in connection with 830 of FIG. 8. For example, 1908 may be performed by a generation component 2242 of the apparatus 2202 of FIG. 22.

In some examples, generating the second message may include, at 1806, the aerial device decoding a first portion of the first message, as described in connection with 832 of FIG. 8. For example, 1906 may be performed by the generation component 2242 of the apparatus 2202 of FIG. 22.

At 1908, the aerial device may map at least the decoded portion of the first message to the second message, as described in connection with 834 of FIG. 8. For example, 1908 may be performed by the generation component 2242 of the apparatus 2202 of FIG. 22.

At 1910, the aerial device transmits, to a ground-based node using an ATG communication system, a second communication including the second message, as described in connection with the second communication 840 and/or the second message 842 of FIGS. 8 to 14. For example, 1910 may be performed by an ATG component 2244 of the apparatus 2202 of FIG. 22.

In some examples, at 1912, the aerial device may communicate with an ATG device of the ATG communication system via at least one of a wireless communication interface or a wired communication interface, the ATG device deployed on-board the aerial device and configured to provide ATG communication between the payload and the ground-based node, as described in connection with the on-board link 816 of FIG. 8. For example, 1912 may be performed by the ATG component 2244 of the apparatus 2202 of FIG. 22.

In some examples, transmitting the second communication including the second message may include, at 1914, the aerial device relaying, via the payload, the first message from the ground-based UE to the ground-based node via the access link and the ATG communication system, as described in connection with the first communication 820 and the second communication 840 of FIG. 8. For example, 1914 may be performed by a relay component 2246 of the apparatus 2202 of FIG. 22.

In some examples, the aerial device may facilitate relaying downlink messages from a network node to the ground-based UE. For example, at 1916, the aerial device may receive a third communication from the ground-based node via the ATG communication system, the third communication including a third message to be provided to the ground-based UE, as described in connection with the third communication 850 and the third message 852 of FIG. 8. For example, 1916 may be performed by the ATG component 2244 of the apparatus 2202 of FIG. 22.

At 1918, the aerial device may generate a fourth message based at least in part on the third message, as described in connection with 860 of FIG. 8. For example, 1918 may be performed by the generation component 2242 of the apparatus 2202 of FIG. 22.

At 1920, the aerial device may transmit, to the ground-based UE using the access link, a fourth communication including the fourth message, as described in connection with the fourth communication 870 and the fourth message 872 of FIG. 8. For example, 1920 may be performed by the access link component 2240 of the apparatus 2202 of FIG. 22.

In some examples, the payload may include an RU and the ground-based node may include at least a base station, as described in connection with the example of FIG. 10. The RU may be in communication with the base station via the ATG communication system, as described in connection with the ATG communication system 1010 of FIG. 10. In some such examples, generating the second message (e.g., at 1904) may include decoding, at 1906, a physical layer portion of the first message, as described in connection with the first portion 824 of FIGS. 8 and 10, and the lower PHY layer 1020 of FIG. 10. The aerial device may then, at 1908, map the physical layer portion to the second message, the second message including the physical layer portion and a non-decoded portion of the first message, as described in connection with the first portion 844 and the second portion 846 of the second message 842 of FIGS. 8 and 10. The decoding, at 1906, and the mapping, at 1908, may be performed by the generation component 2242 of the apparatus 2202 of FIG. 22.

In some examples, the payload may include a base station and the ground-based node may include a core network associated with the terrestrial network, as described in connection with the example of FIG. 11. The base station may be in communication with the core network via the ATG communication system, as described in connection with the ATG communication system 1110 of FIG. 11. In some such examples, generating the second message (e.g., at 1904) may include decoding, at 1906, an access stratus layer portion of the first message, as described in connection with the first portion 824 of FIGS. 8 and 11, and the AS layer 1120 of FIG. 11. The aerial device may then, at 1908, map the access stratus layer portion to the second message, the second message including the access stratus layer portion and a non-decoded portion of the first message, as described in connection with the first portion 844 and the second portion 846 of the second message 842 of FIGS. 8 and 11.

In some examples, an upper layer of the access link may be defined between the ground-based UE and the core network, and the second message may include a non-decoded portion of the first message associated with the upper layer, as described in connection with the second portion 846 of FIGS. 8 and 11. The decoding, at 1906, and the mapping, at 1908, may be performed by the generation component 2242 of the apparatus 2202 of FIG. 22.

In some examples, the payload may include a base station and the ground-based node may include a ground-based ATG node of the ATG communication system, as described in connection with the example of FIGS. 12 and/or 13. The base station may be in communication with the ground-based ATG node via the ATG communication system, as described in connection with the ATG communication system 1210 of FIG. 12 and/or the ATG communication system 1310 of FIG. 13. In some examples, an upper layer of the access link may include a message layer configured to encode or decode communications associated with the first message, the message layer being defined between the ground-based UE and the base station, as described in connection with the message layer 1321 of FIG. 13. In some such examples, generating the second message (e.g., at 1904) may include decoding, at 1906, the first message using the message layer, as described in connection with the first message 822 of FIGS. 8 and 13. The aerial device may then, at 1908, map the decoded first message to the second message, as described in connection with the first portion of the second message 842 of FIGS. 8 and 13.

In some examples, a NAS layer and an AS layer of the access link may each be defined between the ground-based UE and the base station, as described in connection with the AS layer 1220 and the upper layer 1221 of FIG. 12. In some such examples, generating the second message (e.g., at 1904) may include decoding, at 1906, the first message using the NAS layer, as described in connection with the first message 822 of FIGS. 8 and 12. The aerial device may then, at 1908, map the decoded first message to the second message, as described in connection with the first portion of the second message 842 of FIGS. 8 and 12.

In some examples, the payload may include a DU and the ground-based node includes a CU, as described in connection with the example of FIG. 14. The DU may be in communication with the CU via an F1 interface carried via the ATG communication system, as described in connection with the F1 interface 1430 and the ATG communication system 1410 of FIG. 11. In some such examples, generating the second message (e.g., at 1904) may include decoding, at 1906, a first AS layer portion of the first message, as described in connection with the first portion 824 of FIGS. 8 and 14, and the first AS layer portion 1420 of FIG. 14. The aerial device may then, at 1908, map the first AS layer portion to the second message, the second message including the first AS layer portion and a non-decoded portion of the first message including at least a second AS layer portion, as described in connection with the first portion 844 and the second portion 846 of the second message 842 and the second AS layer portion 1421 of FIGS. 8 and 14. The decoding, at 1906, and the mapping, at 1908, may be performed by the generation component 2242 of the apparatus 2202 of FIG. 22.

Figure 20:
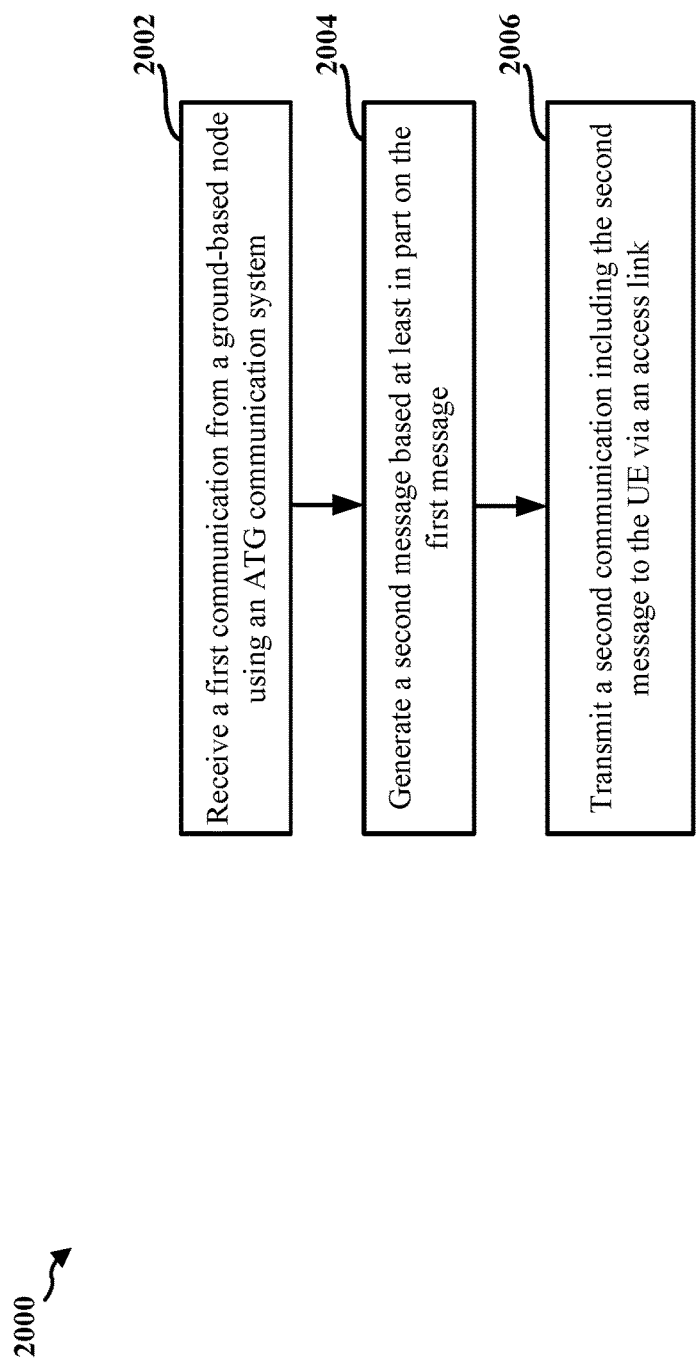
FIG. 20 is a flowchart of a method of wireless communication at an aerial device, in accordance with the teachings disclosed herein.

FIG. 20 is a flowchart 2000 of a method of wireless communication. The method may be performed by an aerial device and/or an aircraft-borne payload (e.g., the aerial device 103, the aerial device 606, the aerial device 806, the aerial device 1006, the aerial device 1106, the aerial device 1206, the aerial device 1306, the aerial device 1406, the aerial payload 612, the payload 808, the RU 1008, the base station 1108, the base station 1208, the base station 1308, the DU 1408, the base station 310, and/or an apparatus 2202 of FIG. 22). The method may facilitate improving cell coverage for an out of coverage UE by enabling the aerial device to relay messages from a terrestrial network to the UE using an ATG communication system and an access link.

For example, the aerial device may include a payload configured to communicate with the UE using the access link and configured to communicate with the terrestrial network using the ATG communication system. In some examples, the payload may include a regenerative payload configured to generate a physical signal between the access link and the ATG communication system.

At 2002, the aerial device receives a first communication from a ground-based node using an ATG communication system between the ground-based node and a payload deployed on-board the aerial device, the first communication including a first message from a terrestrial network to be provided to a ground-based UE, as described in connection with the third communication 850 of FIG. 8 and/or the third message 852 of FIGS. 8 to 14. For example, 2002 may be performed by an ATG component 2244 of the apparatus 2202 of FIG. 22.

At 2004, the aerial device generates a second message based at least in part on the first message, as described in connection with 860 of FIG. 8. For example, 2004 may be performed by a generation component 2242 of the apparatus 2202 of FIG. 22.

At 2006, the aerial device transmits a second communication including the second message to the ground-based UE via an access link defined between the ground-based UE and the payload, as described in connection with the fourth communication 870 and/or the fourth message 872 of FIG. 8. For example, 2006 may be performed by an access link component 2240 of the apparatus 2202 of FIG. 22.

In some examples, the aerial device may communicate with an ATG device of the ATG communication system via at least one of a wireless communication interface or a wired communication interface, the ATG device deployed on-board the aerial device and configured to provide ATG communication between the payload and the ground-based node, as described in connection with the on-board link 816 of FIG. 8.

In some examples, transmitting the second communication including the second message may include relaying, via the payload, the first message from the ground-based node to the ground-based UE via the access link and the ATG communication system, as described in connection with the third communication 850 and the fourth communication 870 of FIG. 8.

Figure 21:
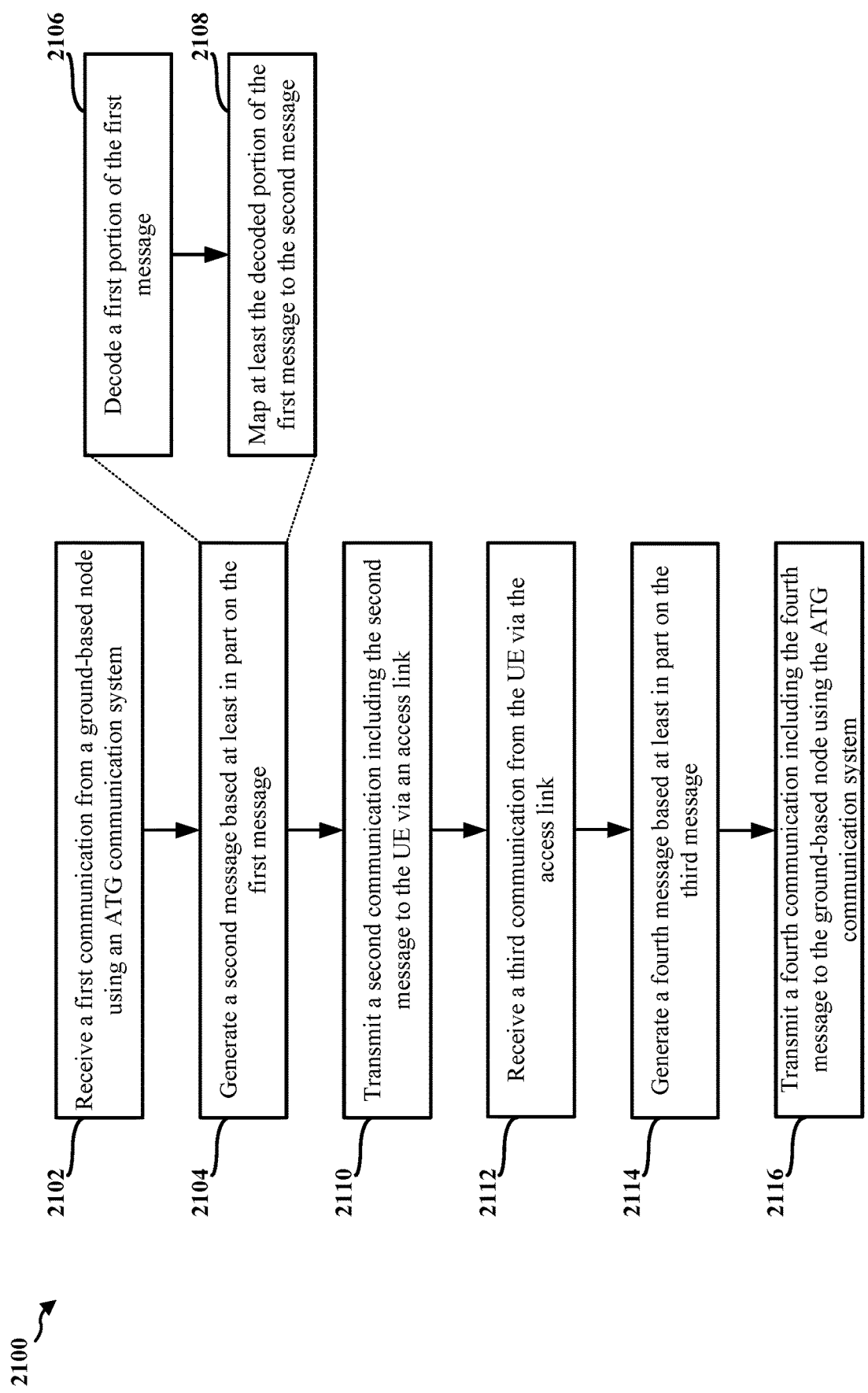
FIG. 21 is a flowchart of a method of wireless communication at an aerial device, in accordance with the teachings disclosed herein.

FIG. 21 is a flowchart 2100 of a method of wireless communication. The method may be performed by an aerial device and/or an aircraft-borne payload (e.g., the aerial device 103, the aerial device 606, the aerial device 806, the aerial device 1006, the aerial device 1106, the aerial device 1206, the aerial device 1306, the aerial device 1406, the aerial payload 612, the payload 808, the RU 1008, the base station 1108, the base station 1208, the base station 1308, the DU 1408, the base station 310, and/or an apparatus 2202 of FIG. 22). The method may facilitate improving cell coverage for an out of coverage UE by enabling the aerial device to relay messages from a terrestrial network to the UE using an ATG communication system and an access link. For example, the aerial device may include a payload configured to communicate with the UE using the access link and configured to communicate with the terrestrial network using the ATG communication system. In some examples, the payload may include a regenerative payload configured to generate a physical signal between the access link and the ATG communication system.

At 2102, the aerial device receives a first communication from a ground-based node using an ATG communication system between the ground-based node and a payload deployed on-board the aerial device, the first communication including a first message from a terrestrial network to be provided to a ground-based UE, as described in connection with the third communication 850 of FIG. 8 and/or the third message 852 of FIGS. 8 to 14. For example, 2102 may be performed by an ATG component 2244 of the apparatus 2202 of FIG. 22.

At 2104, the aerial device generates a second message based at least in part on the first message, as described in connection with 860 of FIG. 8. For example, 2104 may be performed by a generation component 2242 of the apparatus 2202 of FIG. 22.

In some examples, generating the second message may include, at 2106, the aerial device decoding a first portion of the first message, as described in connection with 862 of FIG. 8. For example, 2106 may be performed by the generation component 2242 of the apparatus 2202 of FIG. 22.

At 2108, the aerial device may map at least the decoded portion of the first message to the second message, as described in connection with 864 of FIG. 8. For example, 2108 may be performed by the generation component 2242 of the apparatus 2202 of FIG. 22.

At 2110, the aerial device transmits a second communication including the second message to the ground-based UE via an access link defined between the ground-based UE and the payload, as described in connection with the fourth communication 870 and/or the fourth message 872 of FIG. 8. For example, 2110 may be performed by an access link component 2240 of the apparatus 2202 of FIG. 22.

In some examples, the aerial device may communicate with an ATG device of the ATG communication system via at least one of a wireless communication interface or a wired communication interface, the ATG device deployed on-board the aerial device and configured to provide ATG communication between the payload and the ground-based node, as described in connection with the on-board link 816 of FIG. 8.

In some examples, transmitting the second communication including the second message may include relaying, via the payload, the first message from the ground-based node to the ground-based UE via the access link and the ATG communication system, as described in connection with the third communication 850 and the fourth communication 870 of FIG. 8.

In some examples, the aerial device may facilitate relaying uplink messages from the ground-based UE to the network node. For example, at 2112, the aerial device may receive a third communication from the ground-based UE via the access link, the third communication including a third message to be provided to the terrestrial network, as described in connection with the first communication 820 and the first message 822 of FIGS. 8 to 14. For example, 2112 may be performed by the ATG component 2244 of the apparatus 2202 of FIG. 22.

At 2114, the aerial device may generate a fourth message based at least in part on the third message, as described in connection with the second message 842 of FIGS. 8 to 14. For example, 2114 may be performed by the generation component 2242 of the apparatus 2202 of FIG. 22.

At 2116, the aerial device may transmit a fourth communication including the fourth message to the ground-based node using the ATG communication system, as described in connection with the second communication 840 and the second message 842 of FIG. 8. For example, 2116 may be performed by the ATG component 2244 of the apparatus 2202 of FIG. 22.

In some examples, the payload may include an RU and the ground-based node may include at least a base station, as described in connection with the example of FIG. 10. The RU may be in communication with the base station via the ATG communication system, as described in connection with the ATG communication system 1010 of FIG. 10. In some such examples, generating the second message (e.g., at 2104) may include decoding, at 2106, a physical layer portion of the first message, as described in connection with the first portion 854 of FIGS. 8 and 10, and the lower PHY layer 1020 of FIG. 10. The aerial device may then, at 2108, map the physical layer portion to the second message, the second message including the physical layer portion and a non-decoded portion of the first message, as described in connection with the first portion 874 and the second portion 876 of the fourth message 872 of FIGS. 8 and 10. The decoding, at 2106, and the mapping, at 2108, may be performed by the generation component 2242 of the apparatus 2202 of FIG. 22.

In some examples, the payload may include a base station and the ground-based node may include a core network associated with the terrestrial network, as described in connection with the example of FIG. 11. The base station may be in communication with the core network via the ATG communication system, as described in connection with the ATG communication system 1110 of FIG. 11. In some such examples, generating the second message (e.g., at 2104) may include decoding, at 2106, an access stratus layer portion of the first message, as described in connection with the first portion 824 of FIGS. 8 and 11, and the AS layer 1120 of FIG. 11. The aerial device may then, at 2108, map the access stratus layer portion to the second message, the second message including the access stratus layer portion and a non-decoded portion of the first message, as described in connection with the first portion 844 and the second portion 846 of the second message 842 of FIGS. 8 and 11.

In some examples, an upper layer of the access link may be defined between the ground-based UE and the core network, and the second message may include a non-decoded portion of the first message associated with the upper layer, as described in connection with the second portion 846 of FIGS. 8 and 11. The decoding, at 2106, and the mapping, at 2108, may be performed by the generation component 2242 of the apparatus 2202 of FIG. 22.

In some examples, the payload may include a base station and the ground-based node may include a ground-based ATG node of the ATG communication system, as described in connection with the example of FIGS. 12 and/or 13. The base station may be in communication with the ground-based ATG node via the ATG communication system, as described in connection with the ATG communication system 1210 of FIG. 12 and/or the ATG communication system 1310 of FIG. 13.

In some examples, an upper layer of the access link may include a message layer configured to encode or decode communications associated with the second message, the message layer being defined between the ground-based UE and the base station, as described in connection with the message layer 1321 of FIG. 13. In some such examples, generating the second message (e.g., at 2104) may include decoding, at 2106, the first message, as described in connection with the first message 822 of FIGS. 8 and 13. The aerial device may then, at 2108, map the decoded first message to the second message via the message layer, as described in connection with the first portion of the second message 842 of FIGS. 8 and 13.

In some examples, a NAS layer and an AS layer of the access link may each be defined between the ground-based UE and the base station, as described in connection with the AS layer 1220 and the upper layer 1221 of FIG. 12. In some such examples, generating the second message (e.g., at 2104) may include decoding, at 2106, the first message, as described in connection with the first message 822 of FIGS. 8 and 12. The aerial device may then, at 2108, map the decoded first message to the second message via the NAS layer, as described in connection with the first portion of the second message 842 of FIGS. 8 and 12.

In some examples, the payload may include a DU and the ground-based node includes a CU, as described in connection with the example of FIG. 14. The DU may be in communication with the CU via an F1 interface carried via the ATG communication system, as described in connection with the F1 interface 1430 and the ATG communication system 1410 of FIG. 11. In some such examples, generating the second message (e.g., at 2104) may include decoding, at 2106, a first AS layer portion of the first message, as described in connection with the first portion 824 of FIGS. 8 and 14, and the first AS layer portion 1420 of FIG. 14. The aerial device may then, at 2108, map the first AS layer portion to the second message, the second message including the first AS layer portion and a non-decoded portion of the first message including at least a second AS layer portion, as described in connection with the first portion 844 and the second portion 846 of the second message 842 and the second AS layer portion 1421 of FIGS. 8 and 14. The decoding, at 2106, and the mapping, at 2108, may be performed by the generation component 2242 of the apparatus 2202 of FIG. 22.

Figure 22:
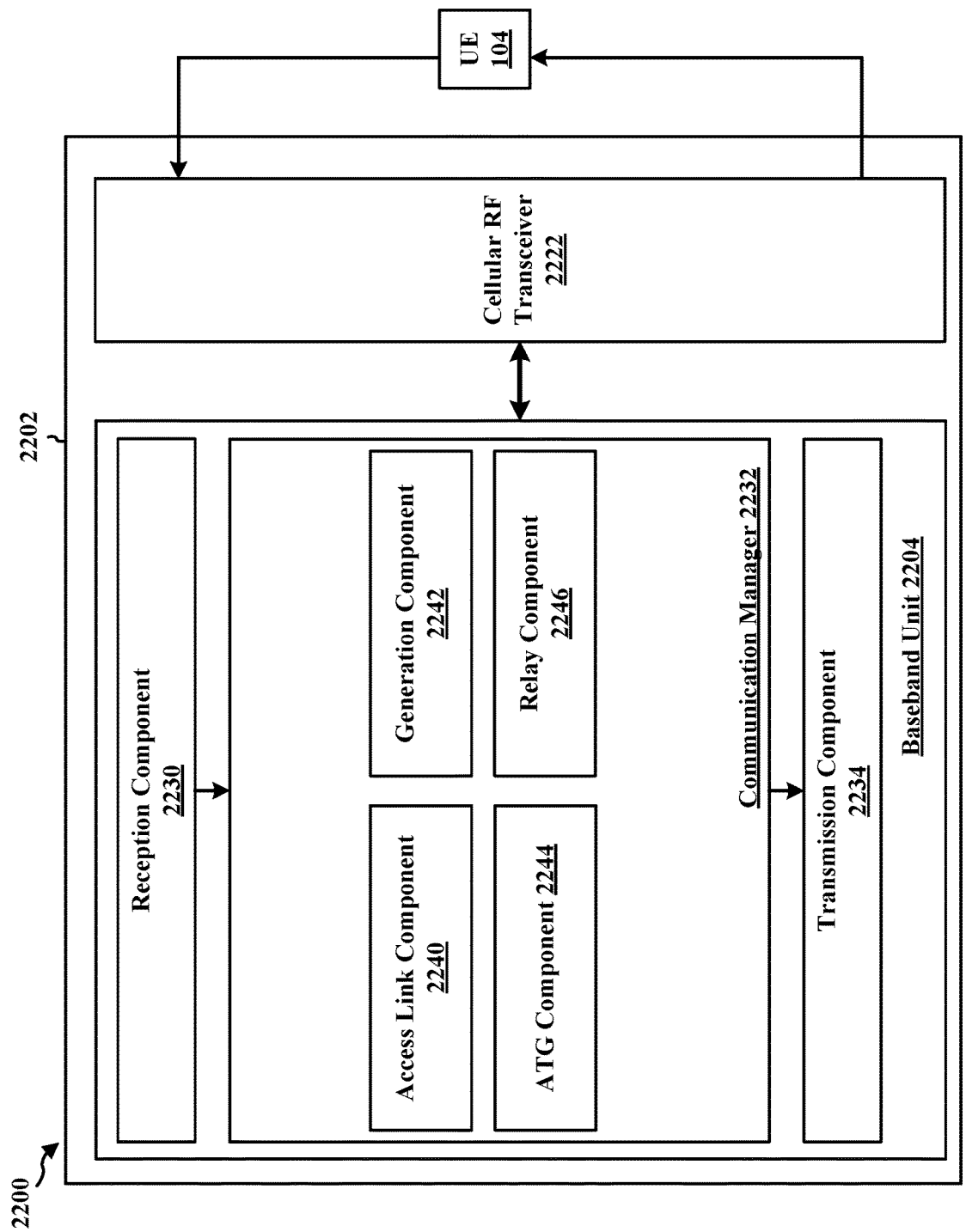
FIG. 22 is a diagram illustrating an example of a hardware implementation for an example apparatus, in accordance with the teachings disclosed herein.

FIG. 22 is a diagram 2200 illustrating an example of a hardware implementation for an apparatus 2202. The apparatus 2202 may be a base station, a component of a base station, or may implement base station functionality. In some aspects, the apparatus 2202 may include a baseband unit 2204. The baseband unit 2204 may communicate through a cellular RF transceiver 2222 with the UE 104. The baseband unit 2204 may include a computer-readable medium/memory. The baseband unit 2204 is responsible for general processing, including the execution of software stored on the computer-readable medium/memory. The software, when executed by the baseband unit 2204, causes the baseband unit 2204 to perform the various functions described supra. The computer-readable medium/memory may also be used for storing data that is manipulated by the baseband unit 2204 when executing software. The baseband unit 2204 further includes a reception component 2230, a communication manager 2232, and a transmission component 2234. The communication manager 2232 includes the one or more illustrated components. The components within the communication manager 2232 may be stored in the computer-readable medium/memory and/or configured as hardware within the baseband unit 2204. The baseband unit 2204 may be a component of the base station 310 and may include the memory 376 and/or at least one of the TX processor 316, the RX processor 370, and the controller/processor 375.

The communication manager 2232 includes an access link component 2240 that is configured to receive a first communication from a ground-based UE via an access link defined between the ground-based UE and a payload deployed on-board the aerial device, the first communication including a first message to be provided to a terrestrial network, for example, as described in connection with 1802 of FIG. 18 and/or 1902 of FIG. 19. The example access link component 2240 may also be configured to transmit, to the ground-based UE using the access link, a fourth communication including the fourth message, for example, as described in connection with 1920 of FIG. 19.

The example access link component 2240 may also be configured to transmit a second communication including the second message to the ground-based UE via an access link defined between the ground-based UE and the payload, for example, as described in connection with 2006 of FIG. 20 and/or 2110 of FIG. 21. The example access link component 2240 may also be configured to receive a third communication from the ground-based UE via the access link, the third communication including a third message to be provided to the terrestrial network, for example, as described in connection with 2112 of FIG. 13.

The communication manager 2232 also includes a generation component 2242 that is configured to generate a second message based at least in part on the first message, for example, as described in connection with 1804 of FIG. 18 and/or 1904 of FIG. 19. The example generation component 2242 may also be configured to decode a first portion of the first message, for example, as described in connection with 1906 of FIG. 19. For example, the example generation component 2242 may be configured to at least one of decode a physical layer portion of the first message, decode an access stratus layer portion of the first message, decode the first message using the message layer, decode the first message using the NAS layer, and/or decode a first AS layer portion of the first message. The example generation component 2242 may also be configured to map at least a portion of the first message to the second message, for example, as described in connection with 1908 of FIG. 19. For example, the example generation component 2242 may be configured to at least one of map the physical layer portion to the second message, the second message including the physical layer portion and a non-decoded portion of the first message, map the access stratus layer portion to the second message, the second message including the access stratus layer portion and a non-decoded portion of the first message, map the decoded first message to the second message, and/or map the first AS layer portion to the second message, the second message including the first AS layer portion and a non-decoded portion of the first message including at least a second AS layer portion. The example generation component 2242 may also be configured to generate a fourth message based at least in part on the third message, for example, as described in connection with 1918 of FIG. 19.

The example generation component 2242 may also be configured to generate a second message based at least in part on the first message, for example, as described in connection with 2004 of FIG. 20 and/or 2104 of FIG. 21. The example generation component 2242 may also be configured to decode a first portion of the first message, for example, as described in connection with 2106 of FIG. 21. For example, the example generation component 2242 may be configured to at least one of decode a physical layer portion of the first message, decode an access stratus layer portion of the first message, decode the first message, and/or decode a first AS layer portion of the first message. The example generation component 2242 may also be configured to map at least a portion of the first message to the second message, for example, as described in connection with 1908 of FIG. 19. For example, the example generation component 2242 may be configured to at least one of map the physical layer portion to the second message, the second message including the physical layer portion and a non-decoded portion of the first message, map the access stratus layer portion to the second message, the second message including the access stratus layer portion and a non-decoded portion of the first message, map the decoded first message to the second message via the message layer, map the decoded first message to the second message via the NAS layer, and/or map the first AS layer portion to the second message, the second message including the first AS layer portion and a non-decoded portion of the first message including at least a second AS layer portion. The example generation component 2242 may also be configured to generate a fourth message based at least in part on the third message, for example, as described in connection with 2114 of FIG. 21.

The communication manager 2232 also includes an ATG component 2244 that is configured to transmit, to a ground-based node using an ATG communication system, a second communication including the second message, for example, as described in connection with 1806 of FIG. 18 and/or 1910 of FIG. 19. The example ATG component 2244 may also be configured to communicate with an ATG device of the ATG communication system via at least one of a wireless communication interface or a wired communication interface, the ATG device deployed on-board the aerial device and configured to provide ATG communication between the payload and the ground-based node, for example, as described in connection with 1912 of FIG. 19. The example ATG component 2244 may also be configured to receive a third communication from the ground-based node via the ATG communication system, the third communication including a third message to be provided to the ground-based UE, for example, as described in connection with 1916 of FIG. 19.

The example ATG component 2244 may also be configured to receive a first communication from a ground-based node using an ATG communication system between the ground-based node and a payload deployed on-board the aerial device, the first communication including a first message from a terrestrial network to be provided to a ground-based UE, for example, as described in connection with 2002 of FIG. 20 and/or 2102 of FIG. 21. The example ATG component 2244 may also be configured to transmit a fourth communication including the fourth message to the ground-based node using the ATG communication system, for example, as described in connection with 2116 of FIG. 21.

The communication manager 2232 also includes a relay component 2246 that is configured to relay, via the payload, the first message from the ground-based UE to the ground-based node via the access link and the ATG communication system, for example, as described in connection with 1914 of FIG. 19.

The apparatus may include additional components that perform each of the blocks of the algorithm in the flowcharts of FIGS. 18 to 21. As such, each block in the flowcharts of FIGS. 18 to 21 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2202 may include a variety of components configured for various functions. In one configuration, the apparatus 2202, and in particular the baseband unit 2204, includes means for receiving a first communication from a ground-based UE via an access link defined between the ground-based UE and a payload deployed on-board the aerial device, the first communication including a first message to be provided to a terrestrial network. The example apparatus 2202 also includes means for generating a second message based at least in part on the first message. The example apparatus 2202 also includes means for transmitting, to a ground-based node using an ATG communication system, a second communication including the second message.

In another configuration, the example apparatus 2202 also includes means for communicating with an ATG device of the ATG communication system via at least one of a wireless communication interface or a wired communication interface, the ATG device deployed on-board the aerial device and configured to provide ATG communication between the payload and the ground-based node.

In another configuration, the example apparatus 2202 also includes means for receiving a third communication from the ground-based node via the ATG communication system, the third communication including a third message to be provided to the ground-based UE. The example apparatus 2202 also includes means for generating a fourth message based at least in part on the third message. The example apparatus 2202 also includes means for transmitting, to the ground-based UE using the access link, a fourth communication including the fourth message.

In another configuration, the example apparatus 2202 also includes means for decoding a physical layer portion of the first message. The example apparatus 2202 also includes means for mapping the physical layer portion to the second message, the second message including the physical layer portion and a non-decoded portion of the first message.

In another configuration, the example apparatus 2202 also includes means for decoding an access stratus layer portion of the first message. The example apparatus 2202 also includes means for mapping the access stratus layer portion to the second message, the second message including the access stratus layer portion and a non-decoded portion of the first message.

In another configuration, the example apparatus 2202 also includes means for decoding the first message using the message layer. The example apparatus 2202 also includes means for mapping the decoded first message to the second message.

In another configuration, the example apparatus 2202 also includes means for decoding the first message using the NAS layer. The example apparatus 2202 also includes means for mapping the decoded first message to the second message.

In another configuration, the example apparatus 2202 also includes means for decoding a first AS layer portion of the first message. The example apparatus 2202 also includes means for mapping the first AS layer portion to the second message, the second message including the first AS layer portion and a non-decoded portion of the first message including at least a second AS layer portion.

In another configuration, the example apparatus 2202 also includes means for relaying, via the payload, the first message from the ground-based UE to the ground-based node via the access link and the ATG communication system.

In another configuration, the example apparatus 2202 also includes means for receiving a first communication from a ground-based node using an ATG communication system between the ground-based node and a payload deployed on-board the aerial device, the first communication including a first message from a terrestrial network to be provided to a ground-based UE. The example apparatus 2202 also includes means for generating a second message based at least in part on the first message. The example apparatus 2202 also includes means for transmitting, to the ground-based UE via an access link defined between the ground-based UE and the payload, a second communication including the second message.

In another configuration, the example apparatus 2202 also includes means for receiving a third communication from the ground-based UE via the access link, the third communication including a third message to be provided to the terrestrial network. The example apparatus 2202 also includes means for generating a fourth message based at least in part on the third message. The example apparatus 2202 also includes means for transmitting, to the ground-based node using the ATG communication system, a fourth communication including the fourth message.

In another configuration, the example apparatus 2202 also includes means for decoding a physical layer portion of the first message. The example apparatus 2202 also includes means for mapping the physical layer portion to the second message, the second message including the physical layer portion and a non-decoded portion of the first message.

In another configuration, the example apparatus 2202 also includes means for decoding an access stratus layer portion of the first message. The example apparatus 2202 also includes means for mapping the access stratus layer portion to the second message, the second message including the access stratus layer portion and a non-decoded portion of the first message.

In another configuration, the example apparatus 2202 also includes means for decoding the first message. The example apparatus 2202 also includes means for mapping the decoded first message to the second message via the message layer.

In another configuration, the example apparatus 2202 also includes means for decoding the first message. The example apparatus 2202 also includes means for mapping the decoded first message to the second message via the NAS layer.

In another configuration, the example apparatus 2202 also includes means for decoding a first AS layer portion of the first message. The example apparatus 2202 also includes means for mapping the first AS layer portion to the second message, the second message including the first AS layer portion and a non-decoded portion of the first message including at least a second AS layer portion.

The means may be one or more of the components of the apparatus 2202 configured to perform the functions recited by the means. As described supra, the apparatus 2202 may include the TX processor 316, the RX processor 370, and the controller/processor 375. As such, in one configuration, the means may be the TX processor 316, the RX processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at an aerial device, comprising: receiving a first communication from a ground-based user equipment (UE) via an access link defined between the ground-based UE and a payload deployed on-board the aerial device, the first communication including a first message to be provided to a terrestrial network; generating a second message based at least in part on the first message; and transmitting, to a ground-based node using an air-to-ground (ATG) communication system, a second communication including the second message.

Aspect 2 is the method of aspect 1, further including: communicating with an ATG device of the ATG communication system via at least one of a wireless communication interface or a wired communication interface, the ATG device deployed on-board the aerial device and configured to provide ATG communication between the payload and the ground-based node.

Aspect 3 is the method of any of aspects 1 and 2, further including: receiving a third communication from the ground-based node via the ATG communication system, the third communication including a third message to be provided to the ground-based UE; generating a fourth message based at least in part on the third message; and transmitting, to the ground-based UE using the access link, a fourth communication including the fourth message.

Aspect 4 is the method of any of aspects 1 to 3, further including that the payload includes a radio unit (RU) and the ground-based node includes at least a base station, the RU in communication with the base station via the ATG communication system.

Aspect 5 is the method of any of aspects 1 to 4, further including that generating the second message includes: decoding a physical layer portion of the first message; and mapping the physical layer portion to the second message, the second message including the physical layer portion and a non-decoded portion of the first message.

Aspect 6 is the method of any of aspects 1 to 3, further including that the payload includes a base station and the ground-based node includes a core network associated with the terrestrial network, the base station in communication with the core network via the ATG communication system.

Aspect 7 is the method of any of aspects 1 and 6, further including that generating the second message includes: decoding an access stratus layer portion of the first message; and mapping the access stratus layer portion to the second message, the second message including the access stratus layer portion and a non-decoded portion of the first message.

Aspect 8 is the method of any of aspects 1 to 7, further including that an upper layer of the access link is defined between the ground-based UE and the core network, and the second message includes a non-decoded portion of the first message associated with the upper layer.

Aspect 9 is the method of any of aspects 1 to 3, further including that the payload includes a base station and the ground-based node includes a ground-based ATG node of the ATG communication system, the base station in communication with the ground-based ATG node via the ATG communication system.

Aspect 10 is the method of any of aspects 1 and 9, further including that an upper layer of the access link includes a message layer configured to encode or decode communications associated with the first message, the message layer being defined between the ground-based UE and the base station.

Aspect 11 is the method of any of aspects 1 to 10, further including that generating the second message includes:

decoding the first message using the message layer; and mapping the decoded first message to the second message.

Aspect 12 is the method of any of aspects 1 to 11, further including that a non-access stratum (NAS) layer and an access stratum (AS) layer of the access link are each defined between the ground-based UE and the base station, and wherein generating the second message includes: decoding the first message using the NAS layer; and mapping the decoded first message to the second message.

Aspect 13 is the method of any of aspects 1 to 3, further including that the payload includes a distributed unit (DU) and the ground-based node includes a central unit (CU), the DU in communication with the CU via an F1 interface carried via the ATG communication system.

Aspect 14 is the method of any of aspects 1 and 13, further including that generating the second message includes: decoding a first access stratum (AS) layer portion of the first message; and mapping the first AS layer portion to the second message, the second message including the first AS layer portion and a non-decoded portion of the first message including at least a second AS layer portion.

Aspect 15 is the method of any of aspects 1 to 14, further including that transmitting the second communication including the second message comprises: relaying, via the payload, the first message from the ground-based UE to the ground-based node via the access link and the ATG communication system.

Aspect 16 is the method of any of aspects 1 to 15, further including that the payload includes a regenerative payload configured to generate a physical signal between the access link and the ATG communication system.

Aspect 17 is an apparatus for wireless communication comprising at least one processor coupled to a memory and configured to implement any of aspects 1 to 16.

In aspect 18, the apparatus of aspect 17 further includes at least one antenna coupled to the at least one processor.

In aspect 19, the apparatus of aspect 17 or 18 further includes a transceiver coupled to the at least one processor.

Aspect 20 is an apparatus for wireless communication including means for implementing any of aspects 1 to 16.

In aspect 21, the apparatus of aspect 20 further includes at least one antenna coupled to the means to perform the method of any of aspects 1 to 16.

In aspect 22, the apparatus of aspect 20 or 21 further includes a transceiver coupled to the means to perform the method of any of aspects 1 to 16.

Aspect 23 is a non-transitory computer-readable storage medium storing computer executable code, where the code, when executed, causes a processor to implement any of aspects 1 to 16.

Aspect 24 is a method of wireless communication at an aerial device, comprising: receiving a first communication from a ground-based node using an air-to-ground (ATG) communication system between the ground-based node and a payload deployed on-board the aerial device, the first communication including a first message from a terrestrial network to be provided to a ground-based UE; generating a second message based at least in part on the first message; and transmitting, to the ground-based UE via an access link defined between the ground-based UE and the payload, a second communication including the second message.

Aspect 25 is the method of aspect 24, further including: receiving a third communication from the ground-based UE via the access link, the third communication including a third message to be provided to the terrestrial network; generating a fourth message based at least in part on the third message; and transmitting, to the ground-based node using the ATG communication system, a fourth communication including the fourth message.

Aspect 26 is the method of any of aspects 24 and 25, further including that the payload includes a radio unit (RU) and the ground-based node includes at least a base station, the RU in communication with the base station via the ATG communication system, and wherein generating the second message includes: decoding a physical layer portion of the first message; and mapping the physical layer portion to the second message, the second message including the physical layer portion and a non-decoded portion of the first message.

Aspect 27 is the method of any of aspects 24 and 25, further including that the payload includes a base station and the ground-based node includes a core network associated with the terrestrial network, the base station in communication with the core network via the ATG communication system.

Aspect 28 is the method of any of aspects 24 and 27, further including that generating the second message includes: decoding an access stratus layer portion of the first message; and mapping the access stratus layer portion to the second message, the second message including the access stratus layer portion and a non-decoded portion of the first message.

Aspect 29 is the method of any of aspects 24 and 28, further including that an upper layer of the access link is defined between the ground-based UE and the core network, and the second message includes a non-decoded portion of the first message associated with the upper layer.

Aspect 30 is the method of any of aspects 24 and 25, further including that the payload includes a base station and the ground-based node includes a ground-based ATG node of the ATG communication system, the base station in communication with the ground-based ATG node via the ATG communication system.

Aspect 31 is the method of any of aspects 24 and 30, further including that an upper layer of the access link includes a message layer configured to encode or decode communications associated with the second message, the message layer being defined between the ground-based UE and the base station, and wherein generating the second message includes: decoding the first message; and mapping the decoded first message to the second message via the message layer.

Aspect 32 is the method of any of aspects 24 and 30, further including that a non-access stratum (NAS) layer and an access stratum (AS) layer of the access link are each defined between the ground-based UE and the base station, and wherein generating the second message includes: decoding the first message; and mapping the decoded first message to the second message via the NAS layer.

Aspect 33 is the method of any of aspects 24 and 25, further including that the payload includes a distributed unit (DU) and the ground-based node includes a central unit (CU), the DU in communication with the CU via an F1 interface carried via the ATG communication system, and wherein generating the second message includes: decoding a first AS layer portion of the first message; and mapping the first AS layer portion to the second message, the second message including the first AS layer portion and a non-decoded portion of the first message including at least a second AS layer portion.

Aspect 34 is an apparatus for wireless communication comprising at least one processor coupled to a memory and configured to implement any of aspects 24 to 33.

In aspect 35, the apparatus of aspect 34 further includes at least one antenna coupled to the at least one processor.

In aspect 36, the apparatus of aspect 34 or 35 further includes a transceiver coupled to the at least one processor.

Aspect 37 is an apparatus for wireless communication including means for implementing any of aspects 24 to 33.

In aspect 38, the apparatus of aspect 37 further includes at least one antenna coupled to the means to perform the method of any of aspects 24 to 33.

In aspect 39, the apparatus of aspect 37 or 38 further includes a transceiver coupled to the means to perform the method of any of aspects 24 to 33.

Aspect 40 is a non-transitory computer-readable storage medium storing computer executable code, where the code, when executed, causes a processor to implement any of aspects 24 to 33.

Aspect 41 is a method of wireless communication at a user equipment (UE), comprising: establishing an access link with a terrestrial network; establishing a message layer of the access link for communicating with a payload deployed on-board an aerial device; and communicating a communication with the aerial device using the message layer, the communication including a message to be provided to the terrestrial network or received from the terrestrial network.

Aspect 42 is the method of aspect 41, further including that the UE includes a ground-based UE.

Aspect 43 is the method of any of aspects 41 and 42, further including that communicating the communication with the aerial device includes at least one of: transmitting the message to the payload at least in part on the access link; and receiving the message from the payload at least in part on the access link.

Aspect 44 is the method of any of aspects 41 to 43, further including that communicating using the message layer is defined between the UE and the payload.

Aspect 45 is an apparatus for wireless communication comprising at least one processor coupled to a memory and configured to implement any of aspects 41 to 44.

In aspect 46, the apparatus of aspect 45 further includes at least one antenna coupled to the at least one processor.

In aspect 47, the apparatus of aspect 45 or 46 further includes a transceiver coupled to the at least one processor.

Aspect 48 is an apparatus for wireless communication including means for implementing any of aspects 41 to 44.

In aspect 49, the apparatus of aspect 48 further includes at least one antenna coupled to the means to perform the method of any of aspects 41 to 44.

In aspect 50, the apparatus of aspect 48 or 49 further includes a transceiver coupled to the means to perform the method of any of aspects 41 to 44.

Aspect 51 is a non-transitory computer-readable storage medium storing computer executable code, where the code, when executed, causes a processor to implement any of aspects 41 to 44.

What is claimed is:

1. An apparatus for wireless communication at an aerial device, comprising:
   memory; and
   one or more processors coupled to the memory, wherein the one or more processors are configured to cause the aerial device to:
   receive a first communication from a ground-based user equipment (UE) via an access link defined between the ground-based UE and a payload that includes a radio unit (RU) deployed on-board the aerial device, wherein the first communication includes a first message to be provided to a terrestrial network;
   decode a first portion of the first message;
   generate a second message, wherein the second message includes the first portion and a non-decoded portion of the first message; and
   transmit, to a ground-based network node via an air-to-ground (ATG) communication system, a second communication that includes the second message.

2. The apparatus of claim 1, further comprising:
   at least one antenna coupled to the one or more processors, wherein the one or more processors are further configured to cause the aerial device to:
   communicate with an ATG device of the ATG communication system via at least one of a wireless communication interface or a wired communication interface, the ATG device deployed on-board the aerial device and configured to provide ATG communication between the payload and the ground-based network node.

3. The apparatus of claim 1, wherein the one or more processors are further configured to cause the aerial device to:
   receive a third communication from the ground-based network node via the ATG communication system, wherein the third communication includes a third message to be provided to the ground-based UE;
   generate a fourth message based at least in part on the third message; and
   transmit, to the ground-based UE via the access link, a fourth communication that includes the fourth message.

4. The apparatus of claim 1, wherein the ground-based network node includes at least a base station, the RU in communication with the base station via the ATG communication system.

5. The apparatus of claim 1, wherein the first portion comprises a physical layer portion, and wherein to generate the second message, the one or more processors are further configured to cause the aerial device to:
   map the physical layer portion to the second message, wherein the second message includes the physical layer portion and the non-decoded portion of the first message.

6. The apparatus of claim 1, wherein the payload includes a base station and the ground-based network node includes a core network associated with the terrestrial network, the base station in communication with the core network via the ATG communication system.

7. The apparatus of claim 6, wherein the first portion comprises an access stratus layer portion, and wherein to generate the second message, the one or more processors are further configured to cause the aerial device to:
   map the access stratus layer portion to the second message, wherein the second message includes the access stratus layer portion and the non-decoded portion of the first message.

8. The apparatus of claim 6, wherein an upper layer of the access link is defined between the ground-based UE and the core network, and the second message includes the non-decoded portion of the first message associated with the upper layer.

9. The apparatus of claim 1, wherein the payload includes a base station and the ground-based network node includes a ground-based ATG node of the ATG communication system, the base station in communication with the ground-based ATG node via the ATG communication system.

10. The apparatus of claim 9, wherein an upper layer of the access link includes a message layer configured to encode or decode communications associated with the first message, wherein the message layer is defined between the ground-based UE and the base station.

11. The apparatus of claim 10, wherein to decode the first portion of the first message the one or more processors are further configured to cause the aerial device to decode the first portion of the first message via the message layer, and wherein to generate the second message, the one or more processors are further configured to cause the aerial device to:
map the first message, after the first portion is decoded, to the second message.

12. The apparatus of claim 9, wherein a non-access stratum (NAS) layer and an access stratum (AS) layer of the access link are each defined between the ground-based UE and the base station, and wherein to decode the first portion of the first message, the one or more processors are further configured to cause the aerial device to decode the first portion of the first message via the NAS layer, and wherein to generate the second message, the one or more processors are further configured to cause the aerial device to:
map the first message, after the first portion is decoded, to the second message.

13. The apparatus of claim 1, wherein the payload includes a distributed unit (DU) and the ground-based network node includes a central unit (CU), the DU in communication with the CU via an F1 interface carried via the ATG communication system.

14. The apparatus of claim 13, wherein the first portion comprises a first access stratum (AS) layer portion of the first message, and wherein to generate the second message, the one or more processors are further configured to cause the aerial device to:
map the first AS layer portion to the second message, wherein the second message includes the first AS layer portion and the non-decoded portion of the first message includes at least a second AS layer portion.

15. The apparatus of claim 1, wherein to transmit the second communication that includes the second message, the one or more processors are further configured to cause the aerial device to:
relay, via the payload, the first message from the ground-based UE to the ground-based network node via the access link and the ATG communication system.

16. The apparatus of claim 1, wherein the payload includes a regenerative payload configured to generate a physical signal between the access link and the ATG communication system.

17. An apparatus for wireless communication at an aerial device, comprising:
memory; and
one or more processors coupled to the memory, wherein the one or more processors are configured to cause the aerial device to:
receive a first communication from a ground-based network node via an air-to-ground (ATG) communication system between the ground-based network node and a payload that includes a radio unit (RU) deployed on-board the aerial device, wherein the first communication includes a first message from a terrestrial network to be provided to a ground-based UE;
decode a first portion of the first message;
generate a second message, wherein the second message includes the first portion and a non-decoded portion of the first message; and
transmit, to the ground-based UE via an access link defined between the ground-based UE and the payload, a second communication that includes the second message.

18. The apparatus of claim 17, further comprising:
at least one antenna coupled to the one or more processors, wherein the one or more processors are further configured to cause the aerial device to:
receive a third communication from the ground-based UE via the access link, wherein the third communication includes a third message to be provided to the terrestrial network;
generate a fourth message based at least in part on the third message; and
transmit, to the ground-based network node via the ATG communication system, a fourth communication that includes the fourth message.

19. The apparatus of claim 17, wherein the first portion comprises a physical layer portion and the ground-based network node includes at least a base station, and wherein to generate the second message, the one or more processors are further configured to cause the aerial device to:
map the physical layer portion to the second message, wherein the second message includes the physical layer portion and the non-decoded portion of the first message.

20. The apparatus of claim 17, wherein the payload includes a base station and the ground-based network node includes a core network associated with the terrestrial network, the base station in communication with the core network via the ATG communication system.

21. The apparatus of claim 20, wherein the first portion comprises an access stratus layer portion, and wherein to generate the second message, the one or more processors are further configured to cause the aerial device to:
map the access stratus layer portion to the second message, wherein the second message includes the access stratus layer portion and the non-decoded portion of the first message.

22. The apparatus of claim 20, wherein an upper layer of the access link is defined between the ground-based UE and the core network, and the second message includes the non-decoded portion of the first message associated with the upper layer.

23. The apparatus of claim 17, wherein the payload includes a base station and the ground-based network node includes a ground-based ATG node of the ATG communication system, the base station in communication with the ground-based ATG node via the ATG communication system.

24. The apparatus of claim 23, wherein an upper layer of the access link includes a message layer configured to encode or decode communications associated with the second message, wherein the message layer is defined between the ground-based UE and the base station, wherein to decode the first portion of the first message, the one or more processors are further configured to cause the aerial device to decode the first portion of the first message, and wherein to generate the second message, the one or more processors are further configured to cause the aerial device to:

map the first message, after the first portion is decoded, to the second message via the message layer.

25. The apparatus of claim 23, wherein a non-access stratum (NAS) layer and an access stratum (AS) layer of the access link are each defined between the ground-based UE and the base station, wherein to decode the first portion of the first message, the one or more processors are further configured to cause the aerial device to decode the first portion of the first message, and wherein to generate the second message, the one or more processors are further configured to cause the aerial device to:

map the first message, after the first portion is decoded, to the second message via the NAS layer.

26. The apparatus of claim 17, wherein the payload includes a distributed unit (DU) and the ground-based network node includes a central unit (CU), the DU in communication with the CU via an F1 interface carried via the ATG communication system, wherein the first portion comprises a first access stratum (AS) layer portion of the first message, and wherein to generate the second message, the one or more processors are further configured to cause the aerial device to:

map the first AS layer portion to the second message, wherein the second message includes the first AS layer portion and the non-decoded portion of the first message includes at least a second AS layer portion.

27. A method for wireless communication at an aerial device, comprising:

receiving a first communication from a ground-based user equipment (UE) via an access link defined between the ground-based UE and a payload that includes a radio unit (RU) deployed on-board the aerial device, wherein the first communication includes a first message to be provided to a terrestrial network;

decoding a first portion of the first message;

generating a second message, wherein the second message includes the first portion and a non-decoded portion of the first message; and transmitting, to a ground-based network node via an air-to-ground (ATG) communication system, a second communication that includes the second message.

28. The method of claim 27, wherein the payload includes a distributed unit (DU) and the ground-based network node includes a central unit (CU), the DU in communication with the CU via an F1 interface carried via the ATG communication system.

29. The method of claim 27, wherein the first portion comprises a physical layer portion, and wherein generating the second message comprises:

mapping the physical layer portion to the second message, wherein the second message includes the physical layer portion and the non-decoded portion of the first message.

30. A method for wireless communication at an aerial device, comprising:

receiving a first communication from a ground-based network node via an air-to-ground (ATG) communication system between the ground-based network node and a payload that includes a radio unit (RU) deployed on-board the aerial device, wherein the first communication includes a first message from a terrestrial network to be provided to a ground-based UE;

decoding a first portion of the first message;

generating a second message, wherein the second message includes the first portion and a non-decoded portion of the first message; and transmitting, to the ground-based UE via an access link defined between the ground-based UE and the payload, a second communication that includes the second message.

31. The method of claim 30, wherein the first portion comprises a physical layer portion and the ground-based network node includes at least a base station, and wherein generating the second message comprises:

mapping the physical layer portion to the second message, wherein the second message includes the physical layer portion and the non-decoded portion of the first message.

32. The method of claim 30, wherein the payload includes a distributed unit (DU) and the ground-based network node includes a central unit (CU), the DU in communication with the CU via an F1 interface carried via the ATG communication system, wherein the first portion comprises a first access stratum (AS) layer portion of the first message, and wherein generating the second message comprises:

mapping the first AS layer portion to the second message, wherein the second message includes the first AS layer portion and the non-decoded portion of the first message includes at least a second AS layer portion.

33. A non-transitory computer-readable medium storing computer executable code at an aerial device, the code when executed by one or more processors causes the aerial device to:

receive a first communication from a ground-based user equipment (UE) via an access link defined between the ground-based UE and a payload that includes a radio unit (RU) deployed on-board the aerial device, wherein the first communication includes a first message to be provided to a terrestrial network;

decode a first portion of the first message;

generate a second message, wherein the second message includes the first portion and a non-decoded portion of the first message; and transmit, to a ground-based network node via an air-to-ground (ATG) communication system, a second communication that includes the second message.

34. A non-transitory computer-readable medium storing computer executable code at an aerial device, the code when executed by one or more processors causes the aerial device to:

receive a first communication from a ground-based network node via an air-to-ground (ATG) communication system between the ground-based network node and a payload that includes a radio unit (RU) deployed on-board the aerial device, wherein the first communication includes a first message from a terrestrial network to be provided to a ground-based UE;

decode a first portion of the first message;

generate a second message, wherein the second message includes the first portion and a non-decoded portion of the first message; and transmit, to the ground-based UE via an access link defined between the ground-based UE and the payload, a second communication that includes the second message.

* * * * *